US010555865B2

(12) United States Patent
Zhang et al.

(10) Patent No.: US 10,555,865 B2
(45) Date of Patent: Feb. 11, 2020

(54) TORQUE CONTROL METHODS FOR AN EXOSKELETON DEVICE

(71) Applicant: Carnegie Mellon University, Pittsburgh, PA (US)

(72) Inventors: Juanjuan Zhang, Pittsburgh, PA (US); Steven H. Collins, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 112 days.

(21) Appl. No.: 15/605,520

(22) Filed: May 25, 2017

(65) Prior Publication Data

US 2017/0340506 A1 Nov. 30, 2017

Related U.S. Application Data

(60) Provisional application No. 62/392,270, filed on May 25, 2016.

(51) Int. Cl.
*G06F 19/00* (2018.01)
*A61H 3/00* (2006.01)
(Continued)

(52) U.S. Cl.
CPC ............ *A61H 3/00* (2013.01); *F16C 1/12* (2013.01); *G05B 6/02* (2013.01); *G05D 17/02* (2013.01);
(Continued)

(58) Field of Classification Search
CPC ........ A61H 3/00; A61H 1/024; A61H 1/0266; A61H 2003/007; A61H 2201/0165; A61H 2201/1215; A61H 2201/1223; A61H 2201/149; A61H 2201/164; A61H 2201/165; A61H 2201/50;
(Continued)

(56) References Cited

U.S. PATENT DOCUMENTS

2010/0113980 A1* 5/2010 Herr .................... A61F 2/60
600/587
2010/0114329 A1* 5/2010 Casler ............. B25J 19/0008
623/24
(Continued)

OTHER PUBLICATIONS

Juanjuan Zhang et al., "Experimental comparison of torque control methods on an ankle exoskeleton during human walking," IEEE, (2015), pp. 5584-5589.
(Continued)

*Primary Examiner* — Ronnie M Mancho
(74) *Attorney, Agent, or Firm* — Fish & Richardson P.C.

(57) ABSTRACT

This document describes systems and methods for controlling an exoskeleton. The system receives a measurement of a first torque applied to a rotational joint coupling a first component to a second component, the first torque being applied by a motor via a cable. The system determines, based on the measurement of the first torque, a first portion of a second torque to apply to the rotational joint. The system determines, based on the measurement of the first torque, a second portion of the second torque to apply to the rotational joint. The system determines a value of the second torque to apply to the rotational joint based on the first portion and the second portion. The system controls the motor for applying the second torque to the rotational joint via the cable.

32 Claims, 20 Drawing Sheets

(51) Int. Cl.
*F16C 1/12* (2006.01)
*G05B 6/02* (2006.01)
*G05D 17/02* (2006.01)

(52) U.S. Cl.
CPC ............... *A61H 2003/007* (2013.01); *A61H 2201/1223* (2013.01); *A61H 2201/5007* (2013.01); *A61H 2201/5061* (2013.01)

(58) Field of Classification Search
CPC .... A61H 2201/5007; A61H 2201/5058; A61H 2201/5061; A61H 2201/5069; A61H 2230/60; F16C 1/12; F16C 1/108; G05B 6/02; G05D 17/02
USPC .................................................. 700/245, 261
See application file for complete search history.

(56) References Cited

U.S. PATENT DOCUMENTS

| | | | | |
|---|---|---|---|---|
| 2010/0324699 | A1* | 12/2010 | Herr | A61F 2/66 623/27 |
| 2011/0130761 | A1* | 6/2011 | Plaskos | A61B 17/155 606/87 |
| 2012/0330198 | A1* | 12/2012 | Patoglu | B25J 9/0006 601/33 |
| 2013/0289452 | A1* | 10/2013 | Smith | B25J 9/0006 601/33 |
| 2015/0141878 | A1* | 5/2015 | Roy | A61H 3/00 601/34 |
| 2015/0173993 | A1* | 6/2015 | Walsh | A61H 1/024 414/4 |
| 2015/0297934 | A1* | 10/2015 | Agrawal | A61H 1/0266 482/4 |
| 2016/0107309 | A1* | 4/2016 | Walsh | B25J 9/0006 248/550 |
| 2017/0202724 | A1* | 7/2017 | De Rossi | A61H 3/00 |
| 2017/0231787 | A1* | 8/2017 | Noda | A61H 3/00 623/26 |
| 2017/0340506 | A1* | 11/2017 | Zhang | A61H 3/00 |
| 2018/0160946 | A1* | 6/2018 | Macko | A61B 5/4595 |
| 2018/0325713 | A1* | 11/2018 | Gregg | A61F 5/0102 |

OTHER PUBLICATIONS

Juanjuan Zhang et al., "Supporting Materials: Comparison of torque control methods for tethered lower-limb exoskeletons during human walking," International Journal of Robotics Research (2015), pp. 1-9.

Witte et al., Design of Two Lightweight, High-Bandwidth Torque-Controlled Ankle Exoskeletons, 2015 IEEE International Conference on Robotics and Automation, p. 1-2.

Wiggen et al., "An Exoskeleton Using Controlled Energy Storage and Release to Aid Ankle Propulsion," 2011 IEEE International Conference on Rehabilitation Robotics, pp. 1-5.

Steven H. Collins and Rachel W. Jackson, "Inducing Self-Selected Human Engagement in Robotic Locomotion Training," 2013 IEEE International Conference on Rehabiliation Robotics, pp. 1-6.

Juanjuan Zhang et al., "Stable Human-Robot Interaction Control for Upper-limb Rehabilitation Robotics," 2013 IEEE International Conference on Robotics and Automation (ICRA), pp. 1-6.

Seungmoon Song et al., "The Effect of Foot Compliance Encoded in the Windlass Mechanism on the Energetics of Human Walking," 35th Annual International Conference on the IEEE EMBS, 2013, pp. 1-4.

Wiggin et al., "An Exoskeleton Using Controlled Energy Storage and Release to Aid Ankle Propulsion," 2011 IEEE International Conference on Rehabilitation Robotics, 2011, pp. 1-5.

Van der Helm et al., "Changing Speed in a Simple Walker with Dynamic One-Step Transitions," Master Thesis, 2009, pp. 1-20.

* cited by examiner

TORQUE CONTROL METHODS FOR AN EXOSKELETON DEVICE

CLAIM OF PRIORITY

This application claims priority under 35 U.S.C. § 119(e) to U.S. Patent Application Ser. No. 62/392,270, filed on May 25, 2016, the entire contents of which are hereby incorporated by reference.

GOVERNMENT SUPPORT CLAUSE

This invention was made with government support under U.S. Pat. No. 1,355,716 awarded by the National Science Foundation. The government has certain rights in the invention.

BACKGROUND

Exoskeletons have been used for performance restoration and enhancement. Recently, the importance of the natural dynamics of the human body, energy input, and comfort of human-robot interactions have been given increased attention in exoskeleton applications. In these approaches to exoskeleton assistance torque control is crucial. In such systems, series-elastic actuators are commonly used to provide low error torque tracking in the presence of unknown and changing human dynamics.

It has been a common interest for the lower-limb exoskeleton community to improve locomotion performance. The ankle joint has drawn attention for effort reduction in walking since it produces more mechanical work than other joints. Better ankle joint torque tracking can improve exoskeleton control. Such techniques are also expected to extend to knee and hip exoskeletons, for which the control problem is similar.

Control of exoskeletons is normally hierarchical, with high level controllers determining behavior-related desired torques and torque control lying at a lower level. Torque controllers are called low-level controllers and desired torque generators are called high-level controllers. Many low-level control methods have been employed for torque or position tracking in exoskeletons, including classical feedback control, model-based control, adaptive control and iterative learning control. However, it remains unclear which method has the best performance, or how performance may vary with high-level controllers.

High-level controllers based on time, joint angle, neuromuscular models, and electromyographic measurements have been used to assist human walking. Each may be advantageous in some assistance paradigms, and each generates desired torques with different dynamics.

The topic of exoskeleton torque control has not drawn as much attention as high-level control and biomechanics outcomes. In cases where torque control has been addressed directly, it has typically been investigated under unrealistic conditions, i.e., during benchtop tests rather than human-robot interactions, and results have often not been reported quantitatively. Moreover, little has been reported on the relative performance of different torque controllers on the same platform, making differentiation among candidate methods difficult.

SUMMARY

This document describes torque-tracking performance of prominent torque controllers, with multiple high-level controllers, in a single exoskeleton platform. The feedback control approaches include variations on classical feedback control, model-based control, adaptive control and iterative learning. Four example high-level exoskeleton controllers are described. The high-level controllers determine desired torque based on time, joint angle, a neuromuscular model, or electromyography measurements, respectively. Controllers are implemented on an ankle exoskeleton with series elastic actuation driven by an off-board motor through a unidirectional Bowden cable. The exoskeleton can be worn by a human subject. The exoskeleton system is tested by walking on a treadmill at 1.25 meters per second for one hundred steady-state steps under each condition. The combination of proportional control, damping injection and iterative learning results in substantially lower root-mean-squared error than other torque control approaches for all high-level controllers. With time-based torque commands, rms errors were 0.6 N-m (1.3% of peak torque) step by step, and 0.1 N-m (0.2%) on average, while with electromyography-based torque commands, errors were 2.1 N-m (5.9% of peak torque) step by step and 0.2 N-m (0.6%) on average. Model-free, integration-free feedback control seems to be well suited to the uncertain, changing dynamics of the human-robot system, while iterative learning is advantageous in the cyclic task of walking.

This document describes a process for receiving a measurement of a first torque applied to a rotational joint coupling a first component to a second component, the first torque being applied by a motor via a cable; determining, based on the measurement of the first torque, a first portion of a second torque to apply to the rotational joint; determining, based on the measurement of the first torque, a second portion of the second torque to apply to the rotational joint; determining a value of the second torque to apply to the rotational joint based on the first portion and the second portion; and controlling the motor for applying the second torque to the rotational joint via the cable.

In some implementations, the first portion of the second torque to apply to the rotational joint includes a feedback response portion, the feedback response portion being a first function of a value of a torque error value. In some implementations, the first function comprises a proportional response component. In some implementations, the first function further comprises an integral component and a damping component. In some implementations, the second portion of the second torque to apply to the rotational joint is a feed-forward response portion, the feed-forward response portion being a second function of the value of the torque error value, the second function being different from the first function.

In some implementations, the second function comprises an iterative learning parameter, and where the method further comprises adjusting the iterative learning parameter based on the torque error value and an additional torque error value. The actions include determining a value of a torque to apply to the rotational joint comprises based on a neuromuscular model. The actions include determining a value of a torque to apply to the rotational joint based on one or more measured electromyography signals. A gain of the feed-forward response portion is greater than a gain of the feedback response portion.

In some implementations, the actions include measuring a plurality of torques; measuring a plurality of angles of rotation of the rotational joint; determining a plurality of torque error values for the plurality of torques; generating an array of torque-angle pairs by associating each measured angle of rotation with a determined torque error of the plurality; calculating a gain parameter for each torque-angle pair in the array of torque-angle pairs; and determining the second portion of the second torque using the gain parameter for each torque-angle pair.

In some implementations, the actions include measuring a plurality of torques; determining a plurality of torque error values for the plurality of torques; generating an array of torque-time pairs by associating each determined torque error value with a cycle time; calculating a gain parameter for each torque-time pair in the array of torque-time pairs; and determining the second portion of the second torque using the gain parameter for each torque-time pair. The measurement of a first torque comprises a measurement of a strain on one or both of the first component and the second component.

In some implementations, controlling the motor to apply the second torque to the rotational joint by the cable comprises controlling one or both of a position of the motor or a velocity of the motor. The cable is in series with a spring, and where a spring stiffness of the spring is tuned to reduce a torque error value relative to the torque error value that occurs independent of the spring stiffness being tuned.

In some implementations, the first component and the second component are portions of a multi joint exoskeleton, and where the actions further include receiving a measurement of a third torque applied to a second rotational joint coupling a third component to a fourth component, the third torque being applied by a second motor via a second cable; determining, based on the measurement of the third torque, a first portion of a fourth torque to apply to the second rotational joint; determining, based on the measurement of the third torque, a second portion of the fourth torque to apply to the second rotational joint; determining a value of the fourth torque to apply to the second rotational joint based on the first portion and the second portion; and controlling the second motor for applying the fourth torque to the second rotational joint via the second cable.

This document describes a system including a rotational joint that couples a first component and a second component; a cable connected to one or more of the first component and the second component; a motor coupled to the cable, the motor configured to apply a torque to the rotational joint by the cable; and a motor controller configured for communication with the motor, the motor controller further configured to control the torque applied to the rotational joint by the cable by performing operations including: measuring a first torque applied by the cable to the rotational joint; determining, based on the first torque, a first portion of a second torque to apply to the rotational joint; determining, based on the first torque, a second portion of the second torque to apply to the rotational joint; determining a value of the second torque to apply to the rotational joint by combining the first portion and the second portion; and controlling the motor to apply the second torque to the rotational joint by the cable.

In some implementations, the first portion of the second torque to apply to the rotational joint includes a feedback response portion, the feedback response portion being a first function of a value of a torque error value. In some implementations, the first function comprises a proportional response component. In some implementations, the first function further comprises an integral component and a damping component.

In some implementations, the second portion of the second torque to apply to the rotational joint is a feed-forward response portion, the feed-forward response portion being a second function of the value of the torque error value, the second function being different from the first function. In some implementations, the second function comprises an iterative learning parameter, and where the motor controller is configured to adjust the iterative learning parameter based on the torque error value and an additional torque error value.

In some implementations, the operations include determining a value of a torque to apply to the rotational joint based on a neuromuscular model. In some implementations, the operations include determining a value of a torque to apply to the rotational joint based on one or more measured electromyography signals. In some implementations, a gain of the feed-forward response portion is greater than a gain of the feedback response portion.

In some implementations, the system includes an optical encoder configured to measure an angle of rotation of the rotational joint. The operations further include measuring a plurality of torques; measuring a plurality of angles of rotation of the rotational joint; determining a plurality of torque error values for the plurality of torques; generating an array of torque-angle pairs by associating each measured angle of rotation with a determined torque error of the plurality; calculating a gain parameter for each torque-angle pair in the array of torque-angle pairs; and determining the second portion of the second torque using the gain parameter for each torque-angle pair.

In some implementations, the operations further comprise: measuring a plurality of torques; determining a plurality of torque error values for the plurality of torques; generating an array of torque-time pairs by associating each determined torque error value with a cycle time; calculating a gain parameter for each torque-time pair in the array of torque-time pairs; and determining the second portion of the second torque using the gain parameter for each torque-time pair. In some implementations, measuring the torque comprises measuring a strain on one or both of the first component and the second component.

In some implementations, controlling the motor to apply the second torque to the rotational joint by the cable comprises controlling one or both of a position of the motor or a velocity of the motor. In some implementations, the cable is in series with a spring, and where a spring stiffness of the spring is tuned to reduce a torque error value relative to the torque error value that occurs independent of the spring stiffness being tuned.

In some implementations, the system includes a third component and a fourth component, and the operations further include receiving a measurement of a third torque applied to a second rotational joint coupling a third component to a fourth component, the third torque being applied by a second motor via a second cable; determining, based on the measurement of the third torque, a first portion of a fourth torque to apply to the second rotational joint; determining, based on the measurement of the third torque, a second portion of the fourth torque to apply to the second rotational joint; determining a value of the fourth torque to apply to the second rotational joint based on the first portion and the second portion; and controlling the second motor for applying the fourth torque to the second rotational joint via the second cable.

In some implementations, the operations include receiving a measurement of a first torque applied to a rotational joint coupling a first component to a second component, the first torque being applied by a motor via a cable; determining, based on the measurement of the first torque, a first portion of a second torque to apply to the rotational joint; determining, based on the measurement of the first torque, a second portion of the second torque to apply to the rotational joint; determining a value of the second torque to apply to the rotational joint by combining the first portion and the second portion; and sending a signal for controlling the motor for applying the second torque to the rotational joint via the cable.

In some implementations, the system includes a rotational joint that couples a foot portion of an exoskeleton and a shank portion of the exoskeleton; a Bowden cable connected to one or more of the foot portion and the shank portion; a motor coupled to the Bowden cable, the motor configured to apply a plantarflexion torque to the rotational joint by the Bowden cable; and a motor controller configured for communication with the motor, the motor controller further configured to control the plantarflexion torque applied to the rotational joint by the Bowden cable by performing operations including: measuring a first plantarflexion torque applied by the Bowden cable to the rotational joint; determining, based on a first plantarflexion torque, a feedback portion of a second plantarflexion torque to apply to the rotational joint, where the feedback portion is proportional to a first plantarflexion torque error value and is proportional to a velocity of the motor; determining, based on the first plantarflexion torque, a feed-forward portion of the second plantarflexion torque to apply to the rotational joint, where the feed-forward portion is based on an iterative learning parameter; determining a value of the second plantarflexion torque to apply to the rotational joint based on the feedback portion and the feed-forward portion; and controlling the motor to apply the second plantarflexion torque to the rotational joint by the Bowden cable.

DETAILED DESCRIPTION

Figure 1:
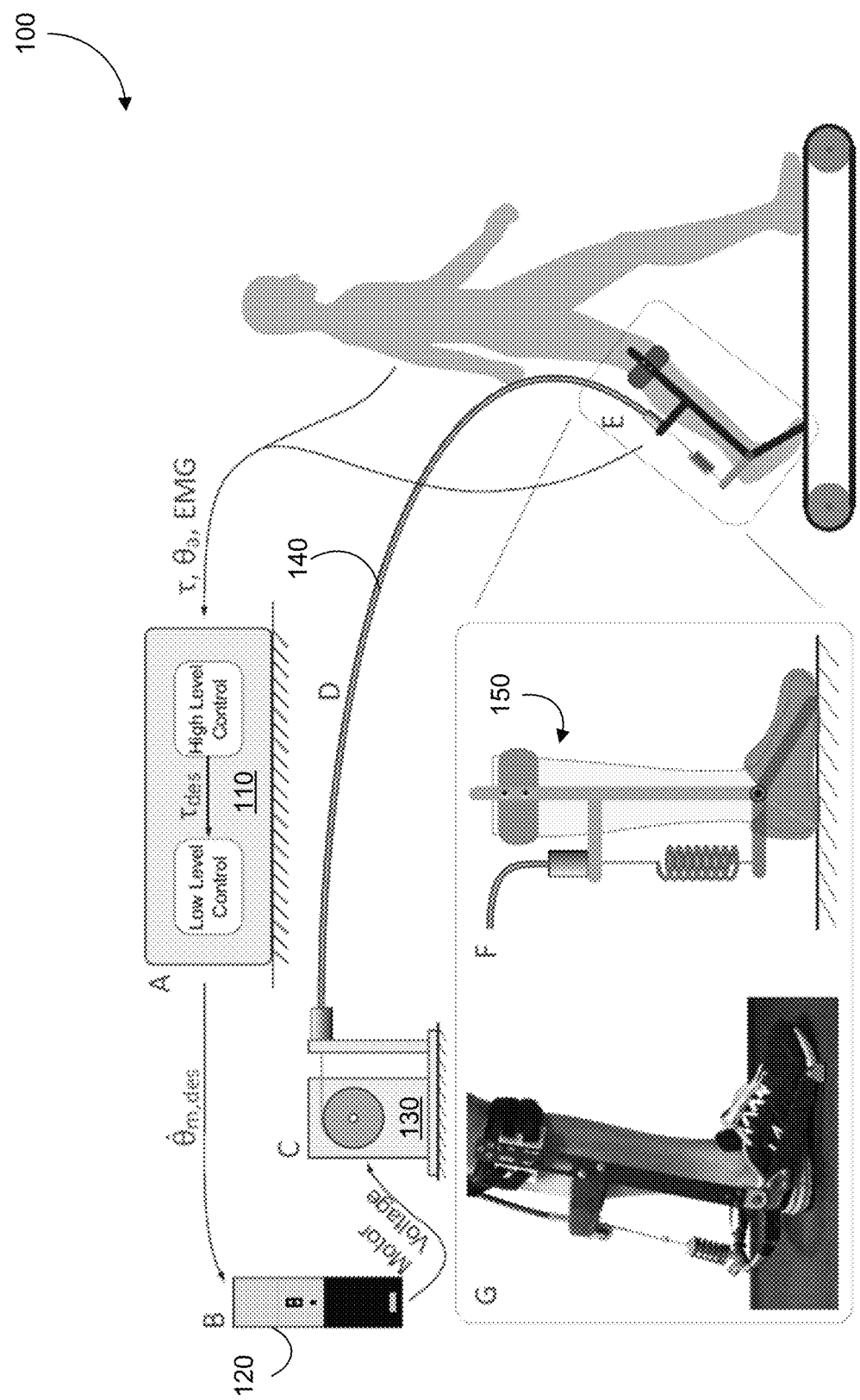
FIG. 1 shows an example exoskeleton system.

The development of exoskeletons for performance enhancement or restoration has been an area of active research for more than fifty years. Most early exoskeletons used kinematic trajectory control, an approach that persists today. However, position control strategies tend to result in less safe and less comfortable human-robot interactions, since they can cause large forces to develop when human and robot motions differ. Position-controlled exoskeletons can also be less effective in rehabilitation compared to traditional human-based therapies.

Increasingly, exoskeleton control has shifted from kinematic methods to strategies that respond more fluidly to actions of the user. One reason for this shift is the concern for human safety and comfort. Another driver is an improved understanding of the natural dynamics of human motion, which suggests a more dynamic approach to human-robot interactions than afforded by position control.

One method for improved interaction between humans and exoskeletons is impedance manipulation, in which the reaction of a robot to external forces is regulated rather than the resulting position trajectory. Whereas position control strategies typically impose high impedance to improve trajectory tracking performance, this method allows lower impedance at the robot interface and a greater influence of human actions on the resulting motions.

Direct control of interaction forces or torques can also be used to reduce human-robot interface impedance. Torque control provides a simple means of manipulating the flow of energy from the exoskeleton to the human, which can be useful in biomechanics studies. Torque control can also be used to exploit passive dynamics or render virtual systems with alternate dynamics in humanoid robots, active prostheses, and exoskeletons. In exoskeletons, the quality of torque control is a limiting factor in precision of the applied intervention and can be the limiting factor in human-exoskeleton system performance.

Series elastic actuation can improve torque control in exoskeletons, which often include unknown, changing human-exoskeleton interaction dynamics. Elasticity in the actuator transmission decouples motor inertia from the exoskeleton frame, physically reducing interface impedance and resulting in smaller torques when human and exoskeleton motions unexpectedly diverge. Series elastic actuation can thereby provide improved human safety and improve torque tracking performance in the face of complex, dynamic user movements. Unlike direct-drive actuators, torque output in a series elastic actuator is usually not directly related to motor torque, but instead to the position of the motor relative to the joint. Motor position is therefore better correlated to load torque, especially in the presence of transmission friction. For these reasons, series elastic actuators with a motor drive running in velocity mode typically have lower actuation impedance and smoother torque tracking with lower error.

Flexible Bowden cable transmissions can be in exoskeletons to further reduce physical impedance through drive relocation. Bowden cables allow massive motor and gearbox elements to be placed in more desirable locations than the joint they actuate, resulting in reduced exoskeleton inertia. Motors can be moved proximally on the limb or body or off the body altogether. Bowden cables are flexible, producing little interference with joint motion, but have complex stick-slip transmission dynamics that pose additional torque control challenges.

Unidirectional Bowden cables can completely physically isolate the human from motor inertia when desired. The capacity to become transparent, or produce zero impedance, is desirable in exoskeletons, as it is frequently useful to apply precisely zero torque to the human. Unidirectional Bowden cables can be kept slack, preventing any torque from being transmitted regardless of human dynamics. However, allowing the transmission to become slack introduces complex dynamics and uncertainty during re-engagement, as in other systems with intermittent contact, which can make torque control more difficult.

The human ankle produces more than half of the mechanical work of the lower limbs during walking and has been a frequent target for exoskeleton assistance. In fact, ankle joint assistance has led to the first systems that reduce the energy cost of walking for humans, including one device that does so passively. Improved torque control at exoskeleton ankle joints would provide immediate benefits for such systems, and could also be beneficial at exoskeleton knee and hip joints.

Torque control can be found at a low level in exoskeleton control hierarchies, with higher level controllers determining behaviors and commanding desired torques. In such schemes, desired torque is not a control objective selected in advance, but rather a mid-level signal, often with complex dynamics that reflect interactions with the human user. This document describes the class of control elements that generate desired torque as high-level controllers, and the elements that enforce desired torque (the torque controllers) as low-level controllers. Since the dynamics of the desired torque signal depend on the high-level control type, interactions with low-level controllers will affect torque tracking performance.

Many potential low-level control elements have been proposed for tracking torque and position in exoskeletons and series elastic actuators. Prominent categories of torque control include classical feedback, model-based control, adaptive control and iterative learning.

Classical proportional-integral-derivative (PID) feedback control, and simple variations thereon, have been widely employed in exoskeletons due to their simplicity and ease of tuning. Integral control elements are used to reduce steady state errors in series elastic actuators with consistent dynamics and low impedance. Integration-free proportional-derivative (PD) control is often used in high-impedance exoskeletons and in series elastic actuators with more modeling uncertainties. In cases where the derivative of the error signal is noisy, damping injection, or negative feedback on a less noisy velocity in the system, can be used instead to provide similar stabilizing effects. Gain scheduling is sometimes used in the control of robots that interact with humans for improved safety or training efficiency.

Model-based control elements are often used in robots and exoskeletons to improve torque-tracking performance. Approaches typically include feed-forward terms that use inverted plant dynamics to shape impedance or torque. This approach works best with an accurate model of the system.

One example of adaptive control that has been applied to human-robot interaction is passivity-based control. These controllers manipulate the energy balance of the system using a system model and adaptive control elements, and can improve tracking performance with provable closed-loop stability. Passivity-based control has been proposed for series elastic actuators and used during human-robot interactions.

Variations on iterative learning derived from industrial robots have also been applied to lower-limb exoskeletons during walking. This approach improves tracking performance by exploiting the cyclic nature of gain; tracking errors from past walking steps are used to predict errors in the ensuing step, and feed-forward corrections are applied. Since corrections are based on an accumulation of past errors, this approach bears some resemblance to classical integral control, with errors integrated over discrete walking steps rather than continuously in time.

High-level controllers intended to assist human walking include schemes that command desired torque based on time, joint angle, neuromuscular models, and electromyographic measurements. Perhaps the simplest way to generate desired torques is as a function of time, which can be used to regulate the relative timing of human and exoskeleton actions. Another common method is to imitate observed relationships between human joint angles and joint torques, which can be especially useful in regulating net joint work. Virtual neuromuscular systems with complex internal dynamics have also been used to generate desired joint torques in assistive devices. This method has demonstrated benefits in the control of adaptive prosthetic limbs. Direct neuromuscular interfaces, such as through electromyographic measurement of muscle activity, promise more intuitive control of exoskeletons by users. Each of these high-level control approaches may be advantageous in some assistance paradigm, and each results in desired torque signals with different dynamics.

Many approaches to exoskeleton torque control have been established, but a more complete comparison would be helpful when designing controllers for new lower-limb exoskeleton systems. The classical feedback, model-based, adaptive and iterative learning control approaches reviewed in this section all have strengths for human-robot interaction. Several of these controllers have been tested in lower-limb exoskeletons and shown good performance. Comparisons across studies are made difficult, however, due to differences in protocol, performance metrics, hardware, and high-level controllers. Some results are reported for bench top tests, which may provide more positive results than during complex interactions with humans. Some results are not reported quantitatively, which makes comparisons difficult. In some cases, a small number of controllers have been tested on the same hardware, but in most cases torque tracking results are provided for a single controller working with a single system. This makes comparisons across studies difficult, since some portion of the differences in performance may be due to differences in the capability of the hardware used. Similarly, comparisons have been performed with different high-level controllers, which could interact with low-level controllers and contribute to differences in performance across studies. Studies comparing a wide range of torque controllers in human-interaction protocols with quantitative performance metrics, consistent hardware set-ups and consistent high-level controllers would help establish guide-lines for selecting and tuning controllers for new lower-limb exoskeletons.

A system compares the tracking performance of prominent torque control methods, with multiple high-level desired torque conditions, in a single lower-limb exoskeleton platform, during human walking. Promising methods using classical feedback, model-based, adaptive and iterative learning control elements were used. The chosen controllers span the set of candidate methods and provide a more comprehensive test than previously available. A diverse sample of high-level controllers were used to test for interactions with low-level control dynamics and provide insights into the generality of tracking results. A single exoskeleton system was used, to control for hardware capabilities. It was not practical to test multiple exoskeletons. however, and so results might be specific to hardware systems with similar properties. Tests were conducted while a human wore the exoskeleton and walked on a treadmill, making results relevant to conditions with complex human-robot interactions. These results to help guide the selection and tuning of torque control elements particularly in lower-limb exoskeletons for locomotion assistance.

FIG. 1 shows an example exoskeleton system 100. A high speed stand-alone real-time motor controller 110 reads sensory information, computes desired torques, computes desired motor velocity using low level controller, and outputs desired motor velocity to the motor drive. The system 100 includes a dedicated motor drive 120. The system 100 includes an off-board geared motor 130 and pulley. The system 100 includes a Bowden cable 140 transmission. The system 100 includes an ankle exoskeleton 150, e.g., as described in Witte, Zhang, Jackson, Collins, *Design of Two Lightweight, High-Bandwidth Torque-Controlled Ankle Exoskeletons*, 2015 *IEEE International Conference on Robotics and Automation*, p. 1223-1228, incorporated herein in entirety.

The motor controller 110 is configured to perform one or more of at least nine torque control methods. The torque control methods include combinations of classical feedback control, model-based control, adaptive control and iterative learning, as well as model-free and model-based feedback and feedforward control. Each low-level torque controller was tested with four high-level walking controllers that set desired torque based on time, ankle angle, a neuromuscular model, or electromyographic measurements. The motor controller 110 can be implemented on a tethered ankle-foot exoskeleton with series-elastic actuation driven by a unidirectional Bowden cable and tuned to minimize error. The exoskeleton can be worn by a subject who walks on a treadmill for one hundred strides at steady state under each condition, and the root mean squared errors between desired and measured torque are calculated for each stride and for an averaged stride.

The motor controller 110 is a part of a tethered ankle exoskeleton including a real-time control module and geared electric motor, a unidirectional Bowden cable transmission with a series spring, and an exoskeleton frame that interfaced with the human foot and shank. A dedicated real-time control system (e.g., ACEI 103, dSPACE Inc.,) samples sensors at 5000 Hz, filters sensor data at 200 Hz, and generates desired motor velocity commands at 500 Hz. The motor unit can be composed of a low-inertia 1.6 kW AC servo motor and a 5:1 planetary gear, with input voltage regulated by a motor driver running in velocity control mode (e.g., BSM90N-175AD, GBSM90-MRP120-S and MFE460AOIOB, Baldor Electric Co.). A digital optical encoder (e.g., E4, US Digital Corp.) measures motor position. As an indication of motor module performance, the 100% rise time to peak motor velocity can be 0.013 s.

A flexible unidirectional Bowden cable transmits forces from the motor to the exoskeleton frame while minimally restricting leg motions. The cable can be composed of a coiled-steel outer conduit (e.g., 415310-00, Lexco Cable Mfg.) and a 0.003 m diameter Vectran® inner rope, and can be approximately 2 m in length. A series spring (e.g., DWC-148M-12, Diamond Wire Spring Co.) with an effective stiffness of 190 N·m·rad$^{-1}$ (in terms of ankle rotation) can be attached at the end of the rope to provide increased compliance.

The exoskeleton frame applies forces on the front of the shank component below the knee, beneath the heel, and beneath the toe, so as to generate an ankle plantarflexion torque in proportion to transmission force. Torque is measured using strain gauges (e.g., MMF003129, Micro-Measurements) applied in a full Wheatstone bridge on the heel lever, with 1000 Hz signal conditioning (e.g., CSG110, Futek Inc.). Joint angle is measured using a digital optical encoder (e.g., ES, US Digital Corp.). For one of the high-level controllers, gastrocnemius muscle activity can be measured using a wired electromyography system (e.g., Bagnoli 4 EMO System, Delsys Inc.).

Figure 2:
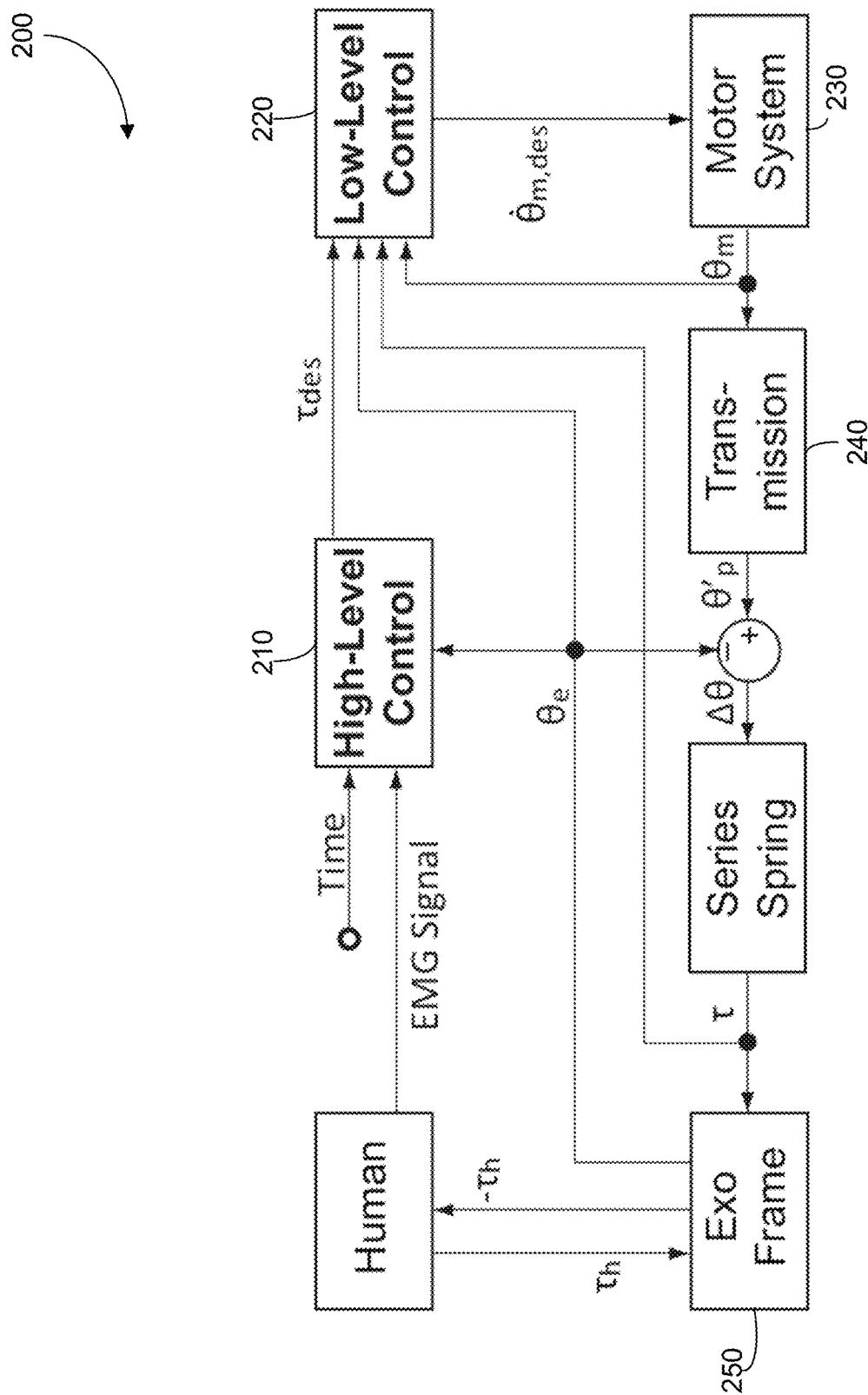
FIG. 2 shows a diagram of the exoskeleton system.

FIG. 2 shows a diagram of an exoskeleton system 200 including high-level and low-level controllers 210, 220, motor 230, transmission cable 240, and exoskeleton frame 250. The high-level controller uses time, $\tau$, exoskeleton joint angle, $\Theta_e$, or electromyography, EMG, to determine desired torque. The low-level controller regulates torque, using desired torque, $\tau_{des}$, measured torque, $\tau$, motor angle, $\Theta_m$, and/or exoskeleton angle to command desired motor velocity, $\Theta_{m,des}$. A hardware motor driver regulates motor velocity. Motor rotations are transmitted through a Bowden cable to one end of a series spring. Together with exoskeleton rotation, this determines spring deflection, which in turn generates exoskeleton torque. Both the user and the series spring exert torques on the exoskeleton frame, the balance of which causes exoskeleton rotation.

The following models of system components can be used to make reasonable choices for model-free control elements and design model-based control elements. For motor dynamics, assuming armature inductance dynamics occur at a substantially higher frequency than rotor dynamics, and therefore have negligible effects, the dynamics of the motor can be written as:

$$\begin{cases} K_a \cdot i_a = I_e \cdot N \cdot \ddot{\theta}_p + f_e \cdot N \cdot \dot{\theta}_p + \frac{1}{N} \cdot \tau_o, \\ V_a(t) = R_a \cdot i_a(t) + K_b \cdot N \cdot \dot{\theta}_p(t) \end{cases} \quad (1)$$

in which $K_\alpha$ is the motor-torque constant, $i_\alpha$ is the armature current, $I_e$ is the effective moment of inertia of the motor and gear referred to the motor shaft, $N=\Theta_m/\Theta_p$ is the gear ratio, $\Theta_m$ is the angular position of the motor shaft, $\Theta_p$ is the angular position of the gear output shaft, $f_e$ is the effective viscous friction coefficient of the combined motor and gear referred to the motor shaft, $\tau_0$ is output torque at the gear output pulley, $V_\alpha$ is the armature voltage, $R_\alpha$ is the armature resistance, and Kb is the motor voltage constant.

The Bowden cable is modeled as shown below. The pulley transmits load to the Bowden cable as:

$$\tau_0 = F \cdot r_p \quad (2)$$

in which $r_p$ is the radius of the pulley attached to the gear output and F is the tension in the cable on the motor side of the conduit. Making the simplifying assumption that there is no friction in the Bowden cable, the torque at the exoskeleton side of the transmission is:

$$\tau = F \cdot r_\alpha \quad (3)$$

in which $r_\alpha$ is the lever arm at the ankle joint. The angular excursion of the ankle joint is small, and that the lever arm is therefore approximately constant.

For modeling the force-position relationship, the following model can be used. By modeling the Bowden cable as having either spring-like compliance or negligible compliance compared to the series spring, force is:

$$F = K_c \cdot (r_p \theta_p - r_\alpha \cdot \theta_e) \quad (4)$$

in which $K_e$ is the total effective stiffness of the Bowden cable transmission and series spring and $\Theta_p$ and $\Theta_e$ are the pulley and exoskeleton joint angles relative to a position at which the Bowden cable begins to go slack.

For modeling the torque-angle relationship, the gear ratio of the transmission, R, is defined as:

$$R = \frac{r_a}{r_p} \qquad (5)$$

and the torque applied by the exoskeleton can be written as:

$$\tau = F \cdot r_a \qquad (6)$$

$$= r_p \cdot r_a \cdot K_c \left[ \theta_p - \frac{r_a}{r_p} \theta_e \right]$$

$$= K_t (\theta_p - \theta_e R)$$

with transmission stiffness, $K_t$, defined as:

$$K_t = r_p \cdot r_a \cdot K_c \qquad (7)$$

relating torque at the exoskeleton to the angles of the motor output pulley and exoskeleton joint.

Device joint dynamics are modeled by applying Newton's Second Law to the exoskeleton:

$$\tau - \tau_h - B_e \cdot \dot{\theta}_e = I_e \cdot \ddot{\theta}_e \qquad (8)$$

where $\tau_h$ is the torque applied to the exoskeleton by human body, Be is the exoskeleton joint damping coefficient, and $I_e$ is the moment of inertia of the exoskeleton.

Motor velocity control dynamics are modeled as shown below. The motor and commercial motor driver are operated in a velocity control mode, which results in lower actuation impedance and better torque tracking in series elastic actuators. The precise relationship between desired motor velocity, $\Theta_{m,des}$, and input voltage to the motor, $V_a$ was:

$$V_a = \frac{R_a I_e N}{K_a} \ddot{\theta}_p + \left( \frac{R_a f_e N}{K_a} + K_b N \right) \dot{\theta}_p + \frac{R_a}{K_a} \tau_o \qquad (9)$$

$$= \frac{R_a I_e}{K_a} \ddot{\theta}_m + \left( \frac{R_a f_e}{K_a} + K_b \right) \dot{\theta}_m + \frac{R_a}{K_a} \tau_o$$

Setting the angular acceleration to zero, this reduces to:

$$V_a = \left( \frac{R_a f_e}{K_a} + K_b \right) \dot{\theta}_m + \frac{R_a}{K_a} \tau_o. \qquad (10)$$

For most motors, the contribution of armature resistance to voltage drop is small at moderate speeds. The voltage is:

$$V_a = \left( \frac{R_a f_e}{K_a} + K_b \right) \dot{\theta}_m, \qquad (11)$$

and input voltage and motor velocity are linearly related at moderate, steady speed.

Figure 3:
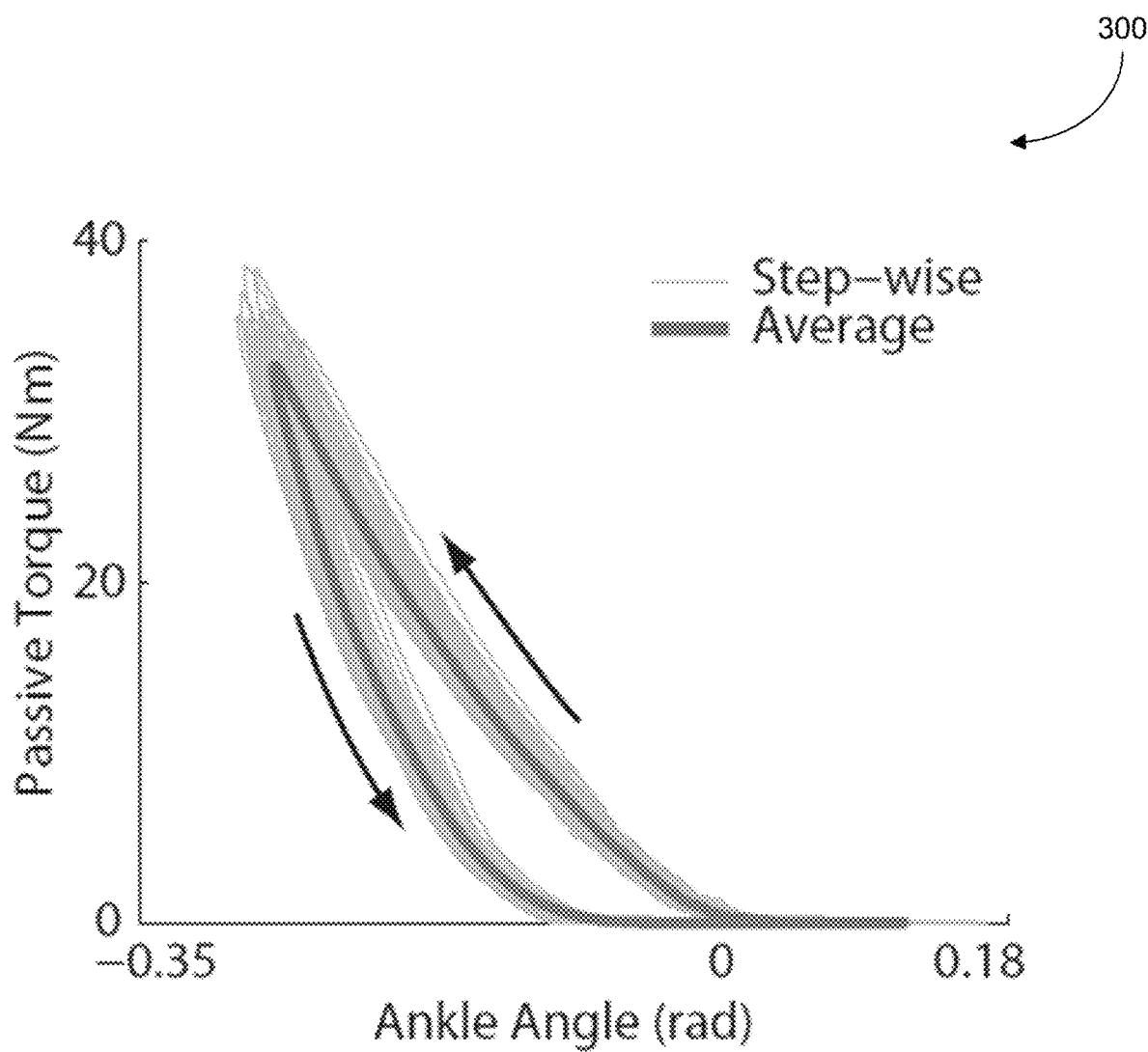
FIG. 3 shows a passive torque-vs-angle curve.

While the dynamic models described by Eq. (1)-(8) capture the basic properties of the system, they do not address its full complexity. There are still uncertain or changing dynamics that are difficult to model, which contribute to most of the challenges of the control problem that are solved by the exoskeleton system 100. For example, the Bowden cable nonlinearities and stiction causes uncertainties. For simplicity, the Bowden cable is modeled as a frictionless linear spring, but its stiffness is actually nonlinear and there are substantial frictional effects. The cable is stiffening, exhibiting greater local stiffness at high loads. This can be seen in the torque versus ankle angle curves generated by fixing the motor and passively flexing the exoskeleton during walking, as shown in graph 300 of FIG. 3. The cable warms over the course of a many strides, which decreases its overall stiffness. The cable exhibits creep, which increases the slack length. If the cable is allowed to go slack, the state corresponding to re-engagement is uncertain. There is substantial friction in the cable, including dissipation with characteristics of Coulomb friction, viscous damping, and stiction, some of which are visible in FIG. 3. The cable heats over the course of many strides, which increases overall friction. Stiction leads to sudden changes in cable force, and propagation of the slipping point along the cable makes these changes unpredictable. These transmission properties are complex, nonlinear and time varying. For graph 300, complex torque is shown against exoskeleton ankle joint angle relationship when motor position was fixed and the exoskeleton was passively flexed for one hundred strides.

Figure 4:
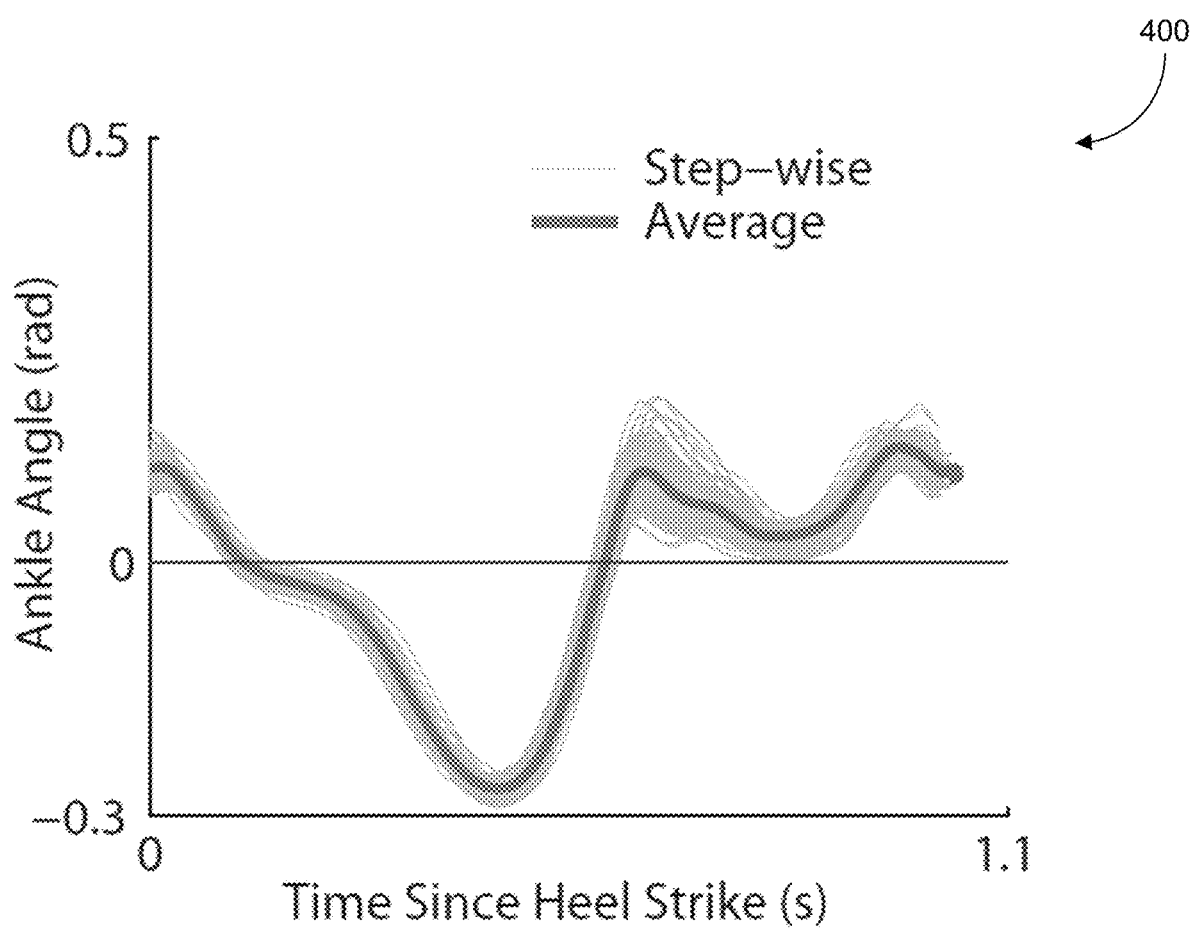
FIG. 4 shows an example of ankle joint angle patterns.

The exoskeleton frame contacts the soft tissues and muscles of a user's body using flexible straps. This interface is complex and nonlinear, with low overall impedance. For example, muscle activity beneath the straps substantially affects stiffness and damping at the interface. Straps may also shift on the limb, altering lever arms and engaging different tissues. Human kinematics, kinetics and underlying neural and muscular activity also vary in time and across steps. Graph 400 of FIG. 4 shows the variations in ankle joint angle curves over many steps, even when the motor is fixed. For example, graph 400 shows variability in exoskeleton ankle joint angle trajectory during one hundred strides of walking with the motor fixed and the exoskeleton passively flexing.

Delays in generating desired motor position also pose a control challenge. A portion of these delays can come from communication between subsystems. For example, in the hardware used in this system there was a 6 ms closed-loop communication delay. Another effective delay comes from accelerating the motor rotor. The motor velocity rise time was about 7 ms. These delays cause feedback controllers to become unstable as gains are increased, limiting closed-loop performance. The low-level torque controller accommodates these complex, nonlinear, time-varying system features.

Torque tracking performance varies for different prominent low-level torque control methods. Low-level controllers are selected based on prominence in the literature, expected performance based on system modeling, and the results of pilot testing. The controllers include model-free and model-based feedback and feedforward elements. Desired torque was set with each of four high-level exoskeleton control strategies, chosen based on prominence in the literature. High-level controllers set desired torque based on time, joint angle, a neuromuscular model or electromyography.

The torque control system includes motor velocity control performed by a dedicated hardware motor controller. Series elastic actuators with a drive running in velocity mode typically have lower actuation impedance and smoother torque tracking with lower error than when torque is commanded to the drive. With series elastic actuation, controlling motor velocity is similar to controlling the rate of change of exoskeleton torque, since torque is approximated by the product of series stiffness and the difference between motor angle and exoskeleton joint angle (Eq. 6). Desired motor velocity is calculated as:

$$\dot{\Theta}_{m,des} = \frac{1}{T} \cdot \Delta\theta_{m,des} \quad (12)$$

$$= \frac{N}{T} \cdot \Delta\theta_{p,des}$$

where $\Theta_{m,des}$ is commanded motor velocity, T is a gain related to rise time, $\Delta\Theta_{m,des}$ is desired change in motor position, N is the motor gear ratio, and $\Delta\Theta_{p,des}$ is desired change in pulley position, determined by one of the low-level torque controllers described below. The value of T was tuned so as to minimize motor position rise time without causing oscillations during torque tracking.

Model-Free Feedback Control

The first group of torque controllers used model-free feedback control, comprising variations on classical proportional-integral-derivative control. Gains are tuned systematically using model-free procedures. Four low-level controllers are compared, L1-L4.

L1: Proportional Control with Damping Injection (PD*)

This controller is analogous to classical proportional-derivative control of torque, with damping injection on motor velocity taking the place of the derivative term:

$$\Delta\theta_{p,des} = -K_p \cdot e_\tau - K_d \cdot \dot{\theta}_p \quad (13)$$

where $K_p$ is a proportional gain, $e\tau = \tau - \tau_{des}$ is torque error, r is measured exoskeleton torque, $\tau_{des}$ is desired exoskeleton torque, $K_d$ is a damping gain, and $\Theta_p$ is measured velocity of the motor pulley. The damping term can be more effective than a term with the derivative of torque error. Torque is measured with analog strain gauges, which included substantial noise, while pulley position is measured with a digital encoder. Damping is placed on motor pulley velocity alone rather than the relative velocity between the motor pulley and the exoskeleton joint. Using relative velocity can be less effective, likely due to the irregular effects of stiction in the Bowden cable transmission on ankle joint velocity.

L2: Proportional Control with Damping Injection and Error-Dependent Gains (PD*+EDG)

This controller is identical to L1, with the exception that the proportional gain is error-dependent and increased with torque error:

$$K_p^* = \min\left(\left\lceil \frac{|e_\tau|}{h_\tau} \right\rceil \cdot h_k, K_{max}\right) \quad (14)$$

$$\Delta\theta_{p,des} = -K_p^* \cdot e_\tau - K_d \cdot \dot{\theta}_p$$

where the symbol [•] denotes the ceiling operation, $K^*_p$ is the error dependent proportional gain, $h_\tau$ and $h_k$ are torque error and proportional gain step sizes, and $K_{max}$ is the maximum allowable gain. This is similar to performing proportional control on the square of the torque error, with a sign and gain adjustment. This type of gain scheduling is expected to result in slower corrections, and fewer oscillations, when torque tracking errors are small.

L3: Proportional Control with Damping Injection and Previous-Error Compensation (PD*+PEC)

This controller is identical to L1, except that desired torque is altered based on torque error from the previous instant in time as:

$$\tau'_{des} = \tau_{des} - e_{\tau,prev}$$

$$\Delta\theta_{p,des} = -K_{pec} \cdot (\tau - \tau'_{des}) - K_d \cdot \dot{\theta}_p \quad (15)$$

where $\tau'_{des}$ is the compensated torque error and $e_{\tau prev}$ is the torque error from the previous time step. $K_{pec}$ is a proportional gain. This approach is expected to increase the control response to large errors. It bears some similarity to integral control, in that it includes a term on prior error, but differs in that only the prior error at the previous sampling time is used rather than the entire time history. In cases where torque error changes slowly, this approach equates to doubling the proportional gain.

L4: Proportional-Integral Control with Damping Injection (PID*)

This controller was analogous to classical proportional-integral-derivative control, with damping injection substituted for the derivative term:

$$\Delta\theta_{p,des} = -K_p \cdot e_\tau - K_i \int_{t_0}^{t} e_\tau dt - K_d \dot{\theta}_p \quad (16)$$

where $K_i$ is the gain on the integral of torque error, $t_0$ is the time at which the stride began, and t is the present time. Integral control eliminates steady-state error by accumulation of control input (see e.g., Pratt et al., 2004; Wyeth, 2006; Vallery et al., 2007).

Model-Based Feed-Forward Control

Many systems with series elastic actuators can use an inverse dynamics model of the series spring as a feed-forward control element, typically added to a model-free feedback component.

L5: Proportional Control with Damping Injection and Model-Based Compensation (PD*+M)

This controller includes both the classical feedback controller of L1 and a model-based feedforward term, which anticipates changes in desired motor position due to either changes in exoskeleton joint angle or changes in desired joint torque:

$$\Delta\theta_{p,des} = -K_p \cdot e_\tau - K_d \cdot \dot{\theta}_p + (\theta_{mdl} - \theta_P)$$

$$\theta_{mdl} = \Theta_e \cdot \tilde{R} - \tau_{des} \cdot \tilde{K}_t^{-1} \quad (17)$$

where $\Theta_{mdl}$ is a model-based motor position compensation generated from Eq. (6), $\Theta_p$ is measured motor pulley position, $\Theta_e$ is measured exoskeleton ankle joint angle, $\tilde{R}$ is the estimate of R as defined in Eq. (5), or the ratio of the exoskeleton lever arm to the motor pulley radius, and $\tilde{K}_t$ is an estimate of $K_t$, which is the total stiffness of the tether, series spring, and other structures between the motor pulley and exoskeleton joint as defined by Eq. (7). This is an inverse dynamics approach similar to computed torque and feedback linearization in nonlinear control. If desired torque remains constant but the exoskeleton joint moves, the motor needs to move in proportion. If the joint is stationary but desired torque changes, the motor moves a predetermined amount to obtain the desired change in torque.

In some implementations, a change in pulley angle, rather than absolute pulley angle, was anticipated based on the rate of change in exoskeleton angle and the rate of change in desired torque. This approach was less stable, owing to the effects of Bowden cable stiction on exoskeleton joint angle and the interplay between user behavior and desired torque through the high-level controller.

Model-Based Feedback Control

Adaptive control approaches have the capacity to exploit additional knowledge of system dynamics and allow theoretical tests of stability and performance. A new adaptive controller was developed for this system using a passivity-based approach, L6.

L6: Passivity-Based Adaptive Control (PAS)

Combining the dynamics of the subsystems described by Eqs. (1)-(8) and eliminating F and $i_a$, shows the following dynamics of the system:

$$\ddot{\tau} + K_1 \dot{\tau} + K_2 \tau + S_\theta \dot{\theta}_e = K_V V_a + K_h \tau_h \quad (18)$$

in which $\tau$ denotes the torque transmitted to the exoskeleton from the motor, $\Theta_e$ denotes the exoskeleton joint angle, $V_a$ is the voltage applied to the armature of the motor, and $\tau_h$ denotes the torque applied to exoskeleton by human body. $K_V$, $K_1$, $K_2$ and $K_h$ are positive gains expressed as:

$$K_V = \frac{r_a r_p K_a K_c}{I_e N R_a}$$

$$K_1 = \frac{1}{I_e}\left(\frac{K_a K_b}{R_a} + f_e\right)$$

$$K_2 = \frac{r_p^2 K_c}{N^2 I_e} + \frac{r_a^2 K_c}{I_e}$$

$$K_h = \frac{r_a^2 K_c}{I_e},$$

and $S_\Theta$ is a gain expressed as:

$$S_\theta = \left[\frac{r_a^2 K_c}{I_e}\left(\frac{K_a K_b}{R_a} + f_e\right) - \frac{r_a^2 K_c B_e}{I_e}\right]$$

with definitions of constants provided in Section 2.2. Based on the system model in Eq. (18), a new, provably stable, adaptive controller for the system is shown. The system defines the controller as:

$$V_a = -K_p \cdot e_\tau - K_s \cdot s + Y_d(\tau, \dot{\tau}_r, \ddot{\tau}_r, \dot{\theta}_e) \cdot \bar{\Gamma} - K_{sw} \cdot \text{sign}(s) \quad (19)$$

where $K_p$ and $e_\tau$ are as defined in L1, $K_s$ is the sliding control gain, s is the sliding vector, defined below, $Y_d$ is a regressor, defined below, $\Gamma$ and $\bar{\Gamma}$ are the system parameter vector and its estimate, defined below, and $K_{sw}$ is the switching term gain. The sliding vector s is defined as:

$$s = \dot{\tau} - \dot{\tau}_{des} + \lambda \cdot e_\tau = \dot{\tau} - \dot{\tau}_r$$

where $\lambda$ is a positive scalar and $\tau_r$ is a virtual reference torque. The regressor, $Y_d$, is defined as:

$$s = \dot{\tau} - \dot{\tau}_{des} + \lambda \cdot e_\tau = \dot{\tau} - \dot{\tau}_r$$

and is used to express the dynamics as linear combination of system parameters as:

$$Y_d(\tau, \dot{\tau}_r, \ddot{\tau}_r, \dot{\theta}_e) = [\tau, \dot{\tau}_r, \ddot{\tau}_r, \dot{\theta}_e],$$

The system parameter, $\Gamma$, is defined as:

$$\Gamma = K_v^{-1} \cdot [1 \; K_1 \; K_2 \; S_\theta]^T.$$

With full knowledge of system parameters, or $\bar{\Gamma} = \Gamma$ Eq. (19) describes a model-based computed torque controller. For practical reasons, however, it is difficult to identify the value of $\Gamma$. Therefore, an update law is added to estimate the system parameters, $\bar{\Gamma}$, as follows:

$$\dot{\bar{\Gamma}} = -L Y_d^T s. \quad (20)$$

where L is a symmetric positive definite parameter adaptation gain matrix. This parameter updating process reduces the model-dependency of controller in Eq. (19), because only the structure of the dynamic model is used in the construction of controller.

The closed-loop system with the model-based adaptive controller described by Eqs. (19)-(20) and dynamics described by Eq. (18) is stable and the exoskeleton torque trajectory $\tau$ converges to the desired value of $\tau_{des}$ provided that the human input torque, $\tau_h$, the desired torque trajectory, $\tau_{des}$, and their time derivatives, $\dot{\tau}_h$, $\dot{\tau}_{des}$, and $\ddot{\tau}_{des}$ are bounded. A proof is provided in Appendix A, below.

Better performance can be obtained with this controller by setting the time rate of change in desired torque to zero. In practice, for most high level controllers, the time derivative of desired torque, $\dot{\tau}_{des}$ could not be calculated in advance and contained substantial noise when approximated numerically. Noise on this signal arose from the human measurements used by the high-level controllers to calculate desired torque. The time derivative of torque error, $\dot{e}_\tau$, contains substantial noise, in part due to noise on the analog strain gauge signal and in part due to complex Bowden cable transmission dynamics. Better performance can be obtained using motor output pulley velocity, $\dot{\Theta}_p$ in its place. This substitution is equivalent to assuming that the characteristic time of exoskeleton joint dynamics was much larger than the characteristic time of motor dynamics (Eq. 6). It is also analogous to the use of damping injection in place of derivative control in the other controllers tested. The sliding vector and regressor are therefore approximated as:

$$s \approx \dot{\theta}_p + \lambda \cdot e_\tau$$

$$Y_d \approx [\tau - \lambda \cdot e_\tau - \lambda \cdot \dot{\theta}_p, \dot{\theta}_e]$$

Additionally, it can be more effective to operate the dedicated motor drive in velocity control mode, rather than voltage control mode. This difference in performance is likely due to the faster control loop in the motor driver, which allowed voltage to be changed more frequently and with less delay than for the control system as a whole. Motor velocity is strongly related to applied voltage, since the two are linearly related for a given torque at steady state (Eq. 11). This includes a similar formulation as for all other low-level controllers:

$$\Delta\theta_{p,des} = -K_p \cdot e_\tau - K_s \cdot s + Y_d(\tau, e_\tau, \dot{\theta}_p, \dot{\theta}_e) \cdot \bar{\Gamma} - K_{sw} \cdot \text{sign}(s) \quad (21)$$

Model-Free Feed-Forward Control

Motor controllers can use iterative learning as a feed-forward component, and can improve performance by exploiting the cyclic nature of human gait.

L7: Iterative Learning of Desired Motor Position (LRN)

This controller uses torque error at each instant of one stride to update a feed-forward trajectory of desired motor position for each instant of the next stride. This is a variation on iterative learning, which, more generally, exploits the cyclic nature of a task to compensate complex system dynamics without an explicit model. While walking is not as consistent as the operations of most industrial robots, it is cyclic, which was expected to afford some improvement in torque errors that occurred consistently from stride to stride.

The feed-forward trajectory of desired motor position, $\Theta_{p,des}$, is calculated as:

$$\theta_{p,des}(i, n+1) = \theta_{p,des}(i, n) - K_1 \cdot e_\tau(i, n) \quad (22)$$

where i is the time index or number of control cycles elapsed within this stride, n is this stride and n+1 is the next stride, and $K_1$ is the iterative learning gain. Desired motor position is enforced as:

$$\Delta\theta_{p,des}(i, n) = \theta_{p,des}(i+D, n) - \theta_p(i, n) \quad (23)$$

where D is an estimate of the delay between commanding and achieving a change in motor position. During tuning, both $K_1$ and D were adjusted.

Current torque error thereby updates desired motor position for the same time index on the next stride, while commanded motor velocity at this time index is based on a preview of desired motor position later in the same stride. Since the learned trajectory used in the present step has no dependence on the present torque, this method is feed-forward. However, present motor pulley position measurements are used in generating present motor velocity commands. This method can therefore be viewed as a feed-forward iterative learning control of torque combined with proportional feedback control of motor position.

Forgetting During Leaning

To avoid divergence due to excessive accumulation of ripples during the learning process, a 'forgetting' constant is introduced to Eq. (22) as:

$$\theta_{p,des}(i,n+1)=\beta \cdot \theta_{p,des}(i,n)-K_1 \cdot e_\tau(i,n) \quad (24)$$

where $\beta \in [0, 1]$ is a weight on the learned trajectory. For $\beta=1$, all leaning is retained, zero steady-state off-set is expected, but ripples can form if the value of D is incorrect. For $\beta<1$, torque errors from strides before the last stride have a reduced effect on controller behavior, reducing likelihood of ripple formation, but leading to some steady-state torque offset. For $\beta=0$, iterative learning is disabled. L7 then becomes proportional control based on the torque error delayed by one step, and poor torque tracking performance is expected.

Learning from Filtered Errors

Noise in the error signal leads to inappropriate updates on the learned trajectory, which can excite unstable ripple formation. This excitation can be reduced by filtering the error signal across strides:

$$e_{fit}(i,n)=(1-\mu) \cdot e_{fit}(i,n-1)+\mu \cdot e_\tau(i,n) \quad (25)$$

where $e_{fit}$ is the filtered torque error trajectory, initially an array of zeros, used in place of $e_\tau$ in Eq. (22) and (24), and $\mu \in [0, 1]$ is a weighting term on the learned error. For $\mu=1$, only the error from the last stride is used to update the motor trajectory, resulting in faster convergence but larger effects of sensor noise. For $\mu<1$, errors at this time increment from all prior strides have some effect on the motor trajectory update, resulting in slower but more stable convergence. For $\mu=0$, torque error is not updated, and iterative learning is disabled.

L8: Iterative Learning of Desired Motor Position+Proportional-Damping Compensation (LRN+PD*)

This controller combines iterative learning with proportional-damping feedback control to compensate remaining torque errors. It is a direct superposition of controllers L1 and L7, in which the absolute desired motor position was learned as in L7 and feedback control was applied as in L1:

$$\theta_{p,des}^{LRN}(i,n+1)=\beta \cdot \theta_{p,des}^{LRN}(i,n)-K_1 \cdot e_{fit}(i,n)$$

$$\theta_{p,des}(i,n)=\theta_{p,des}^{LRN}(i+D,n)-K_p \cdot e_\tau(i,n)-K_d \cdot \dot{\theta}_p(i,n)$$

$$\Delta \theta_{p,des}(i,n)=\theta_{p,des}(i,n)-\theta_p(i,n) \quad (26)$$

Combining iterative learning with feedback control results in improved performance compared to either component used in isolation. Iterative learning generates a feed-forward trajectory that tracks torque for an average stride with zero stead-state error regardless of the complexity of the command signal required, but can be susceptible to step-by-step variability. Proportional damping control quickly compensates for small torque errors relative to iterative learning, but can be susceptible to rapid changes in desired or measured torque.

L9: Proportional Control with Damping Injection+Iterative Learning Compensation (PD*+ΔLRN)

This controller is another combination of proportional damping feedback and iterative learning feed-forward control elements. Unlike controllers L7 and L8, the values to be learned are desired changes in motor position instead of absolute desired positions:

$$\Delta \theta_{p,des}^{LRN}(i,n+1)=\beta \cdot \Delta \theta_{p,des}^{LRN}(i,n)-K_1 \cdot e_{fit}(i,n)$$

$$\Delta \theta_{p,des}(i,n)=-K_p \cdot e_\tau(i,n)-K_d \dot{\theta}_p(i,n)+\Delta \theta_{p,des}^{LRN}(i+D,n) \quad (27)$$

This controller is similar to L8, and has similar strengths and weaknesses. Differences in motor position are learned rather than absolute positions, however, which eliminates measured motor pulley position, $\Theta_p$, from the formulation. It is therefore a velocity control approach rather than a position control approach. This may affect stability, drift and the level and source of noise in the learned trajectory, which may in turn affect the allowable gains and speed of convergence. Learning desired changes in position also affects interactions between the feedback and feed-forward elements of the controller in the presence of step-by-step variability. Learned changes in position add the same way regardless of present position and error, while the contribution of learned absolute positions depends upon the present motor position. Either approach can oppose feedback contributions under some conditions, but in different ways. A detailed mathematical comparison of these two approaches is provided in Appendix C.

Several control elements that seemed likely to improve performance in theory did not fare well in pilot tests. This may be due to the unique features of the control problem at hand, in particular the noisy sensory information and the complex, changing dynamics of both the Bowden cable transmission and the human. These approaches were not included in the final data collection.

One such example is the traditional derivative control element:

$$-K_d(\dot{\tau}-\dot{\tau}_{des})$$

which involves the derivative of torque error. Analog noise in the derivative of measured torque limited the magnitude of the derivative gain that could be applied without causing oscillations. This limited the capacity of the derivative term to stabilize the system, in turn limiting the magnitude of the proportional gains that could be applied.

Using the model described by Eq. (6), the system approximated the derivative term as:

$$-K_d[(\dot{\theta}_p-\dot{\theta}_e R)-\dot{\tau}_{des} \cdot \tilde{K}_t]$$

where the relative velocity between the motor and exoskeleton was substituted for the noisy measured torque derivative. The derivative of desired torque is also problematic, however, because it generally cannot be calculated in advance and its numerical approximation online is subject to noise from the human measurements used by the high-level controller to calculate desired torque, for example electromyographic measurements.

A motor controller using just the relative velocity between the motor pulley and exoskeleton joint is described by:

$$-K_d(\dot{\theta}_p-\dot{\theta}_e R)$$

which is equivalent to making the additional approximation that the derivative of desired torque, $\tau_{des}$, is negligible. However, this control element was also found to be ineffective in pilot tests due to noise on the derivative of the exoskeleton joint angle, which seems to primarily arise from stiction in the Bowden cable transmission.

The simple damping term which relies only upon the derivative of motor pulley position, which had little noise to amplify, and provides sufficient damping to improve stability. A proportional control without a damping term was effective. However, the addition of some damping always allowed for higher proportional gains and improved tracking performance. Therefore, proportional control is typically used together with damping injection.

High-Level Assistance Controllers

Stance Torque Control

During the stance period, desired exoskeleton joint torque was set according to one of four high-level assistance controllers, H1-H4, described below.

H1: Time Based Desired Torque Trajectory (TIME)

This high-level controller set desired torque as a function of time. A curve that resembles a scaled-down version of the human ankle moment during unassisted walking can be calculated as:

$$\tau_{des} = \begin{cases} 0 < t < 0.15\xi: & 0, \\ 0.15\xi < t < 0.30\xi: & \frac{\tau_p}{2}\sin\left(\frac{t_{cs} - 0.15\xi}{0.3\xi}\pi\right), \\ 0.30\xi < t < 0.45\xi: & \frac{-\tau_p}{2}\cos\left(\frac{t_{cs} - 0.3\xi}{0.15\xi}\pi\right) + \frac{3\tau_p}{4}, \\ 0.45\xi < t < 0.60\xi: & \frac{\tau_p}{2}\cos\left(\frac{t_{cs} - 0.45\xi}{0.15\xi}\pi\right) + \frac{\tau_p}{2}, \\ 0.60\xi \leq t: & 0, \end{cases} \quad (28)$$

where t is the time since the current stride began, $\xi$ is stride period and $\tau_p$ is peak torque. $\xi$=1.1 s and $\tau_p$=45 N-m, which produces the desired torque profile 500 shown in FIG. 5.

H2: Joint Angle Based Desired Torque (ANGLE)

This high-level controller sets desired torque as a function of exoskeleton ankle joint angle and phase of the gait cycle. This approach is a subset of impedance control, and is similar to setting desired torque based on a phase variable rather than clock time. A piece-wise linear curve is used by the controller that resembles a scaled-down version of the human ankle moment during unassisted walking, calculated as:

$$\tau_{des} = \frac{\tau_i - \tau_{i-1}}{\theta_{e,i} - \theta_{e,i-1}}(\theta_e - \theta_{e,i-1}), \quad i = \{1, 2, 3, 4\}, \quad (29)$$

with curve parameter values as listed in Table 1, below.

TABLE 1

| Param | Value |
| --- | --- |
| [$\theta_0$, $\tau_0$] | [0.018, 0.00] |
| [$\theta_1$, $\tau_1$] | [−0.122, 18.1] |
| [$\theta_2$, $\tau_2$] | [−0.209, 45.2] |
| [$\theta_3$, $\tau_3$] | [0.00, 11.3] |
| [$\theta_4$, $\tau_4$] | [0.140, 0.00] |

Figure 6:
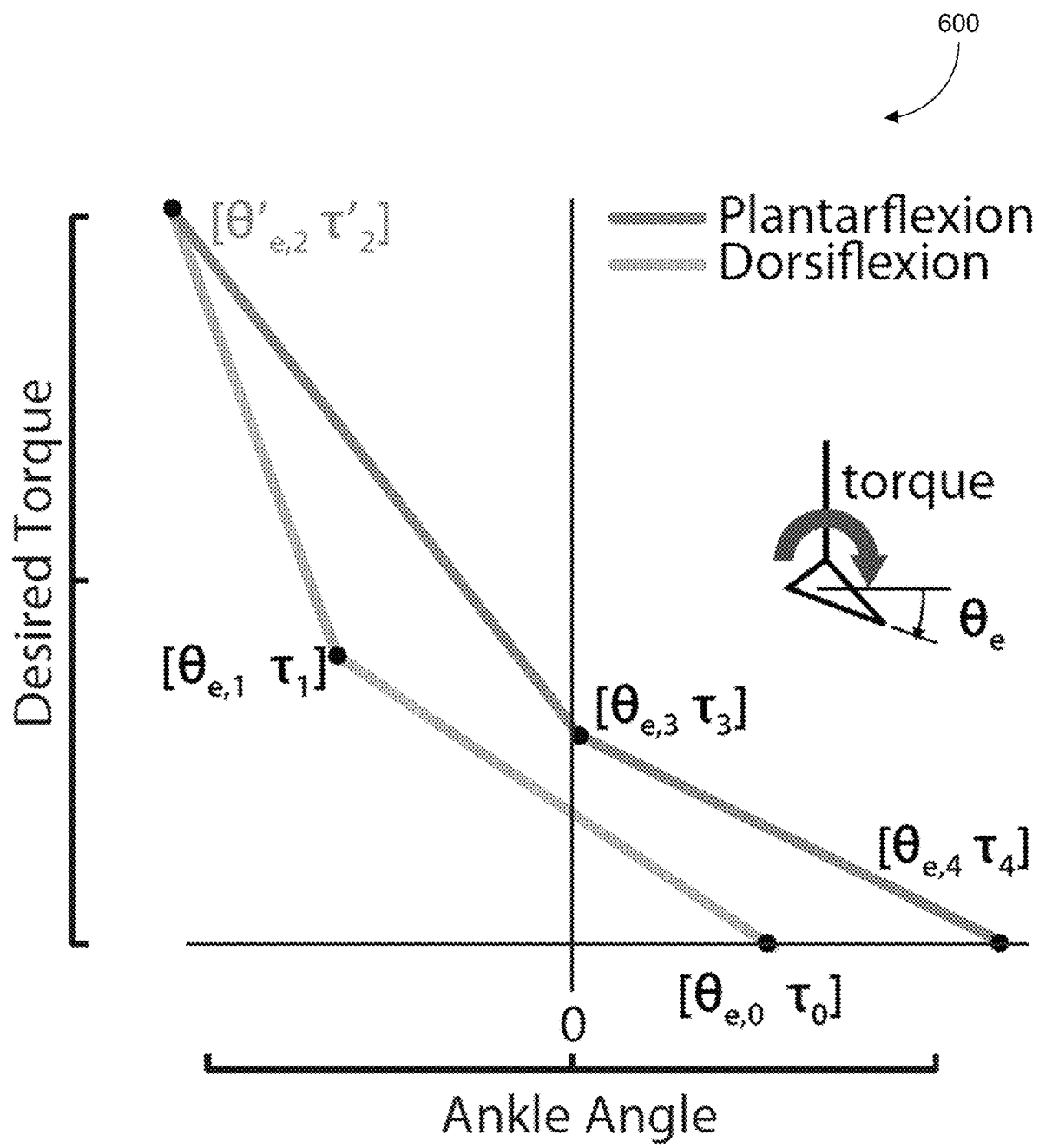
FIG. 6 shows high-level control based on ankle joint angle.

Here, ($\Theta_i$, $\tau_i$) defines a node in torque-angle space, as seen in graph 600 of FIG. 6. The node ($\Theta_2$, $\tau_2$) marked the transition from the dorsiflexion phase, in which ankle velocity was negative, to the plantarflexion phase, in which ankle velocity was positive. Since the exact transition point varied on each stride, the system uses the angle and torque at the moment of transition, ($\Theta'_2$, $\tau'_2$). when calculating desired torque in the first portion of Plantarflexion.

H3: Neuromuscular Model Based Desired Torque (NMM)

Figure 7:
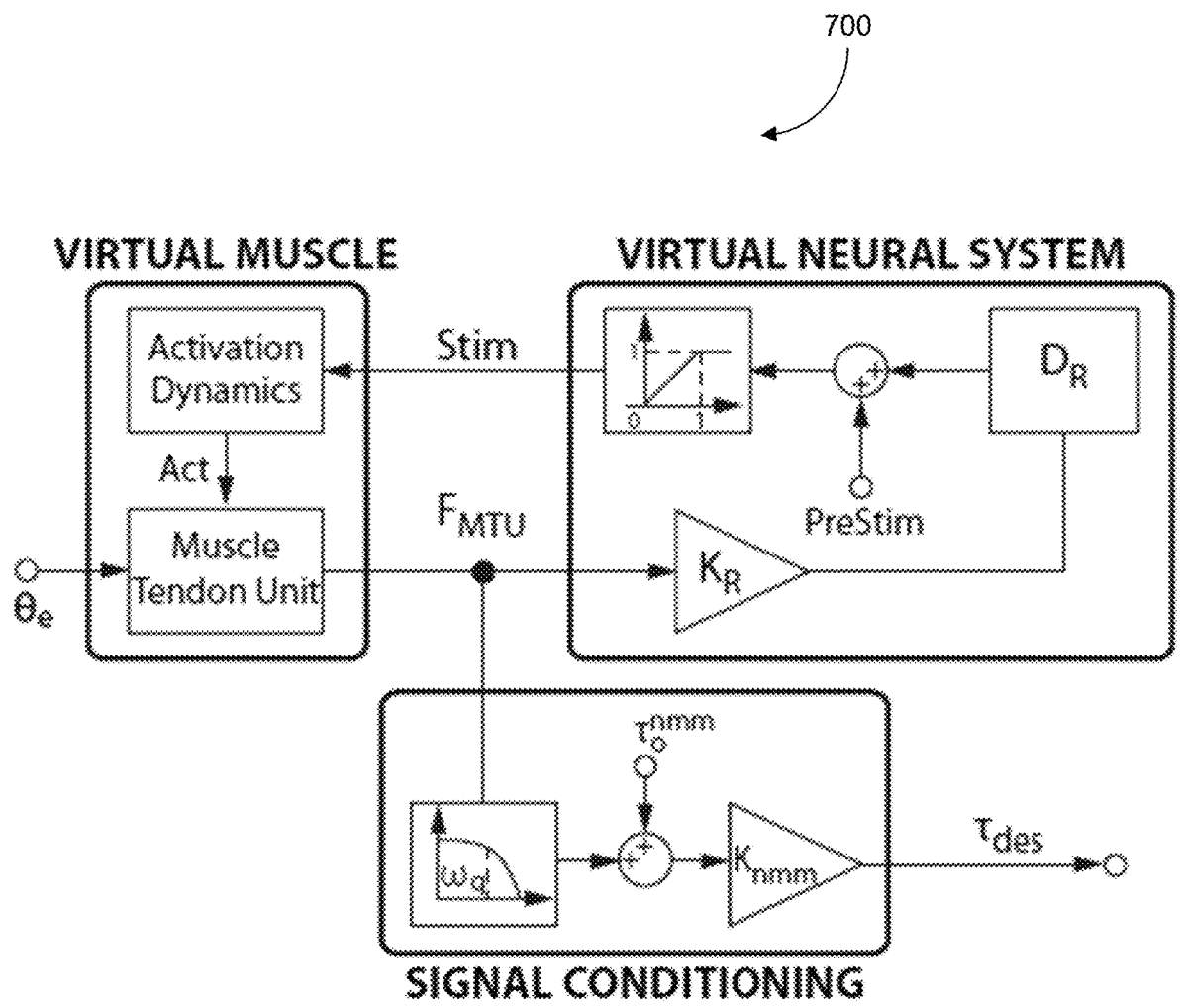
FIG. 7 shows a diagram of an example neuromuscular model control system.

This high-level controller sets desired exoskeleton torque based on a Hill-type muscle model and apositive force feedback reflex model. The resulting dynamics produce human-like motions and muscle activation patterns in simulation and interact well with the human neuromuscular system. Virtual muscle-tendon-unit length and velocity are set by measured exoskeleton joint angle and angular velocity. Virtual fiber length, velocity and activation were then used to determine muscle-tendon-unit force, $F_{mtu}$, which, after conditioning, was used to set desired exoskeleton torque. The system conditions the force signal by applying a low-pass filter with frequency $W_q$, adding a small negative offset of $\tau_o^{nmm}$, and applying a gain of $K_{nmm}$. Virtual muscle force was also used to drive a positive force feedback loop in which increased force led to increased muscle activation. The virtual neural system multiplied muscle force by a reflex gain, KR, applied a time delay of $D_R$, added a small positive offset, PreStim, then applied a threshold, yielding the virtual muscle stimulation. Virtual muscle activation was driven by stimulation through first-order dynamics. FIG. 7 shows an example schematic 700 of the neuromuscular control system. High-level parameters are found in Table 2, and a full set of equations and parameters are available in Appendix B, below.

TABLE 2

NMM parameter values

| Param | Value |
| --- | --- |
| $K_R$ | 0.002 |
| $D_R$ | 0.020 s |
| PreStim | 0.05 |
| $\omega_q$ | 50 Hz |
| $\tau_0^{nmm}$ | −20 |
| $K_{nmm}$ | 0.057 N · m |

H4: Electromyography Based Desired Torque (EMG)

Figure 8:
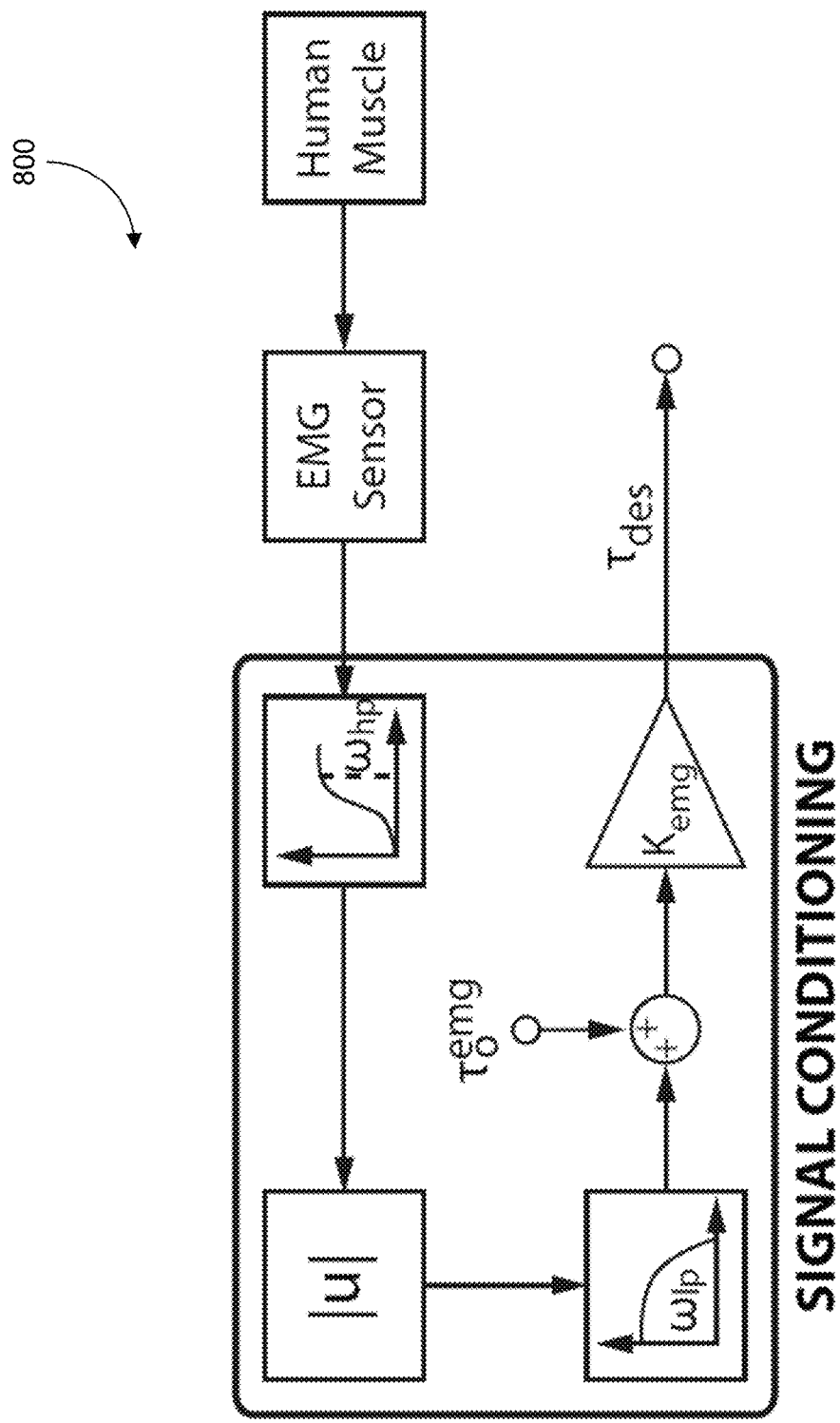
FIG. 8 shows a diagram of an example proportional electromyography control system.

This high-level controller sets desired torque in proportion to electromyographic measurements from the human gastrocnemius muscle. This approach gives the user direct neural control of the device, which makes interactions more intuitive, but can result in more complex desired torque dynamics. Electrical activity in the gastrocnemius is measured using surface electrodes and a commercial electromyography system. The signal is then high-pass filtered at a frequency of $W_{hp}$, rectified, and low-pass filtered at a frequency of $W_{lp}$. A small negative offset, $\tau_0^{emg}$, was applied, which prevented desired torque generation at low levels of muscle activity. The signal is then amplified by a gain, $K_{emg}$, yielding desired torque. FIG. 8 shows a diagram 800 of the proportional electromyography control system. The parameters used by the system can be found in Table 3, below.

TABLE 3

EMG parameter values

| Param | Value |
| --- | --- |
| $F_{hp}$ | 20 Hz |
| $K_{emg}$ | 283 |
| $F_{lp}$ | 6 Hz |
| $\tau_0^{emg}$ | −0.008 |

Swing Control

When the foot is off the ground, motor position control is employed to allow free motion of the human ankle and maintain a small amount of slack in the cable as shown:

$$\theta_{p,des} = \theta_e \cdot \tilde{R},$$

$$\Delta\theta_{p,des} = \theta_{p,des} - \theta_p \quad (30)$$

where $\Theta_e$, is exoskeleton joint angle and R is the estimated total gear ratio from motor to exoskeleton joint. Maintaining low slack in the Bowden cable reduces the time required for cable winding at the beginning of stance.

Before collecting data, the parameters for each combination of high and low-level controller were tuned as the participant walked with the exoskeleton. High-level control parameters listed in the prior section were selected so as to result in peak instantaneous desired torques of approximately 45 N-m during the course of one hundred steps of walking. Low-level control parameters listed in Table 4 were systematically tuned with the aim of minimizing torque error. Feedback, model and adaptive control gains in L1-L6 and L8-L9 were tuned using a variant of the Ziegler-Nichols method (Ziegler and Nichols, 1942), in which:
1. All gains (proportional, damping, integral, model, sliding, and/or adaptive) were set to zero.
2. The proportional gain was increased until significant oscillations were observed.
3. Gain value and oscillation period were then recorded and used to estimate optimal values for proportional and damping gains.
4. Fine tuning of gains for all control elements, other than iterative learning, was then performed by the system.

The iterative learning gain in L7 was tuned such that steady state was reached at approximately 10 strides, which led to a value of $K_I$ that was about one tenth the tuned value of $K_p$. The same gains were used for iterative learning elements in controllers L7-L9. For model-based compensation, the value of R was based on measurements of the motor output pulley radius, motor gear ratio, and exoskeleton lever arm. $K_c$ was estimated based on measurement of the passive relationship between exoskeleton torque and exoskeleton joint angle measured during walking, as described in relation to FIG. 3, above.

TABLE 4

Low-level torque control parameter values
(Note: $1_3$ denotes a $3 \times 3$ identity matrix)

| Param | Value |
|---|---|
| $K_p$ | 0.093 |
| $K_d$ | 0.010 |
| $K_{max}$ | 0.15 |
| $K_{pec}$ | 0.046 |
| $K_i$ | 7.7e-5 |
| $h_\tau$ | 11.3 N · m |
| $\tilde{R}$ | 2.90 |
| $\tilde{K}_c$ | 195 N · m · rad$^{-1}$ |
| $K_s$ | 0.005 |
| $\lambda$ | 0.077 |
| L | 1.0e-9$1_3$ |
| $h_k$ | 0.039 |
| $K_l$ | 0.0077 |
| D | 0.022 s |
| $\beta$ | 1 |
| $\mu$ | 1 |
| T | 0.250 s |
| $K_{sw}$ | 0 |

For each high-level controller, all low-level control conditions were tested on the same day, without removal of the exoskeleton between trials. A table of condition order is presented in Supporting Materials Table SI.

For each combination of low-level torque control and high-level assistance control, data was collected from 100 steady-state strides. Steady state was verified by visual inspection, and was typically reached after about 20 strides. The subsequent 100 strides were then decomposed into individual strides, each beginning at heel strike as detected by a shoe-embedded switch. Data for an average stride were then calculated by taking the mean across all strides al each instant in time.

For each condition, torque error was calculated both for the set of all steady state strides and for the average stride. Torque error was quantified as the root mean squared error of the difference between measured and desired torque. For the set of all steady-state strides, root mean squared error was determined for each stride individually, then calculated the mean and standard deviation. For the set of all steady-state strides, means within high-level controllers and across low-level controllers were compared using unpaired t-tests, with a significance level of $\alpha=0.05$.

Figure 9:
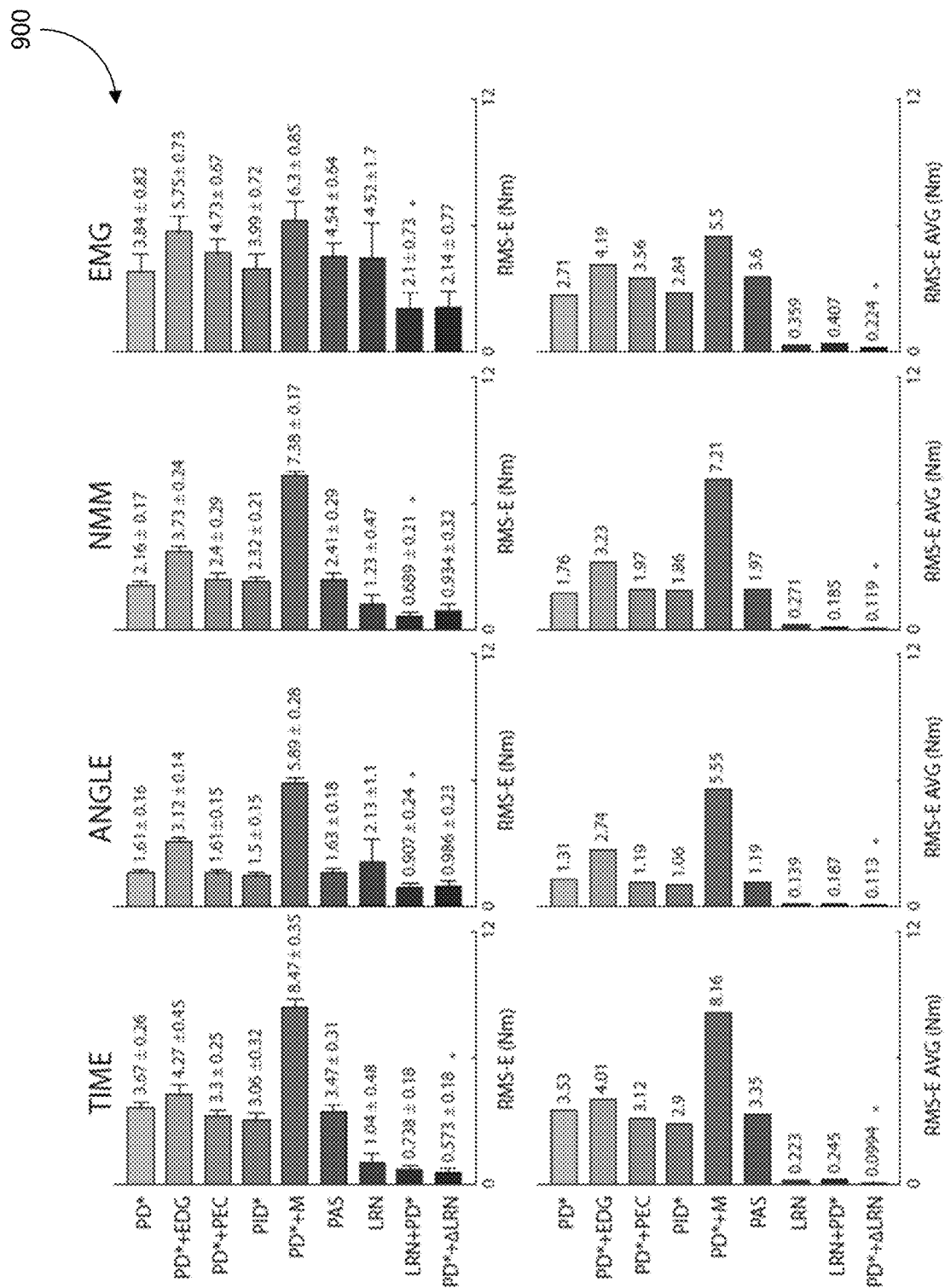
FIG. 9 shows torque errors for high and low-level control combinations.

Means and standard deviations of stride-wise root-mean-squared torque error (RMS-E) and average-stride root-mean-squared error (RMS-E AVG) of all low and high-level controller combinations are shown in graph 900 of FIG. 9. Root-mean-squared torque error was calculated for all strides (RMS-E) and for an average stride (RMS-E AVG) across all high- and low-level control combinations. A complete table of p values for statistical comparisons between the RMS-E of all torque controllers are provided as Supporting Materials (Tables STI-SV).

Figure 10A:
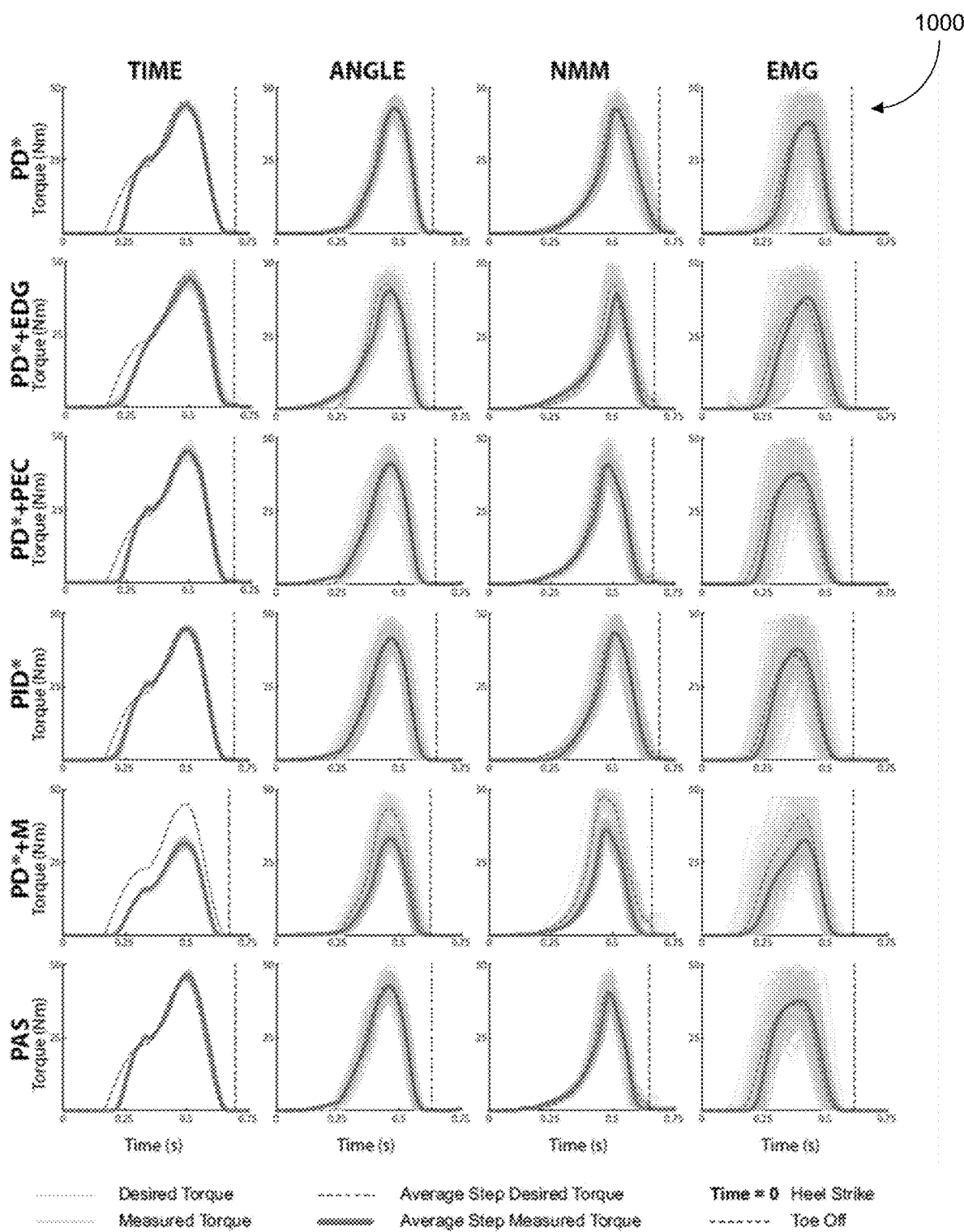
FIGS. 10A-10B shows results data including time trajectories of desired and measured torques.
Figure 10B:
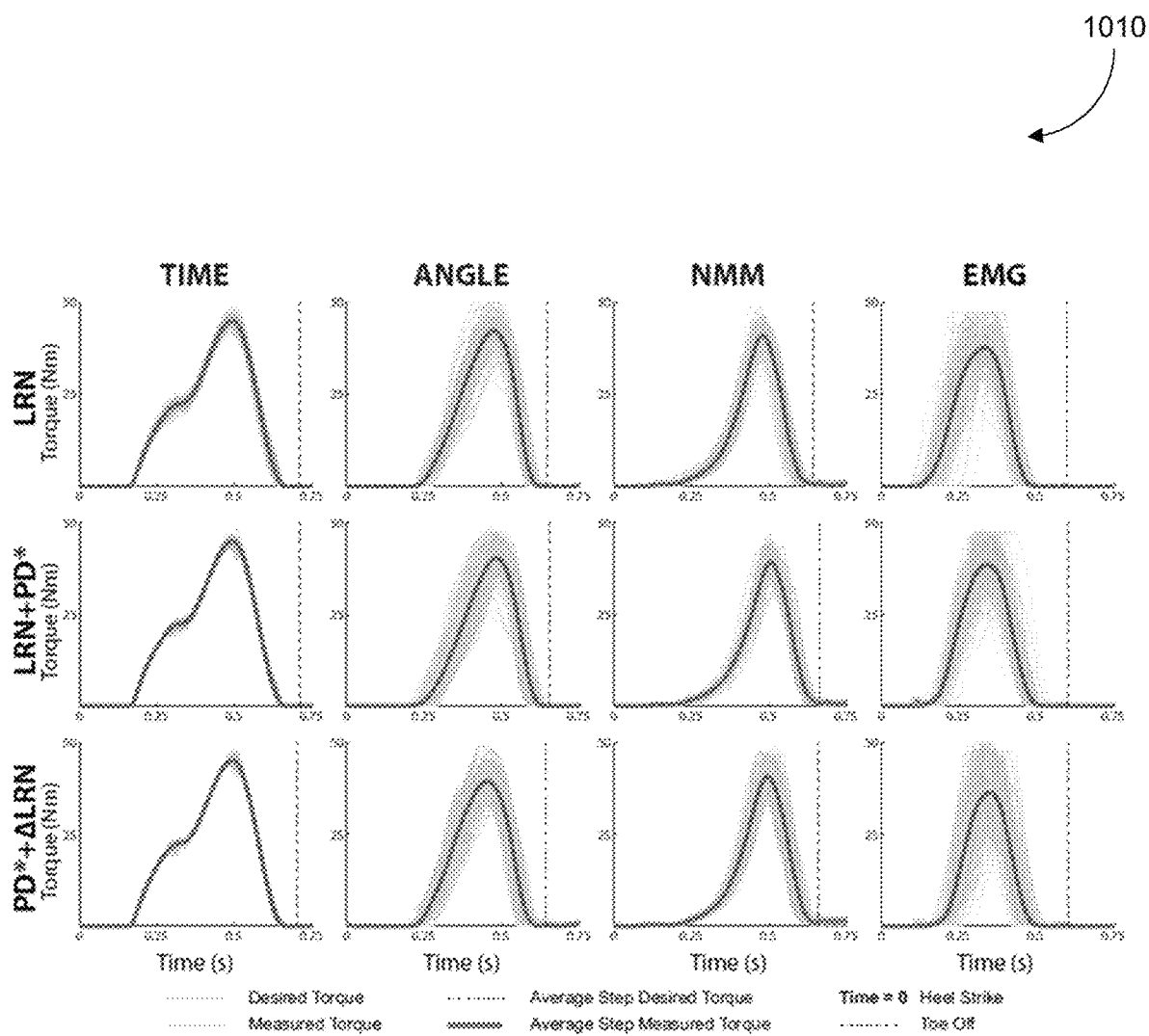

Overlapped time trajectories of desired and measured joint torques across all one hundred steady-state strides in each condition are shown in graphs 1000, 1010 in FIGS. 10A-10B. Time trajectories of desired torque and measured torque are shown for 100 strides of walking. Average-stride desired torque and measured torque are shown for all combinations of controllers.

Ankle angle trajectories in time and torque trajectories in ankle angle space are also provided for all conditions as in Appendix D (FIGS. S1-S2). Convergence plots for controllers that involved iterative learning are provided in Appendix D (FIG. S4).

Figure 11:
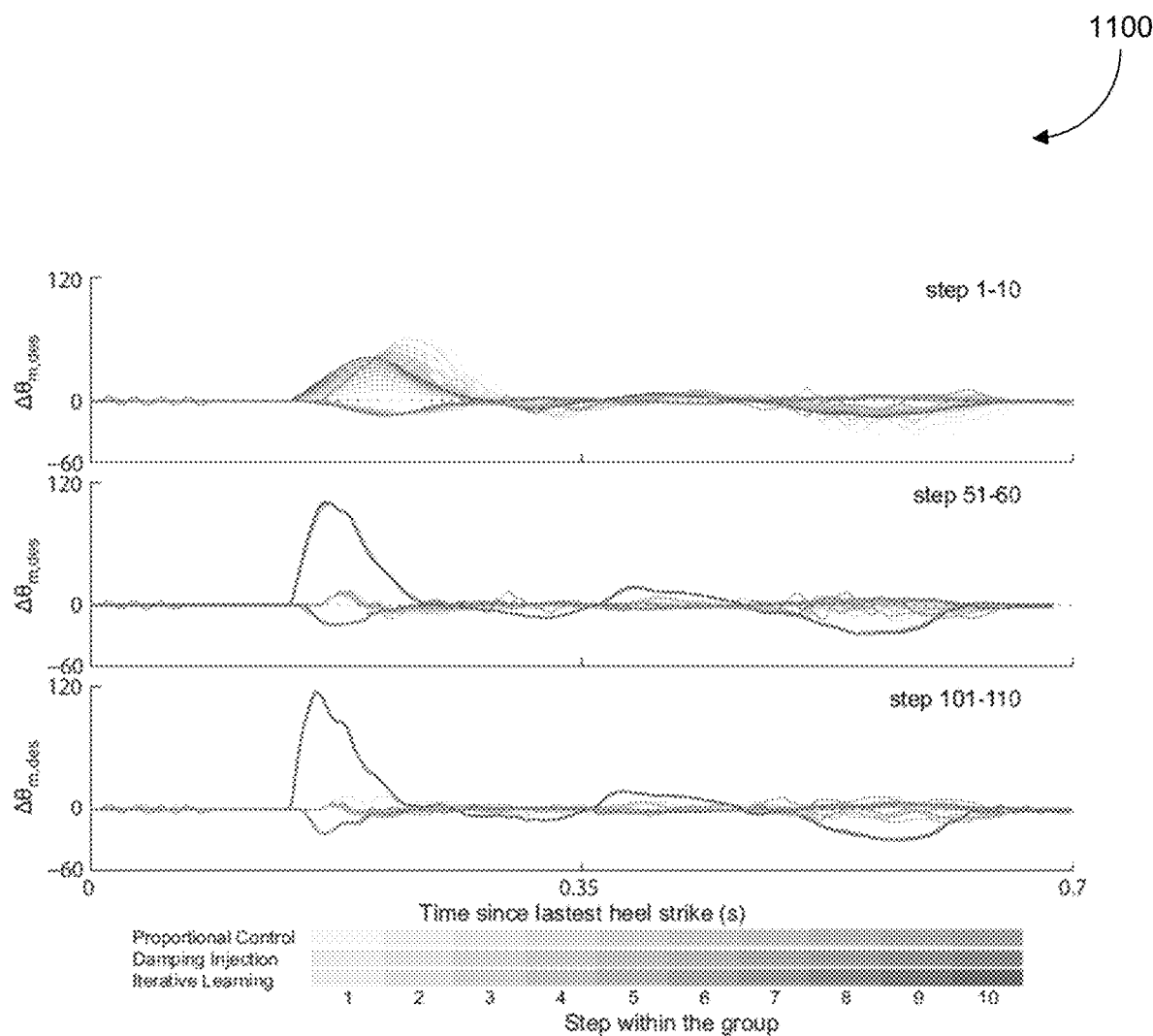
FIG. 11 shows the contributions of each component of a controller to desired motor displacement.

The combination of proportional control and damping injection will iterative learning (PD*+ΔLRN or LRN+PD*) resulted in the lowest torque tracking errors for all high-level controllers, both in real-time and for average trajectories, as seen in graph 900 of FIG. 9. Of these two combinations with comparable performance, feedback control with learning compensation (PD*+ΔLRN) was simpler and converged faster. Stride-wise torque errors with PD*+ΔLRN were between 38% and 84% lower than with PD* alone. ($p<1.9\cdot10^{-43}$), while average stride torque errors were between 91% and 97% lower, depending on high-level controller. Iterative learning control alone tended to result in low errors for average trajectories, but higher real-time errors than when combined with feedback control. Other additions to feedback control had minor effects on performance, except for model-based compensation, which increased torque error substantially. When desired torque was based on EMO, torque tracking error and variability were higher for almost all torque controllers. Values for the PD*+ΔLRN controller, including errors as a percentage of the maximum of the average desired torque, are provided in Table 5. Graph 1100 of FIG. 11 shows the contributions of each component of the PD*+ΔLRN controller to desired motor displacement, and their evolution in time.

There were some interactions between high-level control type and low-level torque control performance. With angle and EMG based high-level controllers, pure feedback control was more effective than pure iterative learning control. For time and NMM based controllers, this trend was reversed. With Time-based desired torque, all controllers that did not have a learning component had poor tracking at the onset of desired torque, including a delay and overshoot, that comprised a large portion of the total torque error, as seen in graphs 1000, 1010 of FIGS. 10A-10B. The addition of iterative learning to PD* control led to the greatest reductions in torque errors when desired torque was based on time. An integral term (PID*) provided a small improvement in performance over PD* control for time and angle based controllers. With time-based high-level controllers, passivity (PAS) and previous-error compensation (PD*+PEC) provided a small benefit as well.

TABLE 5

Tracking errors with PD* + Δ torque control

|  | RMSE | % $\tau_{max}$ | RMSE-A | % $\tau_{max}$ |
|---|---|---|---|---|
| Time | 0.57 ± 0.18 Nm | 1.3% | 0.10 Nm | 0.2% |
| Angle | 0.99 ± 0.23 Nm | 2.5% | 0.11 Nm | 0.3% |
| NMM | 0.93 ± 0.32 Nm | 2.3% | 0.12 Nm | 0.3% |
| EMG | 2.14 ± 0.77 Nm | 5.9% | 0.22 Nm | 0.6% |

Model-free proportional control with damping injection compensated by iterative learning (FIG. 12) resulted in the lowest torque errors for all high-level controllen, both in real-time and for an averaged trajectory. This controller resulted in improved normalized torque tracking errors compared to prior exoskeleton torque control techniques.

4.1. Proportional-Learning-Damping Control

Figure 12:
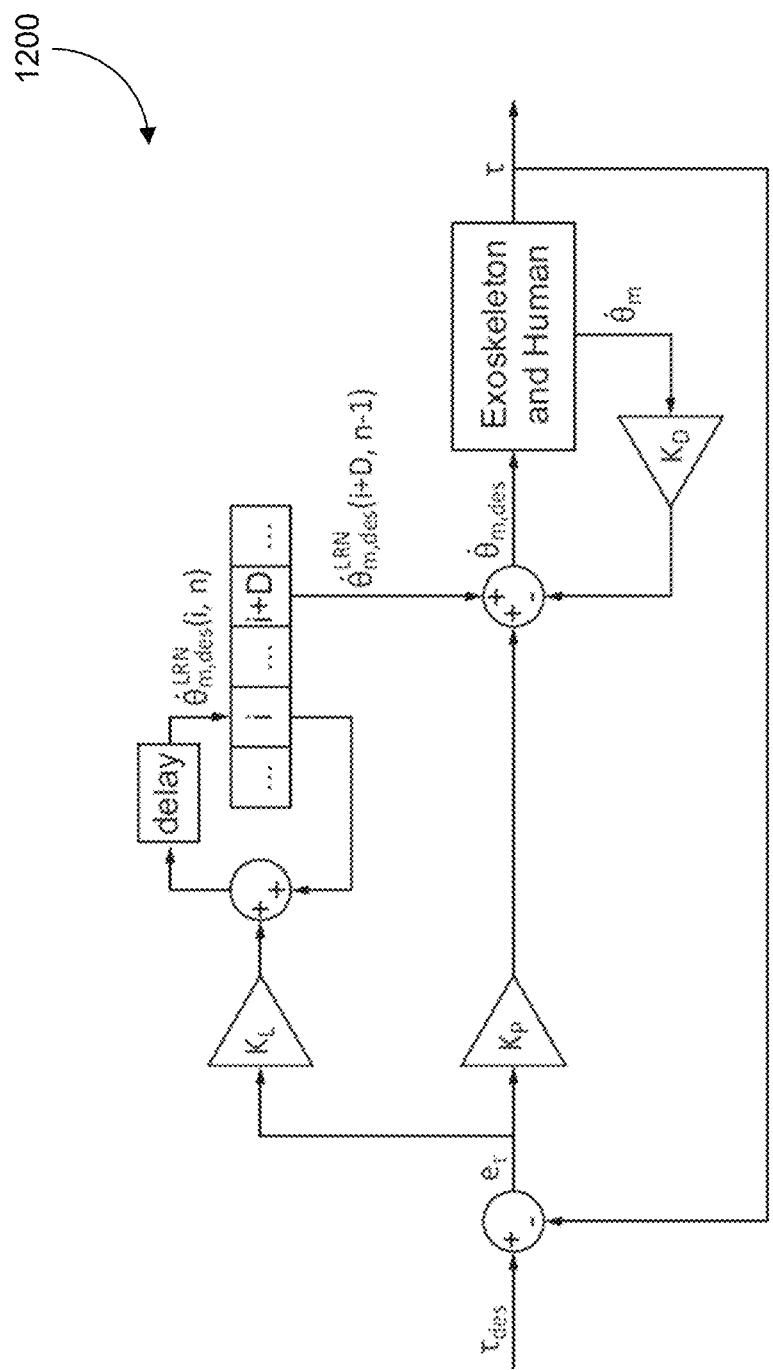
FIG. 12. shows a block diagram of a controller.

The most successful controller has features that are analogous to those of classical proportional-integral-derivative control: a proportional term provides tracking during transients, iterative learning eliminates steady-state cyclic errors, and damping injection provides stability. The approach is labeled as proportional-learning-damping control. FIG. 12 shows a block diagram of controller L9 PD*+ΔLRN.

FIG. 11 shows the contributions of each component of the PD*+ΔLRN controller at steps 1-10, steps 51-60 and steps 101-110. In the first step proportional control dominates, and al steady state the learned component dominates. Data shown are from the time-based high-level controller. Plots for all high-level conditions are shown in FIG. S5 of Appendix D. Each component of the proportional-learning-damping controller contributes to overall commands in different ways across the learning process. During the first few walking steps, proportional control is the primary contributor, moderated by damping injection, while the learned trajectory remains near its initial value, as shown in graph 1100 of FIG. 11, steps 1-10. At steady state, inputs are primarily the result of learned trajectories, which anticipate and override damping injection, while proportional control compensates for step-by-step variations in required input as shown in graph 1100 of FIG. 11, steps 91-100. This results in strong performance during transients and exceptional performance at steady state.

Designing and tuning the proportional-learning-damping controller is described below. First, the proportional gain on torque error is slowly increased until some overshoot and oscillations are observed. Next, the damping gain on motor velocity is increased until high-frequency motor oscillations are observed, and the gain is backed off of this limit. The proportional gain is then returned such that it is as high as possible without resulting in oscillations in torque error. Next, the learning gain is set to a value of one tenth that of the proportional gain and fine-tuned until convergence occurs within the desired time, in this case ten strides. Finally, a parameter sweep is performed on the delay parameter used to preview learned desired motor position. The effects of learning are sensitive to this choice; without a value very close to optimal, ripples in the learned desired motor position will form and grow. In those cases, non-unity values of the forgetting and error filtering terms are required to stabilize the system. With the correct choice of delay, however, ripples did not form during at least one thousand strides, even without forgetting or error filtering tenns.

This approach builds on the strengths of torque control techniques implemented in prior lower-limb exoskeletons. Feedback control terms have been used in Bowden-cable driven hip-knee exoskeletons, hip-knee exoskeletons with collocated drives and mobile hip exoskeletons. Effective joint position tracking has been achieved in a knee exoskeleton using an iterative learning approach. Improvements in torque tracking have been achieved in a Bowden-cable driven hip-knee exoskeleton using a lower-dimensional 'kernel-based' version of the iterative learning approach. The proportional-learning-damping controller incorporates the most effective permutations of these previously-identified control concepts for the present system.

Comparisons to prior torque tracking results are complicated by differences in hardware. For example, the present system has higher-power off-board motors than most exoskeletons, and the unidirectional Bowden cable can go slack during the swing phase, eliminating the need for active control to achieve transparency. On the other hand, some prior exoskeletons have estimated joint torques using simplified system models rather than direct measurement, which can result in the appearance of low-error torque tracking despite substantial unmeasured torque errors. Nevertheless, the proportional-learning-damping controller achieved the lowest torque errors as a percentage of desired torque of any exoskeleton to date.

It is likely that iterative learning, of the form used here or in other studies, would improve torque tracking during most human locomotor activities, since even irregular gaits exhibit some degree of repeatability. The case of the EMG-based a high-level controller provides an insight into such scenarios, because the EMG signal contains substantial noise and is highly variable from step to step. Despite these irregularities, the addition of a learning component reduced torque tracking errors by 45% compared to feedback control alone in the EMG condition.

Further improvements in torque tracking for some high-level controllers might have been possible with alternate phase variables, iterative learning resulted in the greatest improvements in torque tracking for the time-based high-level controller, presumably because motor position adjustments were also learned in time. Learning as a function of ankle angle in the angle condition, for example, might have resulted in greater improvements. On the other hand, time provides a unique and monotonically increasing phase variable, with consistent indexing across steps, capable of capturing control inputs with very high levels of complexity.

Continuous-Time Integration:

When proportional-damping control was augmented by an integral term (PID*), previous-error compensation (PD*+ PEC), or passivity-based adaptation (PAS), torque error with time-based high-level control was slightly improved. However, these continuous-time integral components showed no effect or negative effects in tracking performance for other high-level controllers. Two factors explain the ineffectiveness of integral control in these cases. One factor is integral windup. The rapid changes in set point over the course of the stride could lead to either excessive or insufficient error accumulation. Another factor is the nonlinear, changing, delayed dynamics of the system. The Bowden cable has nonlinear stiffness, both the transmission and human change in time, and there are delays in the control loop and in motor actuation. All of these factors are known to limit integral control performance due to the linear accumulation of torque errors that are not linearly comparable. In the case of the time-based high-level controller, continuous-time integration may have been more effective due to the consistency of the desired torque in time, which may have translated into more constant torque errors than with other high-level controllers.

The apparent success of integral terms in other lower-limb exoskeletons with Bowden-cable transmissions may be due to differences in torque sensing, cable composition or activities tested. For example, controllers of the Lopes system have typically included an integral term on torque error. Differences might relate to torque sensing. Torque was measured at the joint using strain gauges. Torque has been estimated from relative angle of the motor and joint or from series spring detection, which might result in a more linear relationship between motor angle input and apparent joint torque. Differences might also relate to hardware. The Bowden cables in Lopes have features that could make them more consistent with a simple spring model, such as stiffer, pre-stretched steel cables and bidirectional drives that do not allow slack. Differences might relate to the characteristic behavior of the joint being assisted. Lopes assists the hip and knee, which have relatively smooth, continuous patterns of joint torque. Here, system assisted the ankle joint, which typically involves sharper changes in dynamics. For example, the foot intermittently contacts the ground, discontinuously changing both the impedance of the ankle joint and the magnitude of desired torques. These changes connote rapid changes in set point for the controller, which leads to windup of integral control elements, among other challenges.

Model-Based Control Elements:

Although model-based control elements show promise in simulation and in theory, these generally worsened or had no effect on tracking performance. The system obtains the best performance by driving model-based contributions to zero. One reason for the ineffectiveness of model-based compensation may have been the nonlinear stiffness of the Bowden cable, which was modeled as a linear spring, and slow changes in cable stiffness and length due to heating over the course of each trial. Another reason may have been the exclusion of friction and stiction. However, in pilot tests using model-based compensation that included these elements, it was found to make the controller less robust. In each case the effects were highly sensitive to choice of parameter value and torque tracking error was not reduced. Sensitivity to model errors seems to be a fundamental issue in implementing this type of inverse-model control in exoskeletons with Bowden cable transmissions.

The passivity-based controller (PAS) fared slightly better, perhaps due to its adaptive nature, but still did not yield substantial benefits. One factor that may have limited its effectiveness is input mismatch. The controller was designed with motor voltage as input (Eq. 18), but implemented using motor velocity commands instead. While these terms are closely related (Eq. 11), it is possible that an alternate mode of motor control, or an alternate formulation, could have led to improved results. Another factor that may have limited performance was the inclusion of a term akin to continuous-time integration, which is subject to windup as discussed above. The primary limitations likely stem from the reliance on any explicit model, however, since the dynamics of this human-exoskeleton system are highly complex and time-varying.

Gain Scheduling, Optimal Control, and Learning:

Error-dependent gains (PD*+EDG) did not provide benefits for any high-level controller. Lower gains when torque errors were low seem to have led to larger errors at other times, since the set point changed rapidly and there were substantial execution delays. Gain scheduling methods that instead use optimal control might improve torque tracking for this system, but such feedback control techniques would still be limited by communication and actuation delays. By contrast, iterative learning realizes another form of optimal control, but uses a feed-forward approach to overcome delays. The iterative learning controller developed here is a variation on one-dimensional root finding using Newton's method. The problem is to find the desired motor position (L7 and L8) or displacement (L9) for zero torque error, i.e., to solve the function:

$$e_\tau(\Delta\theta_{m,des})=0 \qquad (31)$$

The solutions are approximated in an iterative manner by:

$$\Delta\theta_{m,des}(n+1)=\Delta\theta_{m,des}(n)-K_l e_\tau(n) \qquad (32)$$

which can be rewritten as:

$$\Delta\theta_{m,des}(n+1) = \Delta\theta_{m,des}(n) - \frac{e_\tau(\Delta\theta_{m,des}(n))}{K_l^{-1}} \qquad (33)$$

This demonstrates a variation of Newton's method to solve $e_\tau=0$ with the estimate for the derivative of $e_\tau$ fixed as $e'_\tau=K_l^{-1}$. Unlike gain scheduling in feedback control, this optimal control approach addresses control delays through the combination of a feed-forward term and a delay-compensating prediction term. Therefore, even with an optimized gain schedule, PD*+EDG probably would not outperform PD*+ΔLRN.

Interactions with Human Response:

Low-level torque control can significantly affect human response to high-level assistance modes. For example, changes in the patterns of desired torque and joint kinematics across torque controllers within the same high-level controller reveal an interaction effect. For example, there was more variability in joint kinematics with PD* torque control than with LRN torque control when desired torque was generated on the basis of time. In this case, differences seem to be related to the smoothness of the measured torque generated by the two controllers. The subject reported that the PD* controller had uncomfortable oscillations, leading to compensatory activity, while the LRN controller did not. As another example, there is variability in desired torque with NMM-based assistance than angle-based assistance using PD* torque control, but an opposite trend using LRN torque control. This appears to be the result of complex, multi-time-scale, dynamic interactions between continuous behavior of the torque controller, within-stride variations by the human; high-level control responses, and human adaptation over multiple strides. These effects may also be important in selecting and tuning an exoskeleton torque controller.

Hardware Dependence:

Exoskeleton hardware, particularly series compliance, also interacted with the quality of torque tracking. Tests with no series spring, other than the Bowden cable, showed significant increases in torque error and subject discomfort for all control combinations. More compliant series springs result in small increases in torque tracking error. When series stiffness is too high, small position changes by the human are expected to result in large, undesirable, changes in torque. When series stiffness is too low, motor dynamics are expected to limit performance. As the dynamical contributions of nonlinear time-varying elements, intermittent contact or forceful human interactions increase, continuous-time integral terms, gain scheduling, and model-based compensations become less effective, as observed with the unidirectional Bowden-cable-driven ankle-foot exoskeleton.

Optimizing Spring Stiffness:

A theoretical analysis was conducted based on the analytic expressions of the testbed system dynamics, desired torque, and torque controller and made hypotheses about the optimum of passive stiffness of series elastic actuators in lower-limb ankle exoskeletons and the interactions between optimal gains, desired stiffness and passive stiffness.

To further ease the theoretical analysis for the prediction of passive stiffness optimum in series elastic actuators, the system models the assisted walking with the ankle exoskeleton as an oscillator. Oscillators are efficient modeling tools in biological and physical sciences due to their capability to synchronize with other oscillators or with external driving signals. Multiple efforts have been made towards improving the synchronization capabilities of nonlinear oscillators by adapting their frequencies. The concept has been introduced and employed in locomotion to either improve the identification of central pattern generator parameters, to better estimate state measurements, or to help with controller design by exploiting the cyclic behavior of walking. Therefore, various states of walking are modeled as synchronized oscillations. This method disburdens the analysis from dealing with complicated human-robot interactive dynamics, focus on the resulting states like ankle kinematic profile and required motor position profile that are close to be periodical, and significantly simplified the analysis. However, neglecting of step-to-step variations in practical cases does cause potential deviation of results from theoretical models.

With proportional control and damping injection used for torque tracking:

$$\ddot{\theta}_{p,des} = -K_p e_\tau - K_d \dot{\theta}_p \qquad (5.9)$$
$$= -K_p[K_t(\theta_p R - \theta_e) + K_{des}(\theta_e - \theta_0)] - K_d \dot{\theta}_p$$

Due to the employment of a high-speed real-time controller and a high-acceleration servo motor, desired motor velocity is enforced rapidly, based on which the simplification of immediate motor velocity enforcement is made, i.e.:

$$\dot{\theta}_p = \dot{\theta}_{p,des}. \qquad (5.10)$$

Combining Eq. (5.10) with a linear approximation of desired torque curves, including those expressed by Equations (5.7) and (5.8), in the form of $$\tau_{des} = -K_{des}(\theta_e - \theta_0), \qquad (5.11)$$

there is:

$$(1+K_d)\dot{\theta}_p = -K_p[K_t(\theta_p R - \theta_e) + K_{des}(\theta_e - \theta_0)]. \qquad (5.12)$$

in which $\theta_0$ is maximum joint position for the device to exert torque on the human ankle, i.e., the intersection of torque-angle relationship with the angle axis. Modeling exoskeleton-assisted walking after stabilization as an oscillation process made of N sinusoidal waves of the same frequency F, there is a profile of the ankle angle in the form of:

$$\theta_e = c + \sum_{n=1}^{N} d_n \cdot \exp(j2\pi F t + \beta_n), \qquad (5.13)$$

where c is an constant denoting the offset of the profile on torque axis, $d_n$ and $\beta_n$ are the magnitude and phase shift of the $n_{th}$ sinusoidal wave, and t represents the time elapsed within one stride since heel strike. The corresponding stabilized motor position should also oscillate with the same frequency. A stabilized motor position by equal number of sinusoidal waves with the same phase shifts in the form of:

$$\theta_p = e + \sum_{n=1}^{N} f_n \cdot \exp(j2\pi F t + \beta_n), \qquad (5.14)$$

in which e is a constant and $f_n$ is a complex number. Substituting Eq. (5.13) and (5.14) into Eq. (5.12), there is Eq. (5.15):

$$[(1 + K_d)j2\pi F + K_p K_t R] \sum_{n=1}^{N} f_n \cdot \exp(j2\pi F t + \beta_n) = \qquad (5.15)$$
$$-K_p K_t R e - K_p (K_{des} - K_t)c + K_p K_{des} \theta_0 -$$
$$K_p(K_{des} - K_t) \sum_{n=1}^{N} d_n \cdot \exp(j2\pi F t + \beta_n)$$

Equating the coefficients of the various sinusoidal waves and the offset, there is:

$$f_n = \frac{-K_p(K_{des} - K_t)}{(1 + K_d)j2\pi F + K_p K_t R} d_n \qquad (5.16)$$

and $$e = -\frac{K_{des} - K_t}{K_t R}c + \frac{K_{des}}{K_t R}\theta_0. \qquad (5.17)$$

Motor position profile in Eq. (5.14) can thus be expressed in terms of the ankle position profile and the controller as:

$$\theta_p = -\frac{K_{des} - K_t}{K_t R}c + \frac{K_{des}}{K_t R}\theta_0 + \qquad (5.18)$$
$$\frac{-K_p(K_{des} - K_t)}{(1 + K_d)j2\pi F + K_p K_t R} \sum_{n=1}^{N} d_n \cdot \exp(j2\pi F t + \beta_n).$$

Combining the oscillator assumption with Eq. (5.12), there is the expression of the torque error as:

$$e_\tau = \tau - \tau_{des} \qquad (5.19)$$
$$= K_t(\theta_p R - \theta_e) + K_{des}(\theta_e - \theta_0)$$
$$= K_t R \theta_p + (K_{des} - K_t)\theta_e - K_{des}\theta_0$$
$$= (K_{des} - K_t)\frac{(1+K_d)j2\pi F}{(1+K_d)j2\pi F + K_p K_t R}$$
$$\sum_{n=1}^{N} d_n \cdot \exp(j2\pi F t + \beta_n).$$

It is clear that without considering the control gains, asserting that $$K_{des} - K_t = 0$$

will minimize torque tracking error. Therefore, the following hypothesis is made:
Hypothesis 1.
In lower-limb exoskeletons, the optimal passive stiffness of the series elastic actuator for torque tracking is:

$$K_{t,opt} = K_{des} \qquad (5.20)$$

Relationship Between Torque Tracking Performance and the Difference of Desired and Passive Stiffnesses Another factor that limits torque tracking performance is the inability of the proportional gain to increase indefinitely. Reformatting Eq. (5.19), there is:

$$e_\tau = \frac{j2\pi F}{\frac{K_p}{1+K_d}K_t R + j2\pi F}(K_{des} - K_t)\sum_{n=1}^{N} d_n \cdot \exp(j2\pi F t + \beta_n). \qquad (5.21)$$

It is clear that when the passive stiffness is fixed but does not match the desired one, i.e.

$$K_t - K_{des} \neq 0$$

with the same step frequency F and angle profile $$\sum_{n=1}^{N} d_n \cdot \exp(j2\pi F t + \beta_n).$$

torque tracking error $e_\tau$ is inversely proportional to $$\frac{K_p}{1+K_d}.$$

Meanwhile, combining the controller in Eq. (5.9) and the assumption of perfect motor velocity tracking in Eq. (5.10), there is:

$$\dot{\theta}_p = -\frac{K_p}{1+K_d}e_\tau \qquad (5.22)$$

Differentiating the expression of applied torque in Eq. (5.3), there is:

$$\dot{\tau} = K_t(\dot{\theta}_p R - \dot{\theta}_e) \qquad (5.23)$$

Therefore, the time derivative of torque error is:

$$e_\tau = \dot{\tau} - \dot{\tau}_{des} \qquad (5.24)$$
$$= K_t(\dot{\theta}_p R - \dot{\theta}_e) + K_{des}\dot{\theta}_e$$
$$= -K_t R \frac{K_p}{1+K_d}e_\tau - K_t\dot{\theta}_e + K_{des}\dot{\theta}_e$$

which is a first order dynamics created by feedback control with an effective proportional gain of:

$$\frac{K_t \cdot R \cdot K_p}{1+K_d}$$

and a time constant of:

$$\zeta = \frac{1+K_d}{K_t \cdot R \cdot K_p}.$$

However, this dynamic does not exist independently but interacts with the human body in parallel. Therefore, in practical cases, oscillations increase when effective proportional gain increases, which impairs torque tracking performances eventually and causes discomfort or injury to the human body. Motor speed limit was never hit. Thus there is a fixed torque tracking bandwidth limit that is dependent on the combined interactive dynamics of motor, motor drive, transmission and human body. This bandwidth limit results in a fixed maximum commanded change rate of torque error, $\dot{e}_{\tau,max}$, which corresponding to the best tracking performance regardless of the passive stiffness of the system. Therefore:
Conjecture 1. Assisted Human Walking with a Lower-Limb Exoskeleton Experiences a Fixed Maximum Commanded Tracking Rate of Torque Error, $\dot{e}_{\tau,max}$, which Limits the Tracking Performance of the System.

In practical cases, Eq. (5.24) can be further simplified. First, to realize real-time torque tracking, the motor velocity should be a lot faster than device joint velocity, i.e., $\dot{\theta}_p \gg \dot{\theta}_e$, which combines with the fact that R=2.5 results in the following fact about Eq. (5.23):

$$\dot{\tau} \approx K_t R \dot{\theta}_p. \qquad (5.25)$$

Successful torque tracking also means a fast changing rate of actual torque compared to the desired torque, $\dot{\tau} \gg \dot{\tau}_{des}$, which leads to the results of dominance of applied torque changing rate in torque error changing rate, i.e., $$\dot{e}_\tau \approx \dot{\tau} \qquad (5.26)$$

Therefore, Eq. (5.24) can be estimated as:

$$\dot{e}_\tau \approx -K_t R \frac{K_p}{1+K_d}e_\tau \qquad (5.27)$$

This is equivalent to say that $\lambda$ in Eq. (5.30) is small and neglectable and $$\frac{K_p}{1+K_d}$$

and Kt are inversely proportional to each other. The application of Conjecture 1 in this case results in a fixed time constant $$\frac{1+K_d}{K_t R K_p}$$

at optimal control conditions. Together with the assumption of a rather constant step frequency F and a constant angle profile $$\sum_{n=1}^{N} d_n \cdot \exp(j2\pi F t + \beta_n),$$

torque error as expressed by Eq. (5.21) is proportional to the difference between passive and desired stiffness values, i.e., $$e_{\tau,opt} \propto K_{des} - K_t,$$

which then leads to the hypothesis below.
Hypothesis 2.
The root-mean-squared torque tracking errors under optimal feedback control conditions are proportional to the absolute difference between the desired and passive stiffness values, i.e., $$\|e_{\tau,opt,RMS}\| \propto \|K_{des} - K_t\|. \tag{5.28}$$

Interactions Between Optimal Control Gains and Passive Stiffness

Dynamics in Eq. (5.24) directly leads to a relationship between Kp and Kt:

$$K_p = \frac{(K_{des}\dot{\theta}_e - \dot{e}_\tau)(1+K_d)R^{-1}e_\tau^{-1}}{K_t} - \dot{\theta}_e(1+K_d)R^{-1}e_\tau^{-1}. \tag{5.29}$$

which can be simplified under the same desired torque-angle relationship, i.e., $K_{des}$. A root-mean-squared tracking error of <8% the peak desired torque is shown under proportional control and damping injection, which is expected to be improvable with better control parameters and different curve types. This suggests that under optimal torque tracking conditions, the actual applied torque profiles with the same Kdes, are expected to be fairly constant regardless of the value of passive stiffness Kt. Meanwhile, although the exact exoskeleton-human interactive dynamics is difficult to identify, the relationship between applies torque and resulting human ankle kinematics to obeys of Newton's law. Therefore, a fairly constant torque profile from the exoskeleton, when applied to the same subject under the same walking speed and step frequencies with low variance, should produce rather constant human and device joint kinematics, θe and θ'e. Therefore, the extreme device joint velocity that would produce the highest torque error rate with fixed control gains and push the controlled system to its bandwidth limit, $\theta_{e,ext}$, does not vary significantly across different passive stiffness conditions. Similar assumptions can be made about the extreme torque error $e_{\tau,ext}$. On the other hand, gain of the less dominant damping injection control part, $K_d$, have been observed to be upper-bounded by the appearance of motor juddering at $K_{d,max}=0.6$ for various stiffness combinations. The approximated invariance of $\theta_{e,ext}$ and $K_{d,max}$, combined with a fixed $e_{\tau,max}$ as assumed by Conjecture 1, lead to the following hypothesis.

Hypothesis 3.
With the same desired torque-angle curve, thus the same Kdes, the optimal proportional gain $K_{p,opt}$ is related to the passive stiffness $K_t$ by:

$$K_{p,opt} = \frac{\sigma}{K_t} + \lambda, \tag{5.30}$$

in which σ is dependent on the desired stiffness Kdes and can be expressed as:

$$\sigma = (K_{des}\dot{\theta}_{e,ext} - \dot{e}_{\tau,max})(1+K_{d,max})R^{-1}e_{\tau,ext}^{-1} \tag{5.31}$$

and the constant is:

$$\lambda = -\dot{\theta}_{e,ext}(1+K_{d,max})R^{-1}e_{\tau,ext}^{-1} \tag{5.32}$$

To ease later presentation, the value σ is labeled here as $K_p$-$K_t$ coefficient hereinafter. On the other hand, to realize torque tracking, proportional control is always dominant over damping injection. Therefore, Eq. (5.22) can be simplified as:

$$\dot{\theta}_{p,des} \approx K_p e_\tau \tag{5.33}$$

and accordingly, Eq. (5.27) becomes:

$$\dot{e}_\tau \approx -K_t R K_p e_\tau \tag{5.34}$$

which suggests that Hypothesis 3 can be simplified with an approximated inverse proportional relationship between the optimal $K_p$ and $K_t$. Therefore, the following corollary can be made.
Corollary 1.
For a fixed desired torque-angle relationship, i.e, $K_{des}$, when the passive stiffness of the series elastic actuator of the device is changed from $K_{t,old}$ to $K_{t,new}$, an estimate of the new optimal proportional control, $K_{p,new}$, can be achieved by:

$$K_{p,new} \approx \frac{K_{p,old} \cdot K_{t,old}}{K_{t,new}}. \tag{5.35}$$

in which $K_{p,old}$ is the optimal proportional control gain at $K_{t,old}$. Although multiple approximations have been made in the derivation of this corollary, which causes inaccuracies in this estimation, it can be used to set a starting point of proportional control gain tuning when system passive stiffness is changed with only the knowledge of the old and new passive stiffness values.

Relationship Between $K_p$-$K_t$ Coefficient and Desired Stiffness

Furthermore, combining Eq. (5.24), (5.30) and (5.32) at optimal control conditions, there is:

$$\dot{e}_{\tau,max} = -\sigma R(1+K_{d,max})^{-1}e_\tau + K_{des}\dot{\theta}_e$$

$$= -\sigma R(1+K_{d,max})^{-1}[\tau + K_{des}(\theta_e - \theta_0)] + K_{des}\dot{\theta}_e \tag{5.36}$$

which means:

$$\sigma = \frac{(1+K_{d,max})K_{des}\dot{\theta}_e - \dot{e}_{\tau,max}}{R[K_{des}(\theta_{e,ext} - \theta_0) + \tau]} \tag{5.37}$$

With relatively invariant extreme ankle velocity values, $\theta_{e,ext\ (t)}$, and torque error values $e_{\tau,max}$, across different desired stiffness, at a time of similar measured torque τ, the following hypothesis can then be drawn.

Hypothesis 4.

The $K_d$-$K_t$ coefficient in Eq. (5.30) is related to the desired quasi-stiffness $K_{des}$ by:

$$\sigma = \frac{\varsigma \cdot K_{des} + \delta}{K_{des} + \xi}, \quad (5.38)$$

in which $\varsigma$, $\delta$ and $\xi$ are constant parameters, and $$\delta = \frac{(1 + K_{d,max})}{R(\theta_{e,max} - \theta_0)} \dot{e}_{\tau,max}, \quad (5.39)$$

is linearly related to the hypothesized maximum commanded torque change rate $e_{\tau,max}$.

To model the hypotheses, eight desired quasi-stiffnesses, i.e., torque versus ankle angle relationship, were implemented, including three linear and five piece-wise linear curves. A unit linear curve (S=1 in Eq. 5.7) was defined by parameter values in Table 5.1. The three linear curves, L1, L2 and L3, were achieved by scaling the unit curve on the desired torque axis with factors of 0.4, 1 and 1.7 respectively. On the other hand, a unit piece-wise linear curve (S=1 in Eq. 5.8) was defined by the parameter values listed in Table 5.2. Five piece-wise linear curves, P1, P2, P3, P4 and P5, were then achieved by scaling the unit curve with factors 0.4, 0.7, 1, 1.3 and 1.7. The resulting desired torque versus ankle angle curves are shown in graph 1300 of FIG. 13.

TABLE 5.1

Linear unit curve parameter values

| Param | Value |
|---|---|
| [$\theta_{0,l}$ $\tau_{0,l}$] | [−2, 0] |
| $K_{des, 0}$ | 5 |

TABLE 5.2

Piece-wise linear unit curve parameter values

| Param | Value |
|---|---|
| [$\theta_{0,p}$ $\tau_{0,p}$] | [−2, 0] |
| [$\theta_{2,p}$ $\tau_{2,p}$] | [−12, 50] |
| [$\theta_{4,p}$ $\tau_{4,p}$] | [8, 0] |
| [$\theta_{1,p}$ $\tau_{1,p}$] | [−8, 20] |
| [$\theta_{3,p}$ $\tau_{3,p}$] | [0, 12.5] |

Calculation of desired quasi-stiffness values are different for linear and piece-wise cases. For linear curves, the values of L1, L2 and L3 can be easily evaluated as 2, 5, and 8.5 Nm/deg respectively. This set spans a range of 6.5 Nm/deg with a maximum that is 4.25 times the minimum. For the case of piece-wise linear curves, the desired stiffness values of each of the four phases was used, and different phases were modeled separately. The desired quasi-stiffness values in this case ranges from 0.625 to 12.75 Nm/deg.

Figure 5:
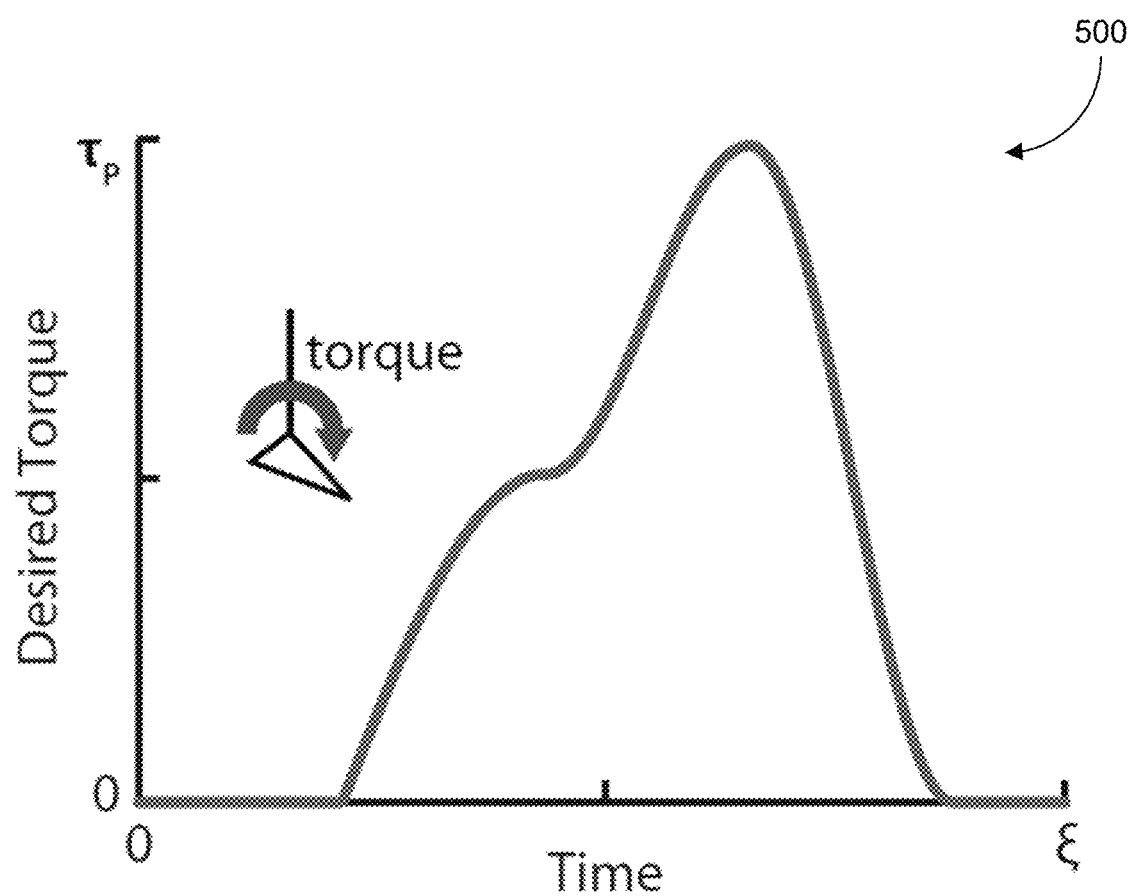
FIG. 5 shows a graph of high-level torque control based on a trajectory in time.

For each of the desired stiffness profile defined by a torque-angle relationship, six passive series stiffness values of the transmission system were realized by changing the series spring of the ankle exoskeleton (FIG. 5.1.A). Five of them were achieved by attaching different compression springs (Diamond Wire Spring, Glenshaw, Pa.) at the end of the series elastic actuators. One was realized by getting rid of the spring in the structure, in which case the system passive stiffness is solely determined by the stiffness of the synthetic rope in Bowden cable. The list of springs used and their corresponding properties are available in Table 5.3.

TABLE 5.3

List of springs used in experiments with assigned ID

| Passive Stiffness ID | S1 | S2 | S3 | S4 | S5 | S6 |
|---|---|---|---|---|---|---|
| Spring Part No. | DWC-148M-13 | DWC-162M-12 | DWC-187M-12 | DWC-225M-13 | DWC-250M-12 | No Spring |
| Length (m) | 0.635 | 0.0508 | 0.0508 | 0.0635 | 0.0508 | — |
| Spring Rate (N/m × $10^3$) | 15.1 | 27.5 | 50.1 | 103.1 | 235.7 | — |
| Max Load (N) | 413.7 | 578.3 | 778.4 | 1641.4 | 2246.4 | — |

Figure 14:
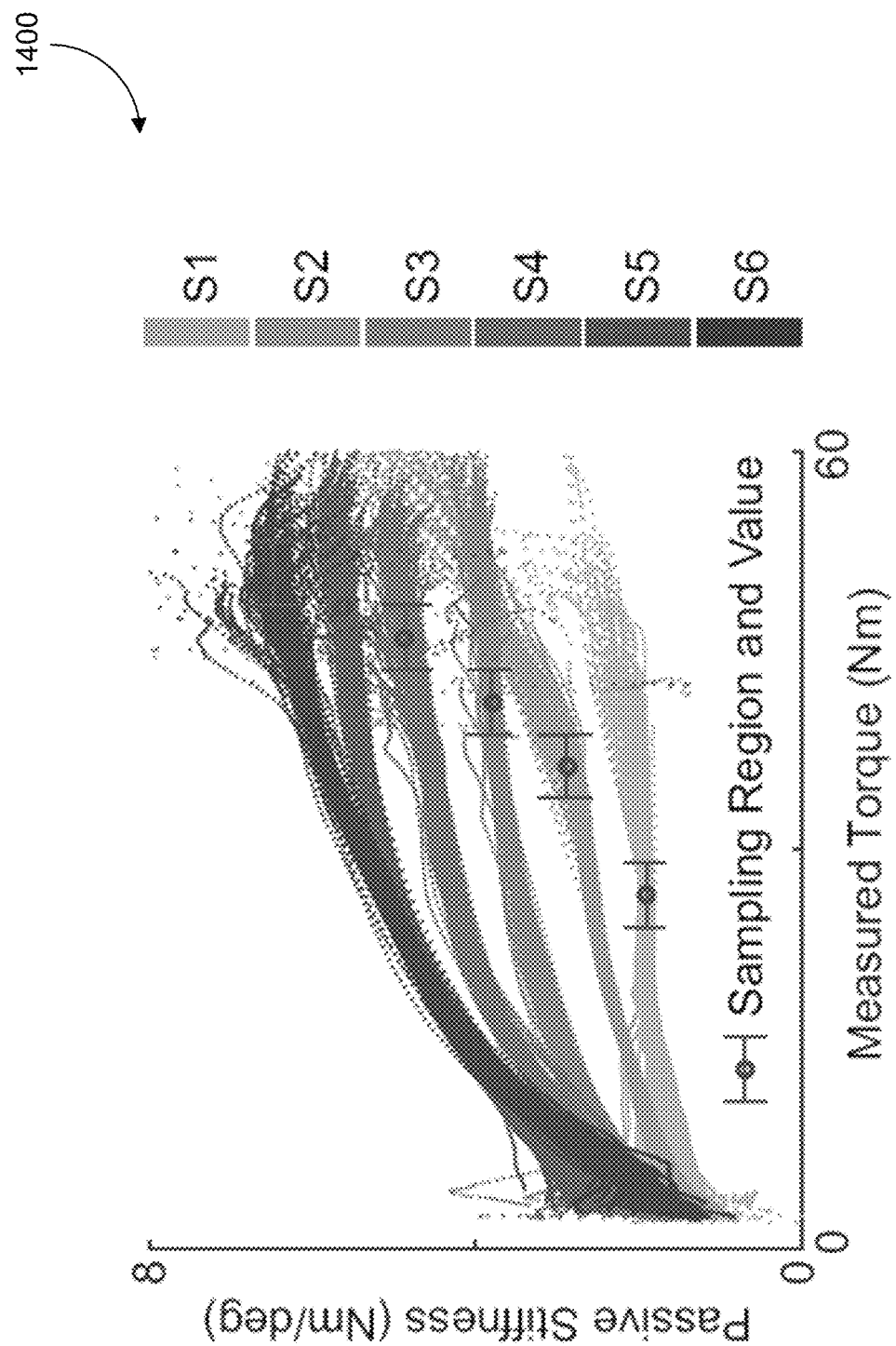

The effective passive stiffness values of various spring configurations, Kt, are evaluated based on passive walking data. For each of six passive stiffness configurations, the human subject walks on the treadmill for at least one hundred steady steps wearing the exoskeleton with the motor position fixed at the position where force starts to be generated with the subject standing in neutral position. Such walking sessions were repeated multiple times for the same passive stiffness. For each session of one hundred steps, the instantaneous value of passive stiffness at each time stamp was calculated and presented in relation to the measured torque values. FIG. 14 presents such plots 1400 of passive walking sessions for different spring configurations, one session for each configuration. Median of the instantaneous passive stiffness values within the stabilized region was defined as the stabilized passive stiffness value of the session. For any spring configuration, its stabilized region is defined as a 5.65 Nm torque range, within which the change of trend for the instantaneous passive stiffness averaged over all sessions is minimum.

The difference between the desired and passive stiffnesses is an important index since Hypotheses 1 and 2 state that the optimal passive stiffness for torque tracking equals the desired quasi-stiffness and torque errors are closely related to the difference between the two. In analyzing the results, this value is defined as the algebraic difference between the desired and passive values, i.e., $K_t$-$K_{des}$.

The key to be able to compare the influence of passive stiffness on torque tracking performance under a fixed desired quasi-stiffness is to evaluate the 'best' tracking performance under each passive stiffness configuration. This was done by evaluating the tracking errors of multiple tests, each with different feedback control gains. The lowest error across these trials was then assigned as the estimate of the actual optimal performance with this passive stiffness.

For each combination of desired and passive stiffnesses, the initial session had fairly low proportional and damping gains. The gains were gradually increased across trials until perceptible oscillations were detected with maximum damping gain. Depending on the initial gains and step sizes of gain tuning, number of trials varies for each stiffness combination. Sometimes, the gains are lowered in the final sessions to achieve better gain tuning resolution. On average, around ten trials were conducted for each stiffness combination.

Identification of the best torque tracking performance for a specific desired and passive stiffness combination is crucial. The step-wise root-mean-squared (RMS) torque tracking errors averaged over the one hundred steady steps was calculated as its performance indicator. For each combination of desired and passive stiffnesses, the RMS error values of all trials with different gains were compared. The lowest of them was recorded as the estimate of optimal torque error for the corresponding stiffness combination. The control gains of the corresponding data set were recorded as the estimates of optimal control gains.

Then, the lowest torque tracking errors and the control gains for all stiffness combinations were investigated against the difference between desired and passive stiffness values to test the hypotheses. This process is demonstrated in graph 1500 of FIG. 15, which presents the control gains, sequence, resulting RMS torque errors and the corresponding oscillation levels of measured torques for each data set with one combination of desired and passive stiffness.

Figure 15:
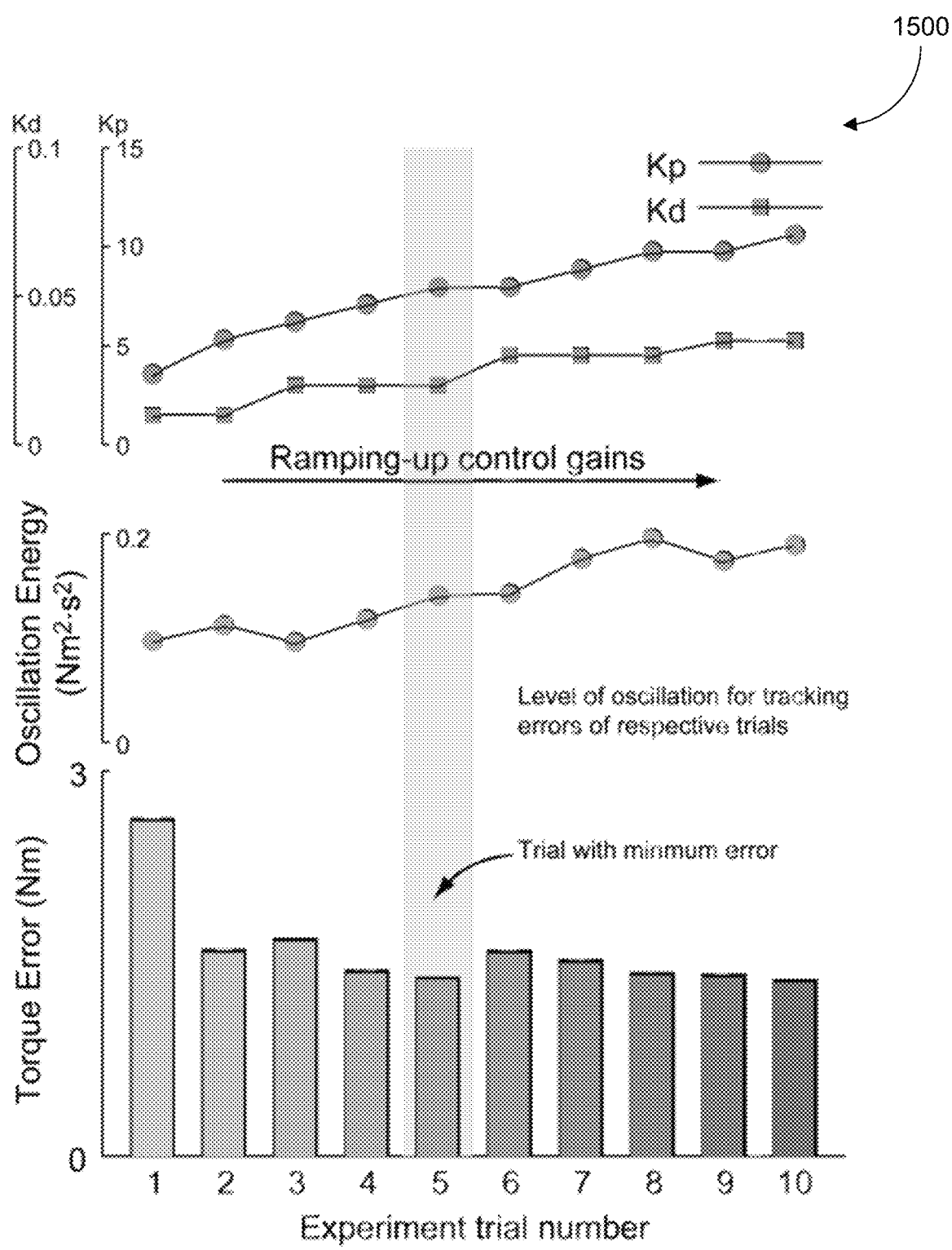
Figure 16:
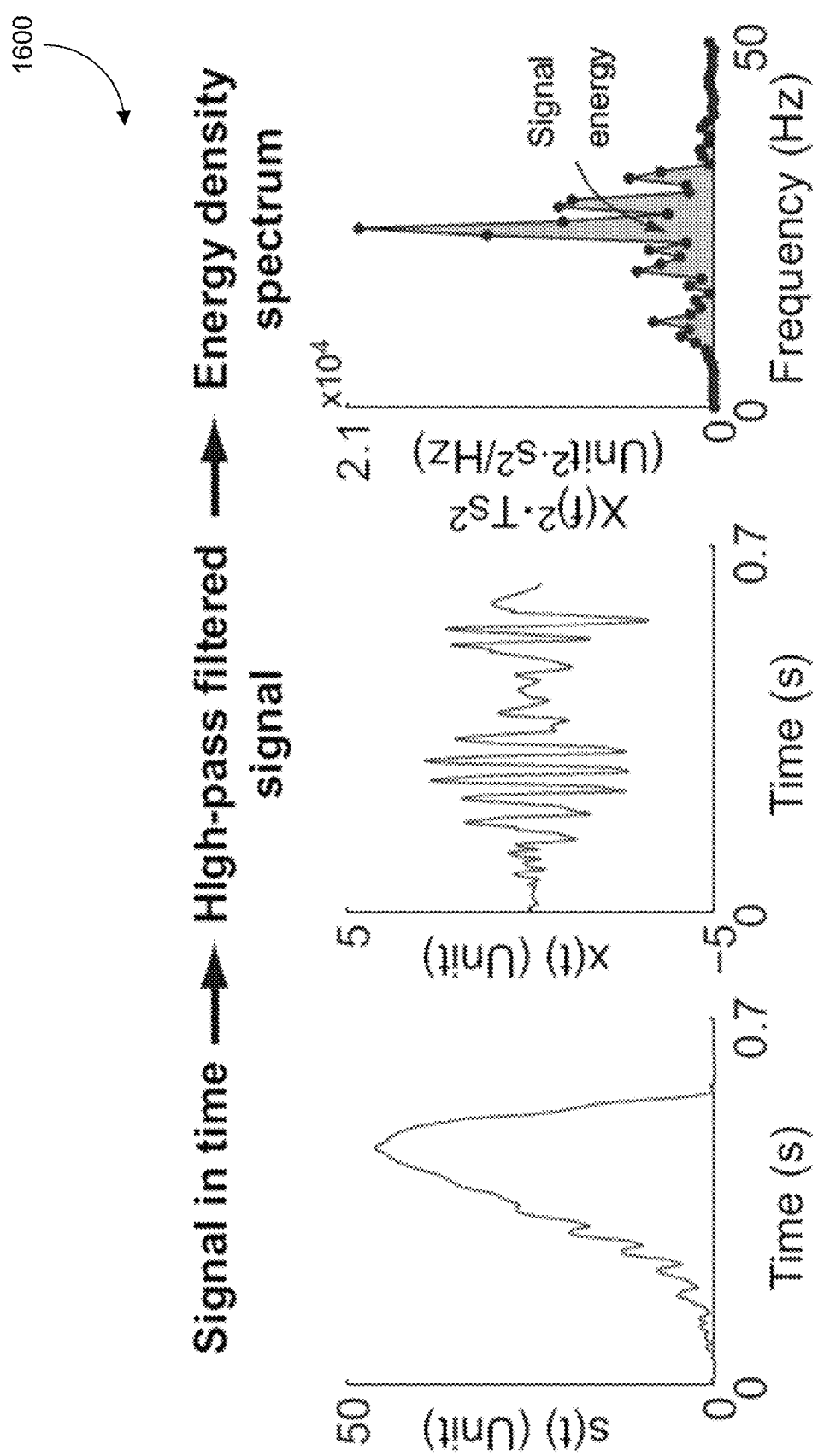

The level of oscillation included in FIG. 15 is an indicator defined to show the amount of oscillations in the control results of each test. As exemplified in graph 1600 of FIG. 16, oscillation level is defined as the mean stride-wise oscillation energy of the torque tracking error signal above 10 Hz. The total oscillation energy of a signal s(t) within one stance period is achieved by firstly high-pass filtering it at 10 Hz. The filtered signal, x(t), is converted to frequency domain using Fast Fourier Transform. The resulting signal in frequency domain, X(f), is used to construct the energy spectral density as $X(f)^2 \cdot Ts^2$. The total energy of oscillation of signal s(t) is then calculated as the integral of the energy spectral density. The level of oscillation of a signal is then achieved by averaging the stride-wise torque error oscillation energy.

The resulting stabilized passive stiffness values are listed in Table 5.4. Although the reported spring stiffness values span a huge range (Table 5.3), the actual maximum value is only around three times the minimum due to the existence of the Bowden cable synthetic rope in series with the spring, which exhibits the property of a nonlinear spring.

Over five hundred successful tests, each identified by a unique combination of control gains, desired curve and passive stiffness, were conducted with different linear and piece-wise linear curves and used for data analysis.

TABLE 5.4

List of measured stabilized passive stiffness values

| Passive Stiffness ID | S1 | S2 | S3 | S4 | S5 | S6 |
|---|---|---|---|---|---|---|
| $K_t$ (Nm/deg) | 1.9 | 2.8 | 3.7 | 4.7 | 5.6 | 5.9 |

Over five hundred successful tests, each identified by a unique combination of control gains, desired curve and passive stiffness, were conducted with different linear and piece-wise linear curves and used for data analysis.

Figure 17:
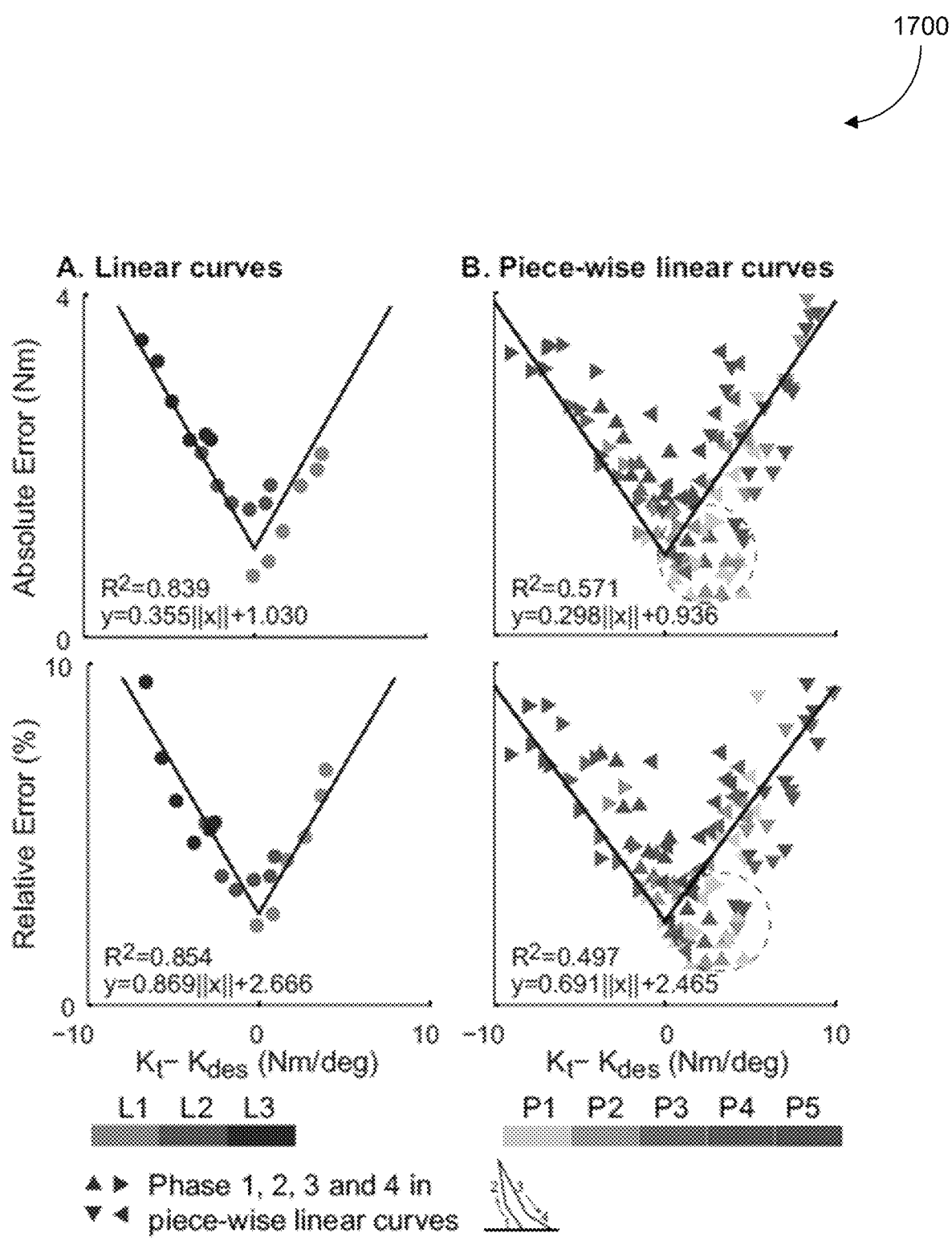

Estimated optimal tracking errors, i.e., the RMS torque errors of the data sets with minimum errors, for linear curves are approximately linearly related to the absolute difference between desired and passive stiffness values as hypothesized by Hypothesis 1 and 2 (graph 1700 of FIG. 17). It can be observed that torque errors show strong linear correlation with the absolute value of $K_t - K_{des}$ in cases of both individual desired curves and all curves combined. Minimum torque errors for all curves combined are linearly related to a translated absolute value of $K_t - K_{des}$, i.e.:

$$e_{\tau, opt, RMS} = a \cdot \|K_t - K_{des}\| + b \quad (5.40)$$

with a coefficient of determinant R2=0.839 at a slope of a=0.355 for the absolute ones and R2=0.854 at a=0.869 for the relative ones.

For piece-wise linear curves, the RMS torque errors of separate phases for data sets with minimum errors are also well correlated to their corresponding differences between the passive and desired stiffnesses (graph 1700 of FIG. 17). The absolute and relative errors for all phases and curves combined are fitted with the translated absolute value of $K_t - K_{des}$ with coefficients of determination R2=0.571 and R2=0.497 respectively. The slopes are a=0.298 and a=0.691. Note that for phases 1, 2 and 4, a fixed desired slopes exists in all steps of all data sets for the same desired curve. However, for phase 3, since the peak dorsiflexion angle is different for each step of each data set, the desired slope for a trial with minimum errors is defined as the phase 3 slope in its average stride.

For the cases of both curve types, results (FIG. 17) agree with Corollary 2, and thus both Hypothesis 1 and 2, which serve as bases for it.

Figure 18:
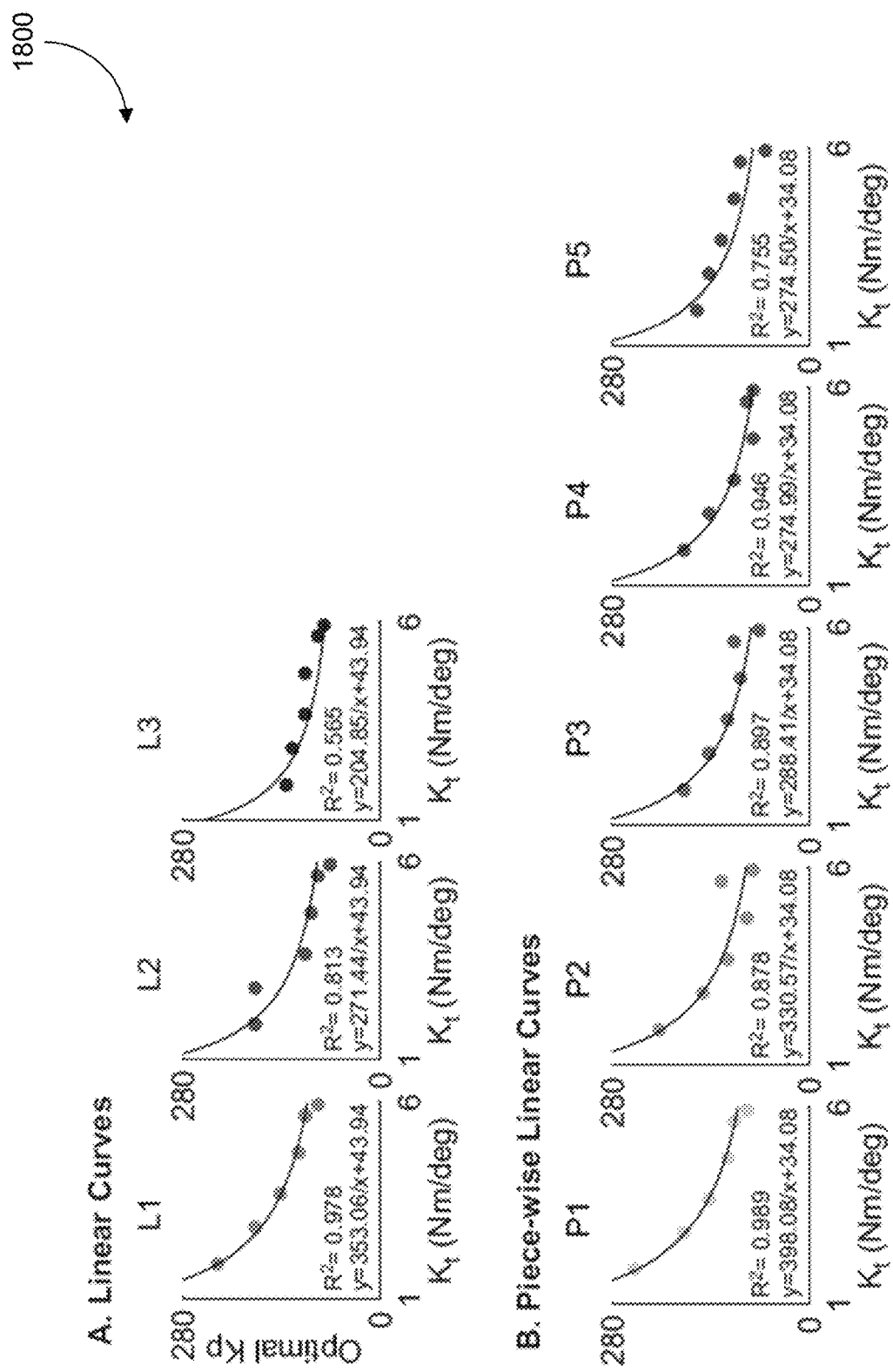

Control gains show interactions with desired and passive stiffnesses (graph 1800 of FIG. 18). The proportional gains of the trials with minimum errors for all desired curves, which are the estimates of optimal proportional gains, saw strong inversely proportional correlation with passive stiffness values (R2≥0.565). For each desired curve, data were fitted into a curve with the same format as Eq. (5.30), in which the same λ values were asserted for all curves of the same type, i.e., linear or piece-wise linear. This result agrees with Hypothesis 3, which is based on Conjecture 1.

The $K_p$-$K_t$ coefficient, σ, as identified in FIG. 18 was also seen to be inversely proportional to the desired stiffness (graph 1900 of FIG. 19), which agrees with Hypothesis 4 based on Conjecture 1. Note that for each piece-wise linear curve, its effective desired stiffness is defined the mean of phase-wise desired stiffness values averaged over all the six best-performed data sets, one for each spring configuration.

Although a simplified model of the transmission subsystem was considered, torque tracking results in FIG. 17 for linear curves highly agrees with Hypothesis 1 & 2. However, the phase-wise errors for piece-wise linear curves show slightly less agreement with the hypothesis. One reason is that the control gains were optimized based on full-step instead of phase-wise performance. According to the interactions between optimal proportional gains, desired stiffness and passive stiffness presented in FIG. 18, for the same passive stiffness configuration, a larger desired stiffness results in a smaller optimal proportional gain. However, the level of oscillations and step-wise root-mean-squared torque errors are collectively determined by tracking performance of all four phases. Therefore, the optimal proportional gain for a piece-wise linear curve is expected to be higher than the optimal gain for the phase with largest desired stiffness and lower than the one with smallest. This means that the phase-wise torque errors in piece-wise linear curves are noisier than those of linear curves. Another issue was that for some phases, for example phase 1 of P1, P2 and P3, the desired torques were very low. Since the Bowden cable rope was still slacking at the beginning of stance, the effective passive stiffness values were actually a lot smaller than the stabilized values used in data analysis. Therefore, many data points as circled in FIG. 17 should be shifted to the left, which will improve the fitting. The effective difference in desired and passive stiffness was evaluated, $K_t-K_{des}$, of piece-wise linear curves for full steps and present torque errors in a way similar to the linear curves in FIG. 17. The effective desired stiffness of piecewise linear curves was generated by linearly fitting the average stride and use it to then calculate $K_t-K_{des}$. Another method was to calculate the difference as the area between desired stiffness versus torque curve and passive stiffness versus torque curve. For both cases, the relationships between torque errors and effective stiffness differences showed significantly less agreement with Eq. (5.28) than FIG. 17. This suggests that when Hypothesis 1 and 2 are used in guidance to choose passive stiffness, the concerning desired stiffness value $K_t$ should be the instantaneous values instead of a collective determined values.

Meanwhile, there are other factors that add noise and complexions to the data, which causes imperfection in curve fitting and non-zero torque errors at $K_t=K_{des}$ as shown in FIG. 17. The first factor is the method used. The optimal performance of each desired and passive stiffness combination were achieved by gradually increasing proportional and damping injection gains until perceptible oscillations happen with maximum damping gains. There are multiple noise sources cased by this test scheme. The most obvious one is the testing of discrete gain values, which results in the fact that the gain values of the best-performed test are mostly not the optimal gains but actually values close to them. Second, increase of control gains stop when the oscillations become noticeable for the subject, which makes the stopping criteria subjective. Although the same subject was use throughout all tests, adaptation and subject physical condition both affect the subject's judgment of when discomfort starts, which potentially leads to higher gains tested when the subject has higher tolerance. In some cases, increase of gains stop before the torque errors hit minimum due to inability of human to tolerate oscillations, which affects the estimation of minimum torque errors and optimal control gains. Besides subjectivity of testing, actual changes in system dynamics also causes noises in data. These changes include subject physical condition across tests, human body instant mechanical properties changes due to muscle tensioning, gait variations and movements in human-exoskeleton interface. Another reason that led to imperfection in the alignment between theory and results is the employment of a highly simplified system partial model. Due to the presence of nonlinear, uncertain, highly complex and changing dynamics, a lot of system features were not captured in the theoretical hypothesis. One complication that contributed was the nonlinear property of the system passive stiffness due to the slow stretching property of the Vectran cable as demonstrated by FIG. 14. Due to the unstructured changes of passive stiffness between different loads and trials, only one stabilized value was used for each passive stiffness configuration. Another feature that causes complication into system dynamics but was not accounted for in theoretical analysis was the highly nonlinear, complex and changing frictions in Bowden cable. Besides, the assumption was made of immediate perfect motor position tracking, which is not true in practical cases due to the limitation of motor velocity. This greatly contributed to the fact that when the passive stiffness matches desired stiffness, i.e., $K_t=K_{des}$, torque errors is above zero under optimal control conditions.

Figure 19:
Figure 19:
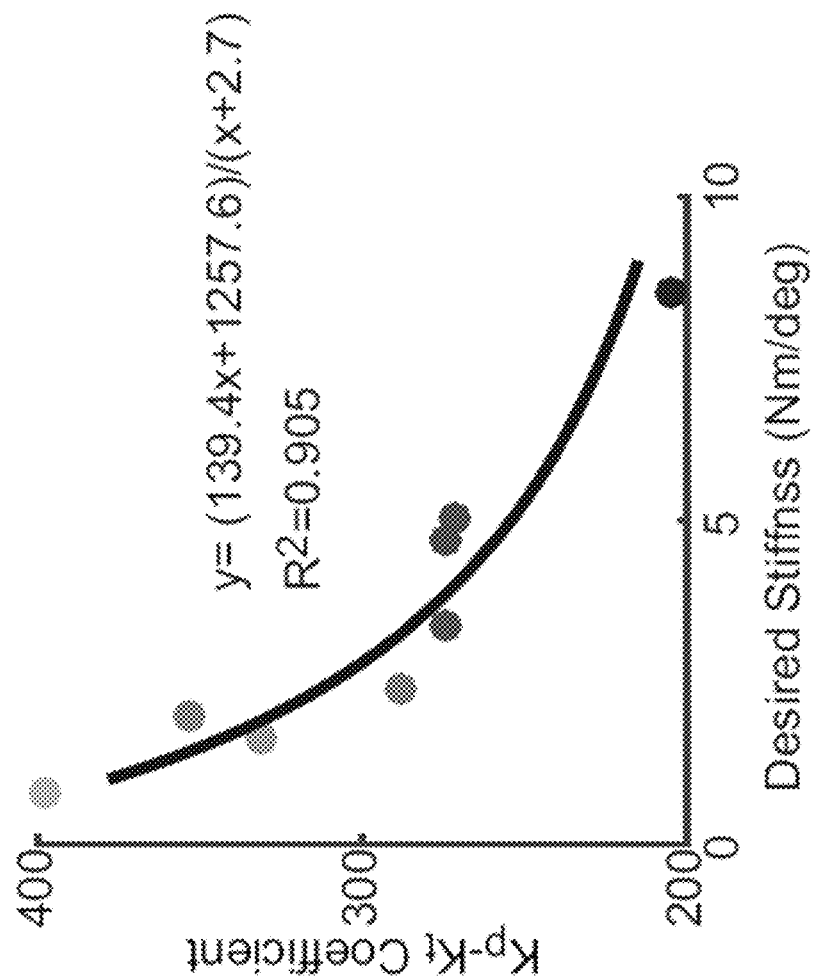

Regardless of the various approximations made in various hypotheses, the results presented FIGS. 17-19 support them with fairly strong correlations. The conjecture of a fixed bandwidth and thus a maximum torque error tracking rate, $e_{\tau,max}$, as a limit for proportional gain increase suggests a potential way of systematic gain tuning when desired or passive stiffness is changed for the same subject. Since the dependence of this maximum error changing rate on full system dynamics, it is expected it is subject-dependent for the same motor system.

The unidirectional Bowden cable is not the dominant factor in the observed patterns of torque error. The onset of applied torque tended to lag that of desired torque, particularly with feedback controllers and TIME based desired torque. This pattern might suggest that slack in the Bowden cable as the primary cause of torque error, but this is not the case. All high-level controllers set desired torque to zero during the beginning of stance, from about 0 to 0.25 s, consistent with typical human ankle torque patterns. All low-level controllers acted to track desired torque throughout stance, quickly eliminating slack from the previous swing phase early in the period of zero desired torque. The Bowden cable was therefore not slack upon the onset of desired torque. This is evident from the pattern of torque with feedback control and ANGLE based desired torque, which led desired torque beginning at about 0.10 s. Patterns in torque error across controllers are better-explained by a combination of rapid changes in desired torque, rapid movements of the human, and electromechanical delays in applying desired changes in motor position. These issues are common to most lower-limb exoskeletons, especially systems using series-elastic actuation.

Based on the present results, there is reason to expect that the combination of feedback control and feed-forward iterative learning, without continuous-time integration or model-based compensation, will provide strong torque tracking performance in any such system. Other control elements might further improve performance for some systems and control objectives. For example, if system dynamics are relatively constant and easy to identify, model-based compensation might be useful. If the measured and desired torque both change slowly, continuous-time integral control may also lead to some improvements. In any case, proportional-learning-damping control is expected to provide good baseline torque tracking.

A number of exemplary embodiments have been described. Nevertheless, it will be understood by one of ordinary skill in the art that various modifications may be made without departing from the spirit and scope of the techniques described herein.

Appendix A-

Stability and Convergence of the Passivity Based Controller

Passivity

Substituting Eq. (19) into Eq. (18), there is the closed-loop equation:

$$\frac{1}{K_v}\dot{s} + \frac{K_1}{K_v}s + K_p e_\tau + K_s s + Y_d(\tau, \dot{\tau}_r, \ddot{\tau}_r, \theta_e)\Delta\Gamma = \frac{K_h}{K_v}\tau_h. \quad (34)$$

in which $\Delta\Gamma = \Gamma - \hat{\Gamma}$

Let the output be $y = s$, multiplying both side of Eq. (34) by the output and then integrating it:

$$\int_0^t \frac{K_h}{K_v}s(\varsigma)\tau_h(\varsigma)d\varsigma$$
$$= \int_0^t [\frac{1}{K_v}s(\varsigma)\dot{s}(\varsigma) + \frac{K_1}{K_v}s^2(\varsigma)$$
$$+ K_p \dot{e}_\tau(\varsigma)e_\tau(\varsigma) + K_p \lambda e_\tau^2(\varsigma)$$
$$+ K_s s^2(\varsigma) + s(\varsigma)Y_d(\varsigma)\Delta\Gamma(\varsigma)]d\varsigma$$
$$= \underbrace{P(t) - P(0)}_{\text{Stored Energy Change}} + \underbrace{\int_0^t W(\varsigma)d\varsigma}_{\text{Dissipated Energy}}$$

in which the stored system energy is $$P = \frac{1}{2K_v}s^2 + \frac{1}{2}K_p e_\tau^2 + \frac{1}{2}\Delta\Gamma^T L^{-1}\Delta\Gamma \geq 0, \quad (35)$$

and the energy dissipating rate is $$W = (\frac{K_1}{K_v} + K_s)s^2 + K_p \lambda e_\tau^2 \geq 0. \quad (36)$$

Since both $V$ and $W$ are non-negative, this shows the passivity of output $y$ for the system (34).

With no disturbance from a user, i.e., $\tau_h = 0$, there is:

$$\dot{P} = -W.$$

Convergence

To compensate for non-zero human loading, $\tau_h \neq 0$, an additional switching term is added to the controller $$V_a = -K_p e_\tau - K_s s + Y_d(\tau, \dot{\tau}_r, \ddot{\tau}_r, \theta_e)\tilde{\Gamma} - K_{sw}\text{sign}(s) \quad (37)$$

where $K_{sw}$ is the compensation gain. With Eq. (37), the closed loop system equation becomes $$\frac{1}{K_v}\dot{s} + \frac{K_1}{K_v}s + K_p e_\tau + K_s s + Y_d(\tau, \dot{\tau}_r, \ddot{\tau}_r, \theta_e)\Delta\Gamma$$

$$-\frac{K_h}{K_v}\tau_h + K_{sw}\text{sign}(s) = 0. \quad (38)$$

The integral of the product of $y = s$ with the above equation is $$\int_0^t [\frac{1}{K_v}s(\varsigma)\dot{s}(\varsigma) + \frac{K_1}{K_v}s^2(\varsigma)$$
$$+ K_p \dot{e}_\tau(\varsigma)e_\tau(\varsigma) + K_p \lambda e_\tau^2(\varsigma)$$
$$+ K_s s^2(\varsigma) + s(\varsigma)Y_d(\varsigma)\Delta\Gamma(\varsigma)$$
$$- s\frac{K_h}{K_v}\tau_h + sK_{sw}\text{sign}(s)]d\varsigma$$

$$= \underbrace{P(t) - P(0)}_{\text{Stored Energy Change}} + \underbrace{\int_0^t W(\varsigma)d\varsigma}_{\text{Dissipated Energy}}$$

$$+ \int_0^t [-s\frac{K_h}{K_v}\tau_h + sK_{sw}\text{sign}(s)]d\varsigma$$

$$= 0,$$

i.e., $$\dot{P} = -W + s\frac{K_h}{K_v}\tau_h - sK_{sw}\text{sign}(s). \quad (39)$$

Note that $$s\frac{K_h}{K_v}\dot{\tau}_h - sK_{sw}\text{sign}(s) = s\frac{K_h}{K_v}\dot{\tau}_h - K_{sw}|s|$$

$$\leq \frac{K_h}{K_v}|s|k_0 - K_{sw}|s|$$

where $k_0$ is a finite non-negative number defined by the boundedness of the human loading:

$$|\dot{\tau}_h| \leq k_0.$$

By choosing a $K_{sw}$ such that:

$$K_{sw} \geq \frac{K_h}{K_v}k_0,$$

there is:

$$s\frac{K_h}{K_v}\dot{\tau}_h - sK_{sw}\text{sign}(s) \leq 0. \quad (40)$$

It is already established that:

$$W \geq 0,$$

therefore, it is proved that:

$$\dot{P} \leq 0.$$

Based on the non-negativeness of P and non-positiveness of P, there is:

$$P(t) \leq P(0),$$

i.e., $P(t)$ is bounded. Since $P$ is quadratic on $s$, $e_\tau$ and $\Delta\Gamma$, these three terms are bounded. Eq. (39) means $$P(t) - P(0)$$
$$= -\int_0^t W(\varsigma)d\varsigma + \int_0^t \left[ s(\varsigma)\frac{K_h}{K_v}\tau_h(\varsigma) - K_{sw}|s(\varsigma)| \right] d\varsigma. \quad (41)$$

Combining Eq. (41) with Eq. (40) and (36), there is:

$$P(t) - P(0) \leq -\int_0^t W(\varsigma)d\varsigma \leq 0. \quad (42)$$

By definition, Eq. (36) and (42.) lead to $$s, e_\tau \in L_2(0, \infty). \quad (43)$$

Based on the definition of $s$, $e_\tau$ is also bounded, and hence so is $\tau$ since $\tau_{des}$ is bounded. The boundedness of $e_\tau$ proves the unifolm continuity of $e_\tau$.

Now due to the boundedness of $\tau_{des}$ and $\dot\tau_{des}$, $\tau_r$ and $\dot\tau_r$ are also bounded, which then lead to the boundedness of $Y_d(\tau_1\ \dot\tau_1\ \tau\ \Theta)$. Based on Eq. (38), $\dot s$ is then bounded, which then proves the uniform continuity of $s$.

Combining the conclusions of uniform continuity, boundedness and Eq. (43), there is:

$$s \to 0, \text{ as } t \to \infty,$$
$$e_\tau \to 0, \text{ as } t \to \infty.$$

By the definition of $s$ and $e_\tau$. it follows that:

$$\tau \to \tau_{des}, \text{ as } t \to \infty,$$
$$\dot\tau \to \dot\tau_{des}, \text{ as } t \to \infty.$$

i.e., both the actual ankle torque and its changing rate converge to the desired values.

Appendix B. Neuromuscular Reflex Model

Figure 13:
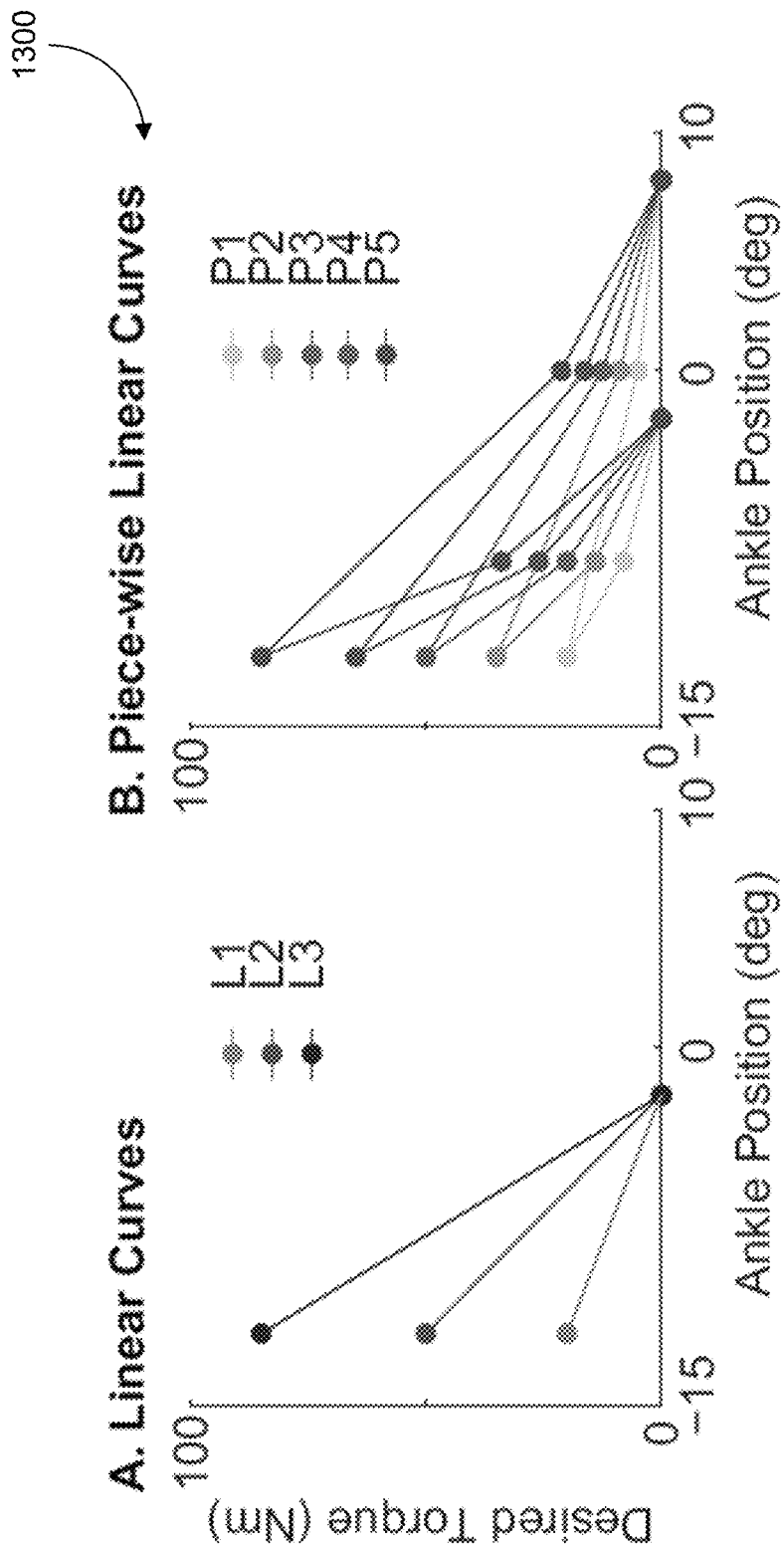
FIGS. 13-19 show graphs of spring stiffness optimization data.

The neuromuscular model included a Hill-type muscle-tendon unit (MTU), shown in FIG. 13.

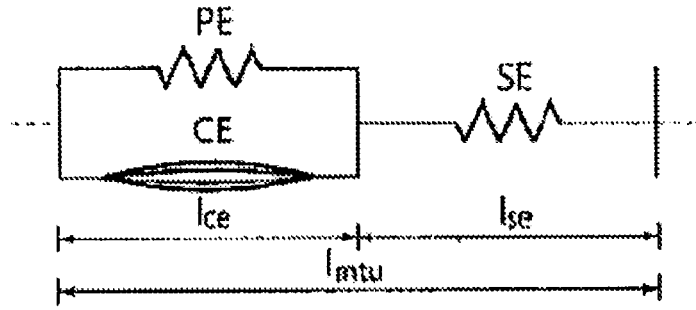

Fig. 13. The Hill-type muscle-tendon-unit model includes a contractile element (CE), a parallel elastic element (PE) and series elastic element (SE).

The MTU includes a total length, $l_{mtu}$, equal to the length of the series elastic element, $l_{se}$ plus that of the contractile element, $l_{ce}$. The length of the parallel elastic element, $l_{pe}$, was identical to $l_{ce}$. The total force produced by the MTU, $F_{mtu}$, was equal to the force on the series elastic element, $F_{se}$, and also equal to the sum of the contractile element force, $F_{ce}$, and the parallel elastic element force, $F_{pe}$ (which was usually zero). The contractile element force was expressed as:

$$F_{ce} = f_L(l_{ce}) \cdot f_V(\dot{l}_{ce}) \cdot Act \cdot F_{max}$$

in which $f_L(l_{ce})$ and $f_V(l_{ce})$ are force scaling factors that reflect the force-length and force-velocity properties of muscle, Act is the muscle activation state, and $F_{max}$ is the maximum force that can be produced by the muscle. The force-length and force-velocity relationships were:

$$f_L(l_{ce}) = \exp\left[-\frac{(l_{ce} - l_{ce,opt})^2}{(W \cdot l_{ce,opt})^2}\right],$$

and $$f_V(\dot{l}_{ce}) = \begin{cases} A\dfrac{v_{max} + F_v^{max} \cdot \dot{l}_{ce}}{v_{max} \cdot A + \dot{l}_{ce}}, & \dot{l}_{ce} < 0 \\ \dfrac{v_{max} \cdot A + F_v^{max} \cdot (A+1) \cdot (F_v^{max} - 1)}{v_{max} \cdot A + \dot{l}_{ce} \cdot (A+1) \cdot (F_v^{max} - 1)}, & \dot{l}_{ce} \geq 0. \end{cases}$$

in which $l_{ce,opt}$ is the optimal contractile element length, $W$ is a force-length constant, $\dot{l}_{ce}$ is the contractile element velocity, $A$ is a force-velocity constant, $v_{max}$ is the maximum contraction velocity, and $F_v^{max}$ is the maximum eccentric (lengthening) muscle scaling factor.

Series and parallel elastic element forces were determined as:

$$F_{se} = F_{max} \cdot \frac{1}{(u_{max} \cdot l_{se,sl})^2} \cdot \max(\delta l_{se}, 0)^2,$$

and $$F_{pe} = \begin{cases} k_1 \cdot \delta l_{pe} + F_{max} \cdot \dfrac{k_{pe}}{l_{ce,opt}^2} \cdot \delta l_{pe}^2, & \delta l_{pe} > 0, \\ k_1 \cdot \delta l_{pe}, & \delta l_{pe} \leq 0. \end{cases}$$

where $Ol_{pe} = l_{ce} - 1.5 \cdot l_{ce,opt}$ and $\delta l_{se} = l_{se} - l_{se,sl}$, and $l_{se,sl}$ is the slack length of the series elastic element, $U_{max}$ is an elastic element curve parameter and $k_1$ is the sub-slack elastic element stiffness of the parallel elastic element.

The virtual muscle had activation dynamics as:

$$Act(t=0) = PreAct,$$
$$\dot{Act} = (Stim - Act) \cdot \left(\frac{Stim}{t_a} - \frac{1-Stim}{t_d}\right)$$

where $Stim$ is neural stimulation from the positive reflex mechanism of the virtual neural system, $t_a$ and $t_d$ are muscle activation and deactivation time constants respectively, and the initial activation value A (t = 0) is defined by $PreAct$.

The parameter values are listed in Table 6.

Table 6: Muscle model parameter values used in NMM

| Param | Value | Param | Value |
|---|---|---|---|
| $l_{ce,opt}$ | 0.055 m | $l_{se,sl}$ | 0.245 m |
| $l_{mtu,0}$ | 0.284 m | $F_{max}$ | 1000 N |
| A | 0.25 | W | 0.56 |
| $F_{v,max}$ | 1.8 | $u_{max}$ | 0.04 |
| $v_{max}$ | 0.55 m/s | $k_1$ | 1 |
| $t_a$ | 0.02 s | $t_d$ | 0.05 s |
| $PreAct$ | 0.05 | | |

Appendix C- PD*+ΔRN versus LRN+PD*

For controller $L9$, i.e., PD*+ΔLRN, as described in Eq. (27), the total desired motor displacement at a certain time stamp $t$ within step $n$, with a forgetting factor $\beta = 1$ and a filtering factor $\mu = 1$, is $$\Delta\theta_{p,des}(n)\bigg|_t = \underbrace{\Delta\theta_{p,des}^{LRN}(0)\bigg|_t - K_I \sum_{m=1}^{n-1} e_\tau(m)\bigg|_t}_{\text{Step-wise Integral Control}}$$

$$\underbrace{-K_p e_\tau(n)\bigg|_t}_{\text{Proportional Control}} \underbrace{-K_d \dot{\theta}_p(n)\bigg|_t}_{\text{Damping Injection}}$$

in which the operator $$*(n)\Big|_t$$

denotes the variable* at time $t$ within step $n$, i.e., time lapsed from the latest heel strike. The term $$\Delta\theta_{p,des}^{LRN}(0)\Big|_t$$

denotes the initial value of the desired motor displacement to be learned. Iterative learning of desired motor displacement realizes a step-wise integral control action, Considering Eq. (44), it can be seen that $L9$ is analogous to traditional PID control; damping injection improves system stability in the manner of derivative control, and iterative learning takes eliminates steady-state errors across steps similar to integral control.

For controller $L8$, LRN+PD*, combining Eqs. (26) and (12), there is:

$$\theta_{p,des}(n)\Big|_t = \frac{1}{\beta}\Delta\theta_{p,des}(n)\Big|_t$$
$$= \frac{1}{\beta}\Big[\theta_{p,des}^{LRN}(0)\Big|_t - K_i\sum_{m=1}^{n-1}e_\tau(m)\Big|_t - \theta_p(n)\Big|_t$$
$$-K_p e_\tau(n)\Big|_t - K_d \dot{\theta}_p(n)\Big|_t\Big] \quad (37)$$

when $\beta = I$ and $\mu = I$.

Assuming perfect motor velocity tracking:

$$\dot{\theta}_p(n)\Big|_t = \dot{\theta}_{p,des}(n)\Big|_t \quad (38)$$

then Eq. (26) becomes $$\dot{\theta}_p(n)\Big|_t = \frac{1}{T}\left[\theta_{p,des}^{LRN}(0)\Big|_t - K_I \sum_{m=1}^{n-1} e_\tau(m)\Big|_t - \theta_p(n)\Big|_t \right.$$
$$\left. - K_p e_\tau(n)\Big|_t - K_d \dot{\theta}_p(n)\Big|_t\right] \quad (39)$$

which can be written as:

$$\dot{\theta}_p(n)\Big|_t = -\frac{1}{T+K_d}\theta_p(n)\Big|_t$$
$$+\frac{1}{T+K_d}\left[\theta_{p,des}^{LRN}(0)\Big|_t - K_I \sum_{m=1}^{n-1} e_\tau(m)\Big|_t \right. \quad (40)$$
$$\left. - K_p e_\tau(n)\Big|_t\right]$$

Assuming the same ankle kinematics for each step and the same motor position at each heel strike:

$$\theta_p(n)\Big|_0 = \theta_p\Big|_0,$$

the dynamics described in Eq. (40) can be treated as a linear time-invariant system starting from the latest heel strike in the format of $$\dot{x} = Ax + Bu \quad (41)$$

where $x$ is $\theta_p(n)$, $A$ is $-\frac{1}{T+K_d}$, and $Bu$ is $$\frac{1}{T+K_d}\left[\theta_{p,des}^{LRN}(0)\Big|_t - K_I \sum_{m=1}^{n-1} e_\tau(m)\Big|_t - K_p e_\tau(n)\Big|_t\right]$$

$$\Delta\theta_{p,des}(n)\Big|_t = \underbrace{\theta_{p,des}^{LRN}(0)\Big|_t - K_I \sum_{m=1}^{n-1} e_\tau(m)\Big|_t}_{\text{Step-wise Integral Control}} \underbrace{-K_p e_\tau(n)\Big|_t}_{\text{Proportional Control}} \underbrace{-K_d \theta_p(n)\Big|_t}_{\text{Damping Injection}} \quad (43)$$

$$-\theta_p\Big|_0 \exp(-\frac{t}{T+K_d}) - \frac{1}{T+K_d}\int_0^t \exp(-\frac{t-\varsigma}{T+K_d})\left[\theta_{p,des}^{LRN}(0) - K_I\sum_{m=1}^{n-1} e_\tau(m)\Big|_\varsigma - K_p e_\tau(n)\Big|_\varsigma\right]d\varsigma$$

Therefore, the solution of LTI system as described in Eq. (40) is $$\theta_p(n)\Big|_t = \theta_p\Big|_0 \exp(-\frac{t}{T+K_d})$$
$$+ \frac{1}{T+K_d}\int_0^t \exp(-\frac{t-\varsigma}{T+K_d})\left[\theta_{p,des}^{LRN}(0)\Big|_t\right.$$
$$\left. -K_I \sum_{m=1}^{n-1} e_\tau(m)\Big|_\varsigma - K_p e_\tau(n)\Big|_\varsigma\right]d\varsigma \quad (42)$$

in which $t$ denotes the time elapsed since the last heel strike and $\varsigma \in [0, t]$ is a variable tracing $t$.

Therefore, the control input of $_L8$ can be expressed as in Eq. (43) (at the top of the current page). It can be seen that the LRN+PD" controller differs from the PD*+ΔLRN controller in that it has additional exponential and low-pass filtered continuous-time integral terms. These arise from the presence of -Θ$_p(n)$ in the control input.

This difference can also be illustrated in the frequency domain. The convolution term $$\int_0^t \exp(-\frac{t-\varsigma}{T+K_d})\left[\theta_{p,des}^{LRN}(0)\Big|_t\right.$$
$$\left. -K_I \sum_{m=1}^{n-1} e_\tau(m)\Big|_\varsigma - K_p e_\tau(n)\Big|_\varsigma\right]d\varsigma \quad (44)$$

translates to $$\frac{1}{s + \frac{1}{T + K_d}} \left[ \theta_{p,des}^{LRN}(0) \bigg|_s - K_I \sum_{m=1}^{n-1} e_\tau(m) \bigg|_s - K_p e_\tau(n) \bigg|_s \right] \quad (45)$$

in frequency domain. The low-pass filter term $$\frac{1}{s + \frac{1}{T + K_d}}$$

realizes constant scaling at low frequency and integration at high frequency. Each evaluation of the term to be filtered, $$\theta_{p,des}^{LRN}(0) \bigg|_t - K_I \sum_{m=1}^{n-1} e_\tau(m) \bigg|_t - K_p e_\tau(n) \bigg|_t$$

is generated independently at the sampling frequency. Therefore, the term is expected to have high frequency. A continuous-time integration effect is therefore included in the control input with the LRN+PD* controller.

Continuous-time integral action is not desirable due to the linear accumulation of terms that are not linearly correlated. Therefore, PD*+ΔLRN is preferred due to its simplicity and lack of continuous time integration for the system.

Appendix D

Supporting Materials: Comparison of torque control methods for tethered lower-limb exoskeletons during human walking.

Low-level torque controllers were collected in the same order for each high-level controller, except for a change in the order of the PAS controller for the Time-based desired torque (which was accidentally skipped, then caught at the end of the collection). The exact sequence is shown in Table S1.

| Sequence | Day 1 Afternoon | Day 2 Morning | Day 2 Afternoon | Day 3 Afternoon |
|---|---|---|---|---|
| | TIME | NMM | ANGLE | EMG |
| ↓ | PD* | PD* | PD* | PD* |
| | PD*+M | PD*+M | PD*+M | PD*+M |
| | PID* | PID* | PID* | PID* |
| | PD*+EDG | PD*+EDG | PD*+EDG | PD*+EDG |
| ↓ | PD*+PEC | PD*+PEC | PE+PEC | PD*+PEC |
| | LRN | PAS | PAS | PAS |
| | LRN+PD* | LRN | LRN | LRN |
| ↓ | PD*+ΔLRN | LRN+PD* | LRN+PD* | LRN+PD* |
| | PAS | PR+LRN | PD*+ΔLRN | PD*+ΔLRN |

Table SI: Data collection timeline

2 Ankle Angle versus Time

Fig. SI shows trajectories of exoskeleton ankle joint angles in time for 100 strides, and a Time-averaged trajectory, for each combination of high- and low-level controller. With Ankle-based and NMM-based desired torque, trajectories were similar to those of the biological ankle joint during normal human walking. With Time-based and EMO-based desired torque, less ankle excursion occurred on an average step. Variability in joint angle was highest when desired torque was based on Time.

3 Torque versus Ankle Angle

Fig. S2 shows ankle torque versus ankle angle for 100 strides, and the time-averaged torque versus time-averaged joint angle, for each combination of high and low-level controller. With ankle-based and NMM-based desired torque, trajectories were similar to those of the biological ankle joint during normal human walking. With EMO-based desired torque, torque-angle curves have consistent shape across torque controllers, characterized by very steep slopes in angle space with approximately infinite impedance in places. With time-based desired torque, torque-angle curves were complex and nonlinear. Changes in torque-angle relationships across low-level torque controllers within the same high-level controller (within the same column) suggest either interactions between torque control mode and human coordination pattern, or subject adaptations over time. Curves tend to move in a clockwise direction, indicating positive work production by the exoskeleton.

Fig. S3 shows the ankle torque versus ankle angle curve for 100 strides, and the time-averaged torque versus time-averaged joint angle, for the case when motor position was held constant. This passive relationship between joint angle and joint torque seemed to be related to the difficulty of tracking desired torques generated by different high-level controllers; desired curves that were closer to the passive curve seemed easier for, e.g., PD* control, while LRN control made larger improvements when the two curves were dissimilar.

4 T-Test Results for Controller RMS-E Values

Table SU-SV shows the t-test mean comparison p value of every two low level torque controllers within each high level controller. A significance level of $a=0.05$ was used. P-values that are beyond the threshold are shown in red. Almost all comparisons were highly statistically significant. Please see main text for effect size information.

|          | PD*      | PD*+EDG  | PD*+PEC  | PID*     | PD*+M    | PAS      | LRN      | LRN+PD*  |
|----------|----------|----------|----------|----------|----------|----------|----------|----------|
| PD*+EDG  | 1.1e-22  | .        | .        | .        | .        | .        | .        | .        |
| PD*+PEC  | 1.4e-20  | 4.2e-42  | .        | .        | .        | .        | .        | .        |
| PID*     | 6.1e-34  | 1.5e-52  | 2.9e-08  | .        | .        | .        | .        | .        |
| PD*+M    | 2.1e-169 | 4.2e-140 | 1.2e-174 | 4.0e-182 | .        | .        | .        | .        |
| PAS      | 1.3e-06  | 3.5e-32  | 2.8e-05  | 7.5e-17  | 1.1e-175 | .        | .        | .        |
| LRN      | 1.9e-94  | 7.1e-113 | 1.0e-84  | 8.9e-81  | 4.6e-178 | 6.1e-93  | .        | .        |
| LRN+PD*  | 6.3e-153 | 2.1e-107 | 2.7e-144 | 5.2e-114 | 7.9e-182 | 7.5e-126 | 3.7e-08  | .        |
| PD*+ΔLRN | 8.4e-157 | 9.8e-110 | 8.0e-149 | 2.7e-118 | 1.1e-182 | 1.7e-129 | 1.5e-15  | 5.6e-10  |

Table SII: Time-based desired torque RMS-E t-test $p$ values.

|          | PD*      | PD*+EDG  | PD*+PEC  | PID*     | PD*+M    | PAS      | LRN      | LRN+PD*  |
|----------|----------|----------|----------|----------|----------|----------|----------|----------|
| PD*+EDG  | 4.3e-143 | .        | .        | .        | .        | .        | .        | .        |
| PD*+PEC  | 9.3e-01  | 5.0e-145 | .        | .        | .        | .        | .        | .        |
| PID*     | 1.3e-06  | 7.2e-151 | 6.1e-07  | .        | .        | .        | .        | .        |
| PD*+M    | 3.4e-164 | 6.7e-130 | 2.8e-162 | 6.1e-164 | .        | .        | .        | .        |
| PAS      | 4.1e-01  | 1.3e-129 | 4.5e-01  | 1.8e-07  | 6.1e-173 | .        | .        | .        |
| LRN      | 8.3e-06  | 7.5e-15  | 8.8e-06  | 1.2e-07  | 2.6e-60  | 1.8e-05  | .        | .        |
| LRN+PD*  | 7.2e-58  | 7.0e-130 | 4.9e-58  | 1.0e-48  | 4.3e-195 | 1.0e-58  | 2.8e-19  | .        |
| PD*+ΔLRN | 1.5e-52  | 4.1e-130 | 8.4e-53  | 1.1e-42  | 1.4e-193 | 4.1e-53  | 1.1e-17  | 2.1e-02  |

Table SIII: Angle-based desired torque RMS-E t-test $p$ values.

5 Convergence Time for Controllers with Iterative Learning Components

Fig. S4 shows convergence of RMS-E and RMS-E AVG tracking errors over time for the three torque controllers that involved iterative learning. Each dot denotes the RMS-E or RMS-E AVG for a 20-step period starting from the stride number on the x-axis. Solid lines are the exponential fits to the error trends. Convergence was slowest and the reduction in error greatest when desired torque was based on Time. Improvements were more modest with Angle- and NMM-based desired torque. When desired torque was based on EMG, learning resulted in large initial improvements in torque error, but high errors remained at steady state.

|         | PD*      | PD*+EDG  | PD*+PEC | PID*    | PD*+M   | PAS     | LRN     | LRN+PD* |
|---------|----------|----------|---------|---------|---------|---------|---------|---------|
| PD*+EDG | 4.4e-113 | .        | .       | .       | .       | .       | .       | .       |
| PD*+PEC | 3.0e-11  | 1.1e-86  | .       | .       | .       | .       | .       | .       |
| PID*    | 3.2e-08  | 3.2e-104 | 2.5e-02 | .       | .       | .       | .       | .       |
| PD*+M   | 1.3e-238 | 3.1e-175 | 6.3e-172| 2.5e-213| .       | .       | .       | .       |
| PAS     | 1.2e-11  | 9.3e-85  | 8.1e-01 | 1.4e-02 | 8.3e-169| .       | .       | .       |
| LRN     | 7.5e-38  | 7.1e-91  | 5.7e-49 | 4.2e-45 | 9.4e-131| 2.3e-49 | .       | .       |
| LRN+PD* | 2.6e-119 | 1.3e-166 | 1.4e-104| 2.1e-121| 1.6e-241| 4.1e-103| 4.1e-19 | .       |
| PD*+ALRN| 8.2e-72  | 1.5e-133 | 8.9e-84 | 1.2e-81 | 3.0e-174| 1.0e-83 | 8.4e-07 | 1.3e-09 |

Table SIV: NMM-based desired torque RMS-E t-test $p$ values.

|         | PD*     | PD*+EDG | PD*+PEC | PID*    | PD*+M   | PAS     | LRN     | LRN+PD* |
|---------|---------|---------|---------|---------|---------|---------|---------|---------|
| PD*+EDG | 1.9e-41 | .       | .       | .       | .       | .       | .       | .       |
| PD*+PEC | 9.9e-15 | 4.5e-20 | .       | .       | .       | .       | .       | .       |
| PID*    | 1.7e-01 | 3.0e-41 | 1.4e-12 | .       | .       | .       | .       | .       |
| PD*+M   | 6.9e-52 | 1.4e-06 | 1.2e-32 | 2.2e-51 | .       | .       | .       | .       |
| PAS     | 1.4e-10 | 1.5e-26 | 4.5e-02 | 2.5e-08 | 1.9e-38 | .       | .       | .       |
| LRN     | 3.1e-04 | 3.8e-10 | 2.5e-01 | 3.6e-03 | 4.0e-17 | 9.1e-01 | .       | .       |
| LRN+PD* | 7.5e-37 | 1.0e-87 | 4.0e-67 | 3.8e-45 | 4.6e-91 | 1.5e-63 | 1.5e-26 | .       |
| PD*+ALRN| 1.9e-34 | 2.7e-84 | 2.5e-63 | 4.8e-42 | 5.2e-89 | 1.5e-59 | 7.8e-26 | 6.8e-01 |

Table SV: EMG-based desired torque RMS-E t-test $p$ values.

6 Relative contributions of the desired motor displacements of various components of PD*+ALRN for all four high level controllers Fig. S5 shows convergence of RMS-E and RMS-B AVG tracking errors over time for the three torque controllers that involved iterative learning. Each dot denotes the RMS-E or RMS-E AVG for a 20-step period starting from the stride number on the x-axis. Solid lines are the exponential fits to the error trends. Convergence was slowest and the reduction in error greatest when desired torque was based on time. Improvements were more modest with angle and NMM-based desired torque. When desired torque was based on EMG, learning resulted in large initial improvements in torque error, but high errors remained at steady state.

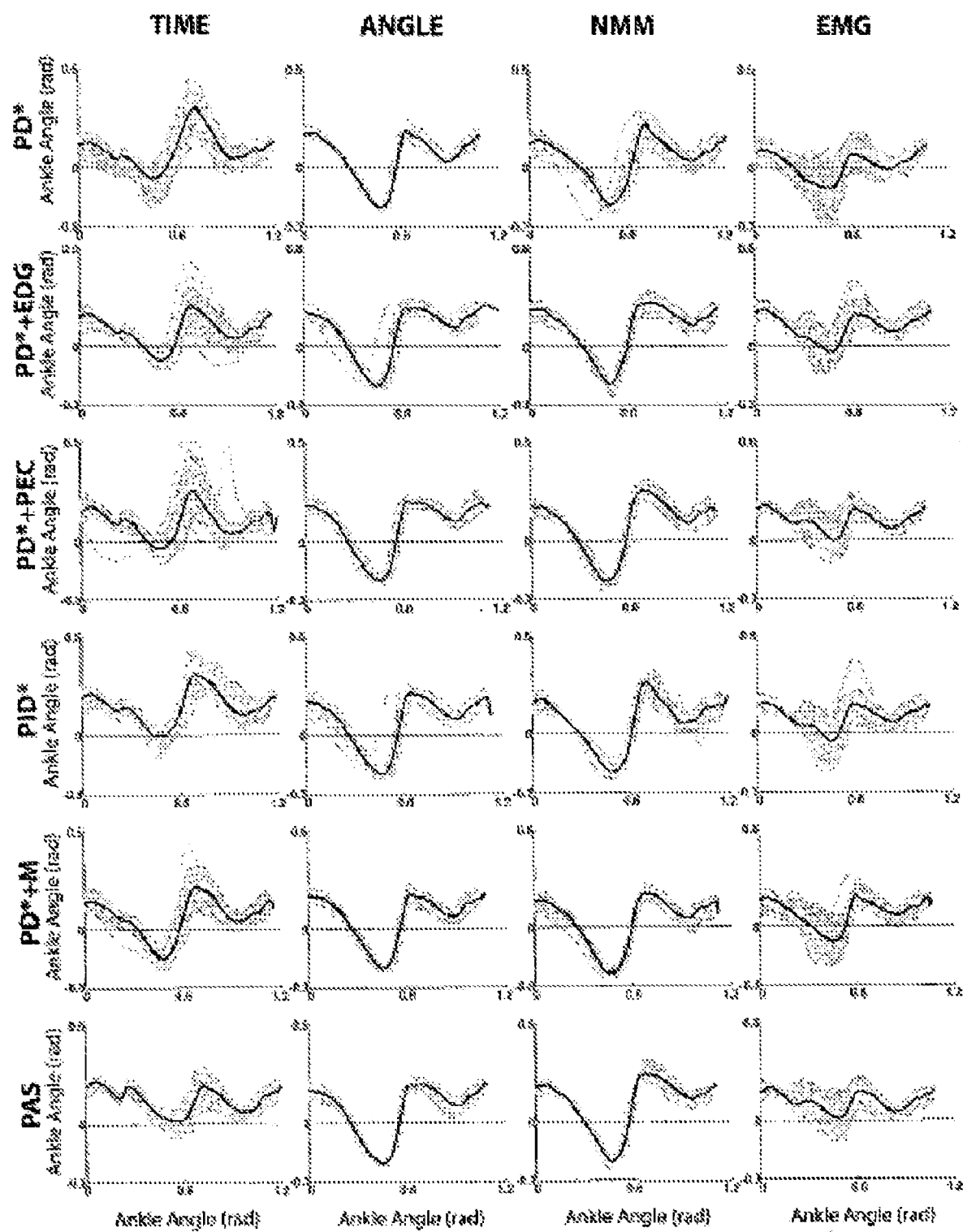

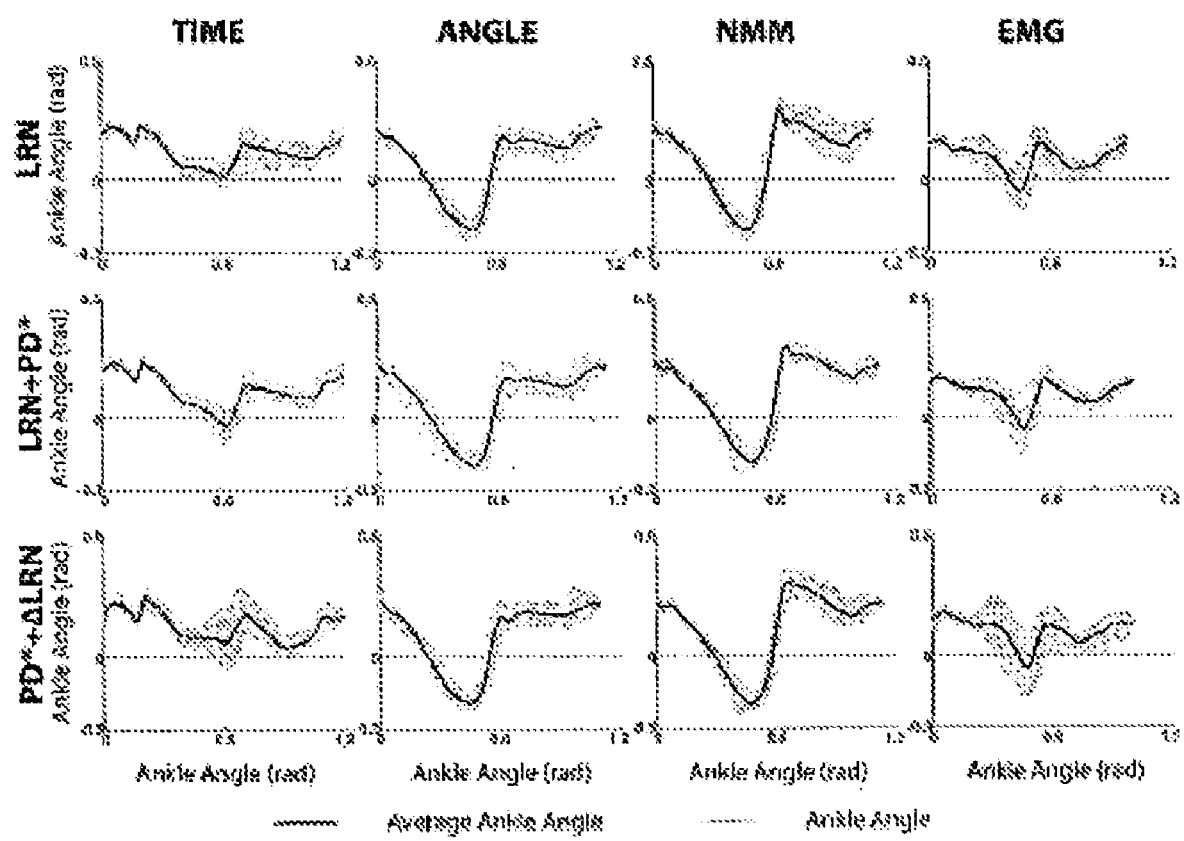

Fig. S1: Overlapped trajectories of measured ankle angle in time for 100 steady-state strides.
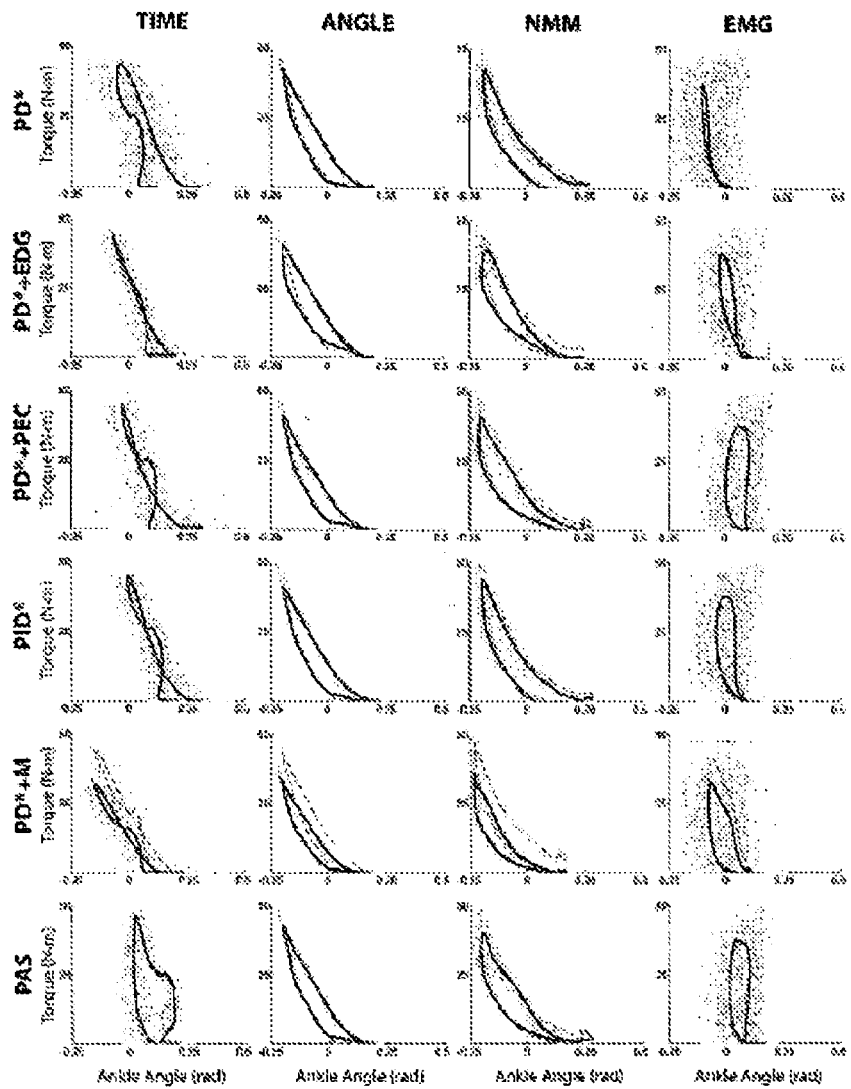

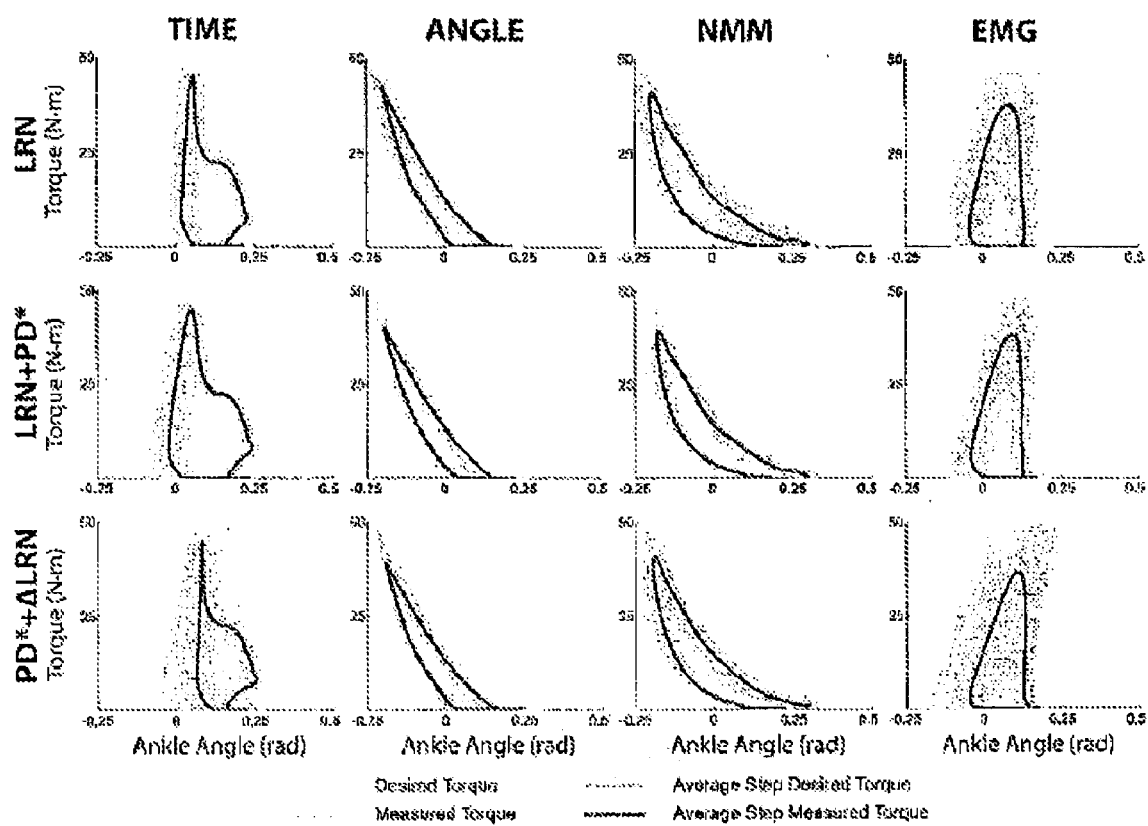
Fig. S2: Overlapped trajectories of measured ankle torque versus measured ankle angle for 100 steady-state strides.
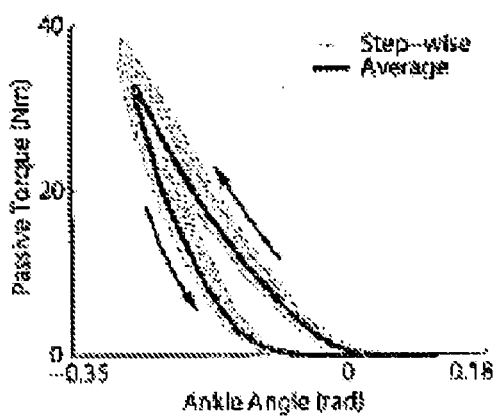
Fig. S3: Passive response: overlapped trajectories of measured ankle torque versus measured ankle angle for 100 strides during which the motor position was fixed.

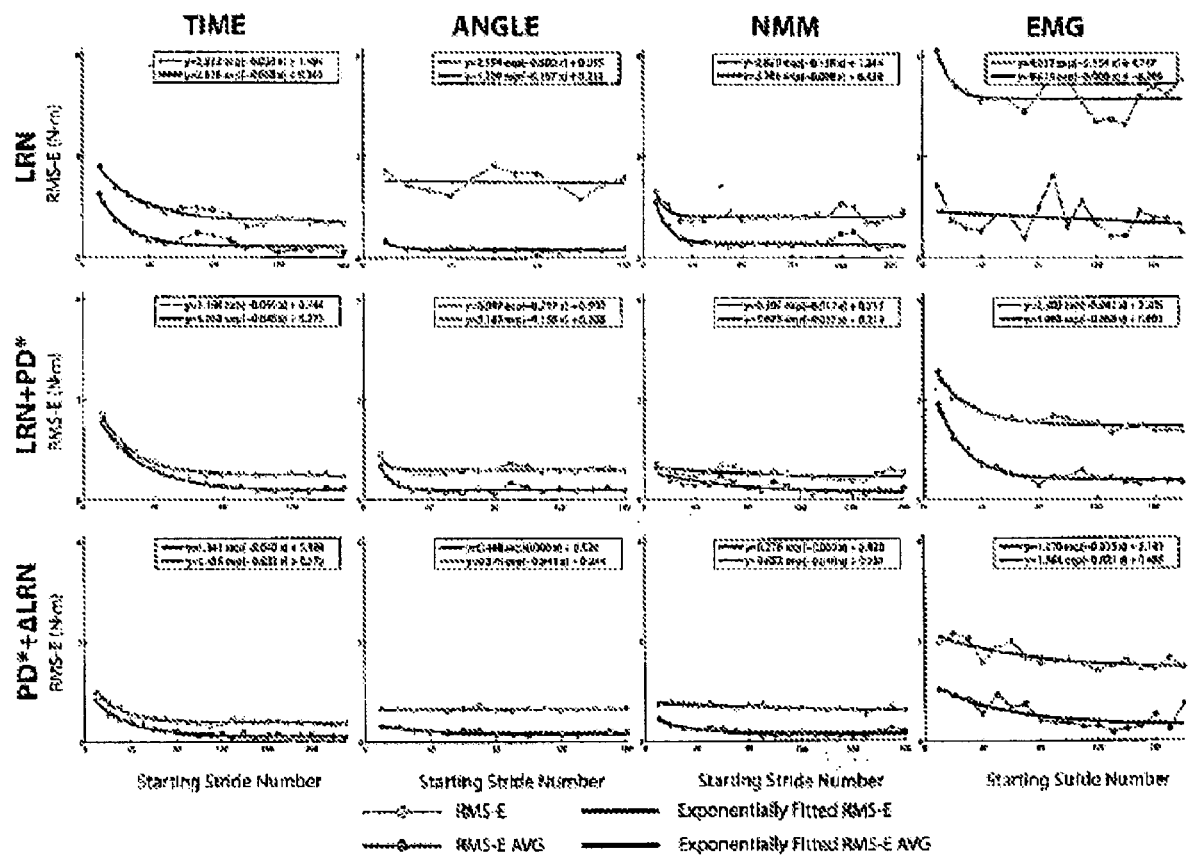
Fig. S4: Error as a function of time for controllers with iterative learning components. Each dot is the average RMS error for 20 strides, beginning with the number indicated on the x axis.

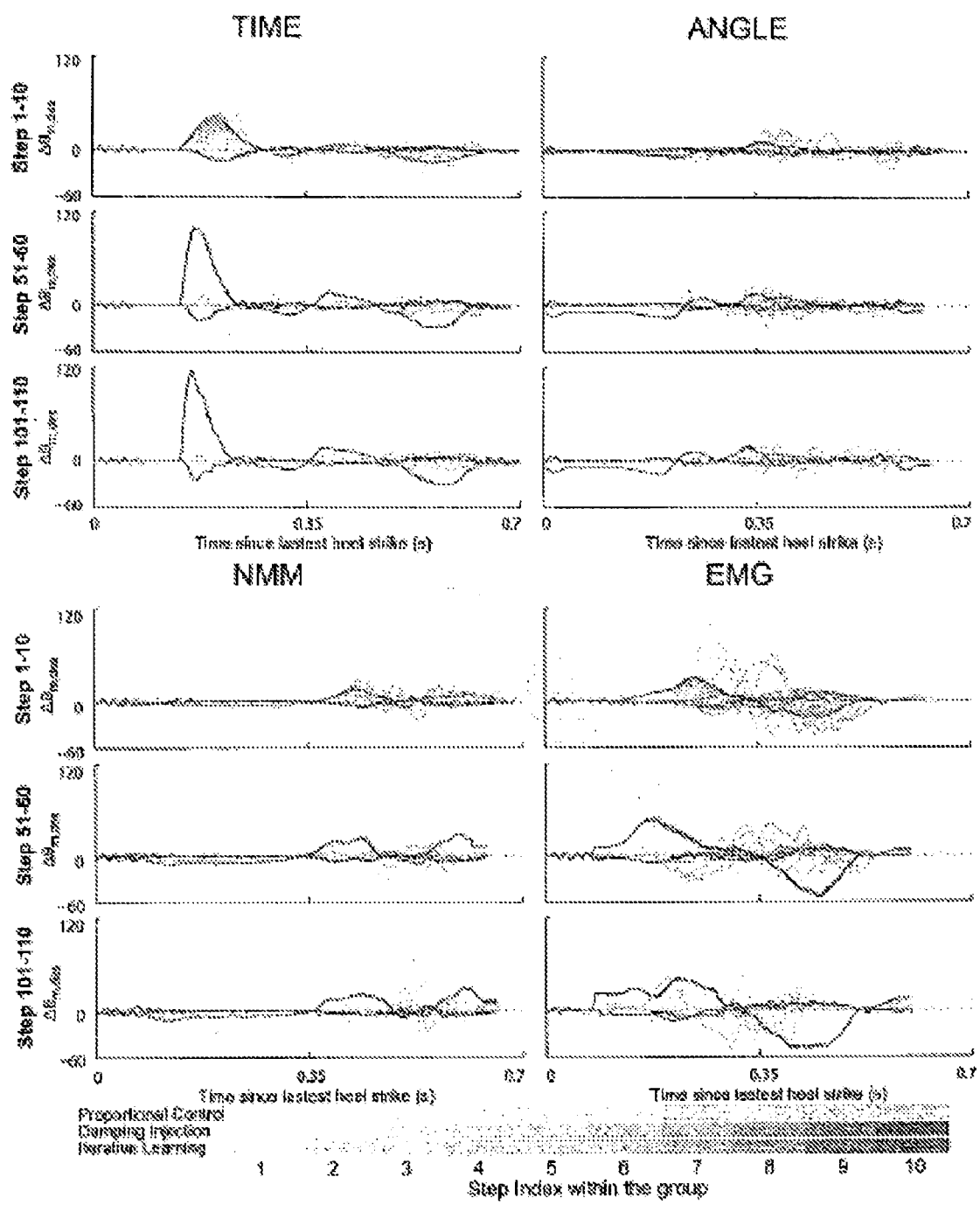
Fig. S5: Contributions from various elements towards the control input, the desired motor displacements of PD*+ΔLRN controller for four different high level controllers.

What is claimed is:

1. A method of controlling an exoskeleton, comprising:
receiving a measurement of a first torque applied to a rotational joint coupling a first component to a second component, the first torque being applied by a motor via a cable;
determining, based on the measurement of the first torque, a first portion of a second torque to apply to the rotational joint;
determining, based on the measurement of the first torque, a second portion of the second torque to apply to the rotational joint by:
determining, for an interval of a cycle, a target value as a function of an error value measured at the same interval of one or more previous cycles; and
determining, from the target value, a feed-forward response portion of the second torque;
determining a value of the second torque to apply to the rotational joint based on the first portion and the second portion including the feed-forward response portion; and
controlling the motor for applying the second torque to the rotational joint by the cable.

2. The method of claim 1, wherein the first portion of the second torque to apply to the rotational joint includes a feedback response portion, the feedback response portion being a first function of the error value, wherein the error value comprises a torque error value.

3. The method of claim 2, wherein the first function comprises a proportional response component.

4. The method of claim 2, wherein the first function further comprises an integral component and a damping component.

5. The method of claim 2, wherein the feed-forward response portion comprises a second function of the value of the torque error value, the second function being different from the first function.

6. The method of claim 5, wherein the method further comprises adjusting the iterative learning component based on the torque error value and an additional torque error value.

7. The method of claim 5, further comprising determining a value of a torque to apply to the rotational joint comprises based on a neuromuscular model.

8. The method of claim 5, further comprising determining a value of a torque to apply to the rotational joint based on one or more measured electromyography signals.

9. The method of claim 5, wherein a gain of the feed-forward response portion is greater than a gain of the feedback response portion.

10. The method of claim 1, further comprising:
measuring a plurality of torques;
measuring a plurality of angles of rotation of the rotational joint;
determining a plurality of torque error values for the plurality of torques;
generating an array of torque-angle pairs by associating each measured angle of rotation with a determined torque error of the plurality;
calculating a gain parameter for each torque-angle pair in the array of torque-angle pairs; and
determining the second portion of the second torque using the gain parameter for each torque-angle pair.

11. The method of claim 1, further comprising:
measuring a plurality of torques;
determining a plurality of torque error values for the plurality of torques;
generating an array of torque-time pairs by associating each determined torque error value with a cycle time;
calculating a gain parameter for each torque-time pair in the array of torque-time pairs; and
determining the second portion of the second torque using the gain parameter for each torque-time pair.

12. The method of claim 1, wherein the measurement of a first torque comprises a measurement of a strain on one or both of the first component and the second component.

13. The method of claim 1, wherein controlling the motor to apply the second torque to the rotational joint by the cable comprises controlling one or both of a position of the motor or a velocity of the motor.

14. The method of claim 1, wherein the cable is in series with a spring, and wherein a spring stiffness of the spring is tuned to reduce a torque error value relative to the torque error value that occurs independent of the spring stiffness being tuned.

15. The method of claim 1, wherein the first component and the second component are portions of a multi joint exoskeleton, and further comprising:
receiving a measurement of a third torque applied to a second rotational joint coupling a third component to a fourth component, the third torque being applied by a second motor via by a second cable;
determining, based on the measurement of the third torque, a first portion of a fourth torque to apply to the second rotational joint;
determining, based on the measurement of the third torque, a second portion of the fourth torque to apply to the second rotational joint;
determining a value of the fourth torque to apply to the second rotational joint based on the first portion and the second portion; and
controlling the second motor for applying the fourth torque to the second rotational joint by the second cable.

16. An exoskeleton system comprising:
a rotational joint that couples a first component and a second component;
a cable connected to one or more of the first component and the second component;
a motor coupled to the cable, the motor configured to apply a torque to the rotational joint by the cable; and
a motor controller configured for communication with the motor, the motor controller further configured to control the torque applied to the rotational joint by the cable by performing operations comprising:
measuring a first torque applied by the cable to the rotational joint;
determining, based on the first torque, a first portion of a second torque to apply to the rotational joint;
determining, based on the first torque, a second portion of the second torque to apply to the rotational joint by:
determining, for an interval of a cycle, a target value as a function of an error value measured at the same interval of one or more previous cycles; and
determining, from the target value, a feed-forward response portion of the second torque;
determining a value of the second torque to apply to the rotational joint by combining the first portion and the second portion including the feed-forward response portion; and
controlling the motor to apply the second torque to the rotational joint by the cable.

17. The exoskeleton system of claim 16, wherein the first portion of the second torque to apply to the rotational joint includes a feedback response portion, the feedback response portion being a first function the error value, wherein the error value includes a torque error value.

18. The exoskeleton system of claim 17, wherein the first function comprises a proportional response component.

19. The exoskeleton system of claim 17, wherein the first function further comprises an integral component and a damping component.

20. The exoskeleton system of claim 17, wherein the feed-forward response portion comprises a second function of the value of the torque error value, the second function being different from the first function.

21. The exoskeleton system of claim 20, wherein the motor controller is configured to adjust the iterative learning component based on the torque error value and an additional torque error value.

22. The exoskeleton system of claim 20, further comprising determining a value of a torque to apply to the rotational joint based on a neuromuscular model.

23. The exoskeleton system of claim 20, further comprising determining a value of a torque to apply to the rotational joint based on one or more measured electromyography signals.

24. The exoskeleton system of claim 20, wherein a gain of the feed-forward response portion is greater than a gain of the feedback response portion.

25. The exoskeleton system of claim 16, further comprising an optical encoder configured to measure an angle of rotation of the rotational joint, wherein the operations further comprise:
 measuring a plurality of torques;
 measuring a plurality of angles of rotation of the rotational joint;
 determining a plurality of torque error values for the plurality of torques;
 generating an array of torque-angle pairs by associating each measured angle of rotation with a determined torque error of the plurality;
 calculating a gain parameter for each torque-angle pair in the array of torque-angle pairs; and
 determining the second portion of the second torque using the gain parameter for each torque-angle pair.

26. The exoskeleton system of claim 16, wherein the operations further comprise:
 measuring a plurality of torques;
 determining a plurality of torque error values for the plurality of torques;
 generating an array of torque-time pairs by associating each determined torque error value with a cycle time;
 calculating a gain parameter for each torque-time pair in the array of torque-time pairs; and
 determining the second portion of the second torque using the gain parameter for each torque-time pair.

27. The exoskeleton system of claim 16, wherein measuring the torque comprises measuring a strain on one or both of the first component and the second component.

28. The exoskeleton system of claim 16, wherein controlling the motor to apply the second torque to the rotational joint by the cable comprises controlling one or both of a position of the motor or a velocity of the motor.

29. The exoskeleton system of claim 16, wherein the cable is in series with a spring, and wherein a spring stiffness of the spring is tuned to reduce a torque error value relative to the torque error value that occurs independent of the spring stiffness being tuned.

30. The exoskeleton system of claim 16, further comprising a third component and a fourth component, and wherein the operations further comprise:
 receiving a measurement of a third torque applied to a second rotational joint coupling a third component to a fourth component, the third torque being applied by a second motor by a second cable;
 determining, based on the measurement of the third torque, a first portion of a fourth torque to apply to the second rotational joint;
 determining, based on the measurement of the third torque, a second portion of the fourth torque to apply to the second rotational joint;
 determining a value of the fourth torque to apply to the second rotational joint based on the first portion and the second portion; and
 controlling the second motor for applying the fourth torque to the second rotational joint by the second cable.

31. A non-transitory computer readable medium storing instructions that are executable by one or more processors configured to perform operations comprising:
 receiving a measurement of a first torque applied to a rotational joint coupling a first component to a second component, the first torque being applied by a motor by a cable;
 determining, based on the measurement of the first torque, a first portion of a second torque to apply to the rotational joint;
 determining, based on the measurement of the first torque, a second portion of the second torque to apply to the rotational joint by:
  determining, for an interval of a cycle, a target value as a function of an error value measured at the same interval of one or more previous cycles; and
  determining, from the target value, a feed-forward response portion of the second torque;
 determining a value of the second torque to apply to the rotational joint based on the first portion and the second portion including the feed-forward response portion; and
 sending a signal for controlling the motor for applying the second torque to the rotational joint by the cable.

32. An exoskeleton system comprising:
 a rotational joint that couples a foot portion of an exoskeleton and a shank portion of the exoskeleton;
 a Bowden cable connected to one or more of the foot portion and the shank portion;
 a motor coupled to the Bowden cable, the motor configured to apply a plantarflexion torque to the rotational joint by the Bowden cable; and
 a motor controller configured for communication with the motor, the motor controller further configured to control the plantarflexion torque applied to the rotational joint by the Bowden cable by performing operations comprising:
  measuring a first plantarflexion torque applied by the Bowden cable to the rotational joint;
  determining, based on a first plantarflexion torque, a feedback portion of a second plantarflexion torque to apply to the rotational joint, wherein the feedback portion is proportional to a first plantarflexion torque error value and is proportional to a velocity of the motor;
  determining, based on the first plantarflexion torque, a feed-forward portion of the second plantarflexion torque to apply to the rotational joint by:

determining, for an interval of a stride cycle, a position of the motor as a function of a torque error value measured at the same interval of one or more previous stride cycles; and determining, from the position, the feed-forward response portion of the second torque;

determining a value of the second plantarflexion torque to apply to the rotational joint based on the feedback portion and the feed-forward portion; and controlling the motor to apply the second plantarflexion torque to the rotational joint by the Bowden cable.

* * * * *